(12) United States Patent
Ohashi et al.

(10) Patent No.: US 7,694,883 B2
(45) Date of Patent: Apr. 13, 2010

(54) RFID LABEL, METHOD FOR PRODUCING THE RFID LABEL, DEVICE FOR PRODUCING THE RFID LABEL, SHEET MEMBER (TAG SHEET) USED FOR THE RFID LABEL, AND CARTRIDGE ATTACHED TO THE DEVICE FOR PRODUCING THE RFID LABEL

(75) Inventors: Tsuyoshi Ohashi, Hashima (JP); Kazunari Taki, Nagoya (JP); Kunihiro Yasui, Nagoya (JP); Takuya Nagai, Nagoya (JP); Toshio Takahashi, Nagoya (JP); Yasunori Nakamura, Shinshiro (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 999 days.

(21) Appl. No.: 11/262,828

(22) Filed: Nov. 1, 2005

(65) Prior Publication Data

US 2006/0118229 A1    Jun. 8, 2006

Related U.S. Application Data

(63) Continuation-in-part of application No. PCT/JP2004/004120, filed on Mar. 24, 2004.

(30) Foreign Application Priority Data

| May 1, 2003 | (JP) | ............................ 2003-126681 |
| May 1, 2003 | (JP) | ............................ 2003-126682 |
| May 1, 2003 | (JP) | ............................ 2003-126683 |
| May 1, 2003 | (JP) | ............................ 2003-126684 |
| Nov. 24, 2004 | (JP) | ............................ 2004-339024 |

(51) Int. Cl.
*G06K 19/00* (2006.01)
*G06K 19/06* (2006.01)

(52) U.S. Cl. ...................................... 235/487; 235/492
(58) Field of Classification Search ................. 235/487, 235/492; 340/572.1, 572.8; 428/32.1, 448
See application file for complete search history.

(56) References Cited

U.S. PATENT DOCUMENTS 5,059,951 A    10/1991    Kaltner
5,125,508 A    6/1992    Yamamoto (Continued)

FOREIGN PATENT DOCUMENTS

EP    1 154 391 A1    11/2001

(Continued)

*Primary Examiner*—Thien M. Le
*Assistant Examiner*—April A Taylor
(74) *Attorney, Agent, or Firm*—Oliff & Berridge, PLC

(57) ABSTRACT

A method for producing a RFID label comprises conveying a first label base material which is transparent from a first holding portion holding the first label base material, forming an image on a surface of the first label base material, conveying a second label base material including at least one of a RFID antenna conductor and an IC chip from a second holding portion holding the second label base material and joining the second label base material and the first label base material on which an image has been formed together, wherein, when an image is formed on the first label base material, the image is formed on a surface of the first label base material, the surface being joined to the second label base material.

20 Claims, 34 Drawing Sheets

U.S. PATENT DOCUMENTS

| | | | |
|---|---|---|---|
| 5,188,469 | A | 2/1993 | Nagao et al. |
| 5,348,406 | A | 9/1994 | Yoshiaki et al. |
| 5,419,648 | A | 5/1995 | Nagao et al. |
| 5,667,874 | A | 9/1997 | Nakamura et al. |
| 5,685,654 | A | 11/1997 | Nagao et al. |
| 6,478,229 | B1 * | 11/2002 | Epstein ................. 235/492 |
| 6,514,367 | B1 * | 2/2003 | Leighton ................ 156/153 |
| 6,533,180 | B1 * | 3/2003 | Wood .................... 235/494 |
| 6,648,232 | B1 * | 11/2003 | Emmert ................. 235/488 |
| 6,891,555 | B2 | 5/2005 | Minowa et al. |
| 6,977,112 | B2 | 12/2005 | Shino et al. |
| 2001/0007335 | A1 * | 7/2001 | Tuttle et al. ............... 235/492 |
| 2002/0130186 | A1 | 9/2002 | Lasch et al. |
| 2003/0075608 | A1 * | 4/2003 | Atherton ............... 235/492 |
| 2004/0091681 | A1 * | 5/2004 | Hoffmann ............... 428/195.1 |

FOREIGN PATENT DOCUMENTS

| | | |
|---|---|---|
| JP | U-57-101777 | 6/1982 |
| JP | A 2-106555 | 4/1990 |
| JP | A-02-205573 | 8/1990 |
| JP | A-03-043368 | 2/1991 |
| JP | U-03-078770 | 8/1991 |
| JP | A 7-314831 | 12/1995 |
| JP | A-08-080967 | 3/1996 |
| JP | A 9-153123 | 6/1997 |
| JP | A-09-315047 | 12/1997 |
| JP | A-10-236041 | 9/1998 |
| JP | B2 2843437 | 10/1998 |
| JP | A-11-139050 | 5/1999 |
| JP | A-2000-057295 | 2/2000 |
| JP | A 2000-76372 | 3/2000 |
| JP | A 2001-66992 | 3/2001 |
| JP | A 2002-53116 | 2/2002 |
| JP | A 2002-72882 | 3/2002 |
| JP | A 2002-72883 | 3/2002 |
| JP | A 2002-72886 | 3/2002 |
| JP | A 2002-104626 | 4/2002 |
| JP | A-2002-140679 | 5/2002 |
| JP | A 2002-234569 | 8/2002 |
| JP | A-2002-269527 | 9/2002 |
| JP | A-2002-284230 | 10/2002 |
| JP | A 2002-319812 | 10/2002 |
| JP | A 2002-361962 | 12/2002 |
| JP | A 2003-6596 | 1/2003 |
| JP | A 2003-16405 | 1/2003 |
| JP | A 2003-30615 | 1/2003 |
| WO | WO 99/24934 A1 | 5/1999 |

* cited by examiner

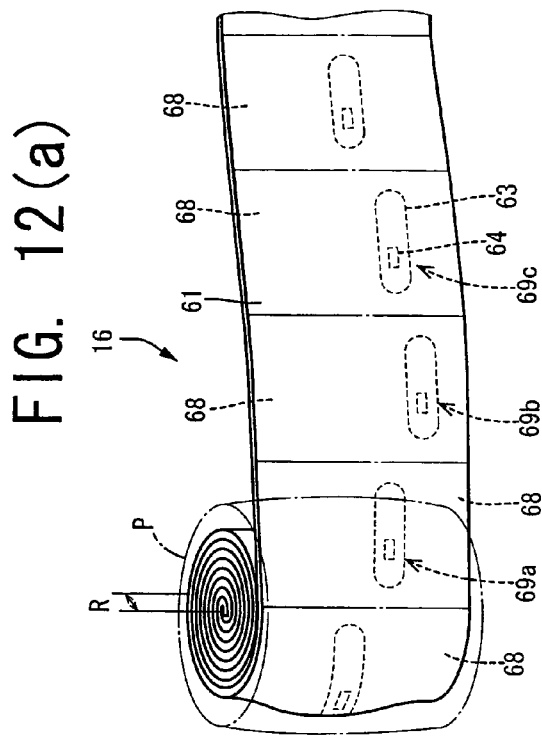
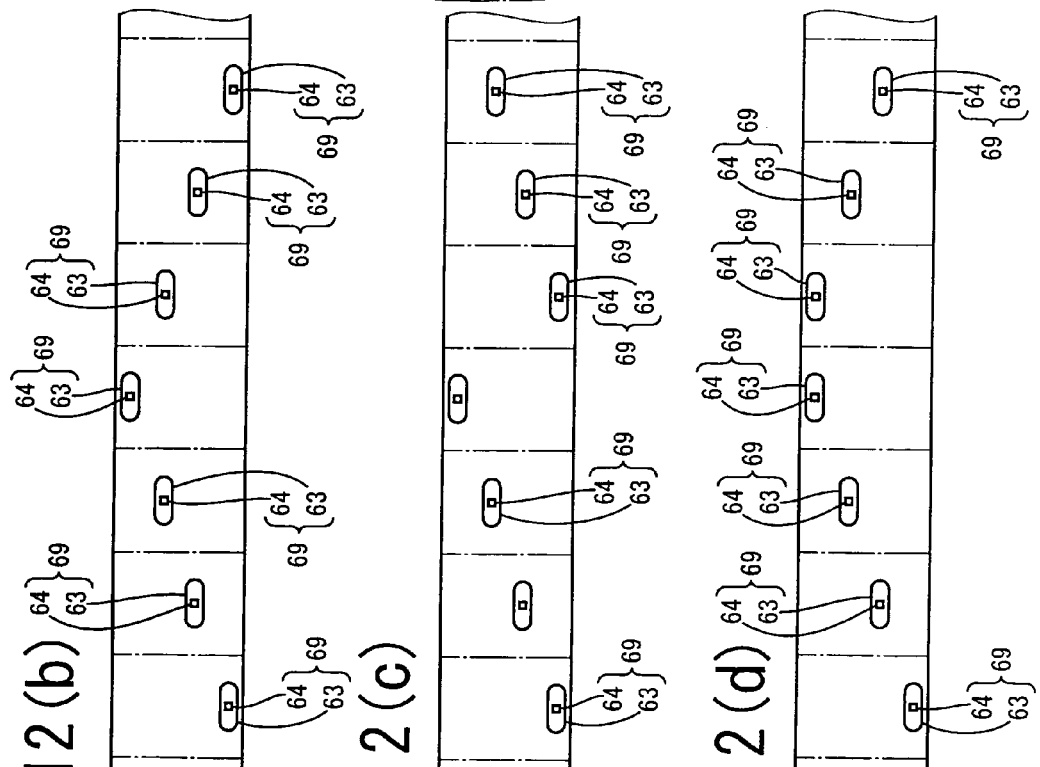

RFID LABEL, METHOD FOR PRODUCING THE RFID LABEL, DEVICE FOR PRODUCING THE RFID LABEL, SHEET MEMBER (TAG SHEET) USED FOR THE RFID LABEL, AND CARTRIDGE ATTACHED TO THE DEVICE FOR PRODUCING THE RFID LABEL

This is a Continuation-in-Part of International Application No. PCT/JP04/004120 filed Mar. 24, 2004, which claims the benefit of Japanese Patent Applications No. 2003-126681, 2003-126682 , 2003-126683 and 2003-126684 filed May 1, 2003 and Japanese Patent Application No. 2004-339024 filed Nov. 24, 2004. The entire disclosure of the prior applications is hereby incorporated by reference herein in its entirety.

BACKGROUND OF THE INVENTION

This invention relates to a RFID (Radio Frequency Identification) label in which information data wirelessly sent from outside can be stored or from which information data can be wirelessly read toward the outside, a method for producing the RFID label, a device for producing the RFID label, a sheet member used for the RFID label, and a cartridge that can be mounted on the producing device.

Conventionally, a data capturing system for capturing data about articles of commerce while using RFID labels, in each of which an IC chip or the like is embedded, is known as an example of a system in which data stored in such a RFID label is wirelessly exchanged (see Patent Document 1, for example).

For example, an electromagnetic induction method is applied to the RFID label used in the data capturing system. According to this method, when the RFID label attached to an article enters a magnetic field, an electromotive force is generated in a resonance circuit as a result of electromagnetic induction, and, based on the electromotive force, radio waves are emitted.

In this system, a reflected wave returned from the RFID label is received by a receptor, and, based on the reflected wave received thereby, data pre-stored in the RFID label can be remotely read. Therefore, this system can be used for various purposes of use.

If the fact that data has once been captured from the RFID label attached to the article is stored, it is possible to, for example, sound an alarm to the effect that the article has been unlawfully taken out without capturing data. For example, a bar code is printed on the RFID label. When articles of commerce are lawfully taken out, the bar code is scanned with a scanner so as to read and gather data, and, at the same time, radio waves are emitted from a transmitter mounted on the scanner. Its internal circuit is then short-circuited or opened so as to stop the operation of an IC chip embedded in the RFID label. As a result, it becomes possible to take out only an article from which data has been gathered. However, if an article to which a RFID label has been attached and which does not have the data storage of having gathered data is taken out, the IC chip responds to radio waves sent from the transmitter, i.e., from an interrogator, and emits a reflected wave. Therefore, it is judged that the article has been unlawfully taken out, and an alarm is sounded.

If the origin of an article, the production time or shipment time thereof, the kind thereof, the price thereof, etc., are wirelessly written and prestored onto the RFID label attached to the article, consumers can remotely obtain these pieces of information about each article.

According to a conventional technique, in order to form an image on a RFID label used in the thus operated system, for example, an IC chip known as a RFID chip and a RFID antenna conductor, which are RFID circuit elements, are first embedded in a band-shaped sheet member so as to form a RFID label, and then an image of, for example, a bar code is printed onto one surface of the RFID label.

[Patent Document 1] JP Patent No. 2843437

However, when put to practical use, the RFID label has still-unsolved problems concerning the printing of identification items attached to the label and concerning the IC chip and the antenna conductor embedded in the label.

For example, in order to attach an image to the RFID label, if the image is formed after forming the RFID label including an IC chip and other elements, the image will be distorted by the influence of the concavity and convexity of an image forming surface generated by the thickness of the IC chip or the other elements, or will become unclearly blurred by contact between the image forming surface and an object. Additionally, in a thermal method for forming an image by applying heat to an image forming surface, there is a possibility that, when the image is formed, heat applied to the RFID label will cause damage onto the resonance circuit and the IC chip contained in the RFID label or onto a joint part joining to the antenna conductor.

Additionally, when a sheet member used for the RFID label containing the IC chip, the antenna conductor, etc., is stored, the part of the IC chip or the antenna conductor is expanded in proportion to the thickness of the IC chip or the antenna conductor. Therefore, the sheet member has difficulty in maintaining a close contact state with another sheet member contiguous in the thickness direction when the sheet member is wound, and hence a gap or looseness will easily occur between the sheet members. If the sheet member for the RFID label is wound without reducing such a gap caused by the thickness of the IC chip or the antenna, the number of sheets that can be stored in a storage area will be lowered, and the frequency at which sheet members used for the RFID label are newly added will be heightened. If many labels are intended to be stored, the storage area will be enlarged, and hence the whole of a device for producing the RFID label must been larged. Additionally, there is a possibility that abrasion or the occurrence of static electricity caused by the friction occurring when the wound sheet members slip out of place will damage the IC chip, the antenna member, or at least one of the sheet members.

Additionally, although the RFID label is formed by arranging the IC chip and the antenna conductor connected thereto on one surface of the band-shaped sheet member, an area in which the IC chip and the other elements are disposed is partially thickened. Therefore, disadvantageously, for example, a cartridge requires a sufficient storage space for a band-shaped RFID label that is stored in a wound state like a roll and that has not yet been cut and for a short-piece-shaped RFID label that is stored in a cut state. The same applies to a label base material (sheet member) that has not yet been covered with a cover sheet.

In a RFID label producing device for producing the conventional RFID label in which the IC chip that has a RFID function and the RFID antenna conductor are embedded, the IC chip and the RFID antenna conductor each of which has a great thickness are embedded in the band-shaped sheet member, and hence the IC chip and the antenna conductor protrude from the sheet member. Therefore, the amount of protrusion of these elements is superposed when the band-shaped sheet member is wound like a roll. When this band-shaped sheet member (tag tape roll) is loaded into the device to produce a RFID label, the IC chip and the antenna conductor are pressed by a carrier roller in a label producing process. As a result, a load is imposed on the IC chip and the antenna conductor. Therefore, there is a fear that a circuit in the IC chip will be short-circuited, or a change in quality of the IC chip will bring about the loss of identification data stored in the IC chip, or the IC chip, the antenna conductor, and a joint part between the IC chip and the antenna conductor will be damaged. Additionally, there is a fear that, when the band-shaped sheet member from which an information discriminating portion that contains the antenna conductor and the IC chip protrudes is carried by the roller, the sheet member will be carried unstably and obliquely while being affected by a protruded part, or the feed speed will vary before and behind the protruded part in a process for performing a printing step on the band-shaped sheet member from which the information discriminating portion protrudes, so that printing defects, such as stains or shear in printing, occur.

Therefore, in consideration of the foregoing problems, it is a first object of the present invention to excellently maintain the state of an image printed on a RFID label used to wirelessly exchange data without damaging an IC chip and other elements embedded in the label when the label is produced. Additionally, with regard to keeping a sheet member used for the RFID label, it is a second object of the present invention to more efficiently put the sheet member without damaging the sheet member when the sheet member is loaded into a RFID label producing device. It is a third object of the present invention to provide a sheet member used for the RFID label that can reduce the whole of the RFID label member and that is spatially advantageous. It is a fourth object of the present invention to provide a RFID label producing device and a cartridge each of which has no fear that a circuit in an IC chip will be short-circuited, no fear that a change in quality of the IC chip will bring about the loss or crash of identification data, or no fear that a RFID antenna conductor or a joint part between the IC chip and the antenna conductor will be damaged.

On the other hand, a conventional tape printer (label producing device) has already been proposed in which a tape used as a material to be printed is loaded into a cartridge (cassette) in a rolled manner, is then drawn out from a roll so as to print desired characters onto the tape, and is discharged like a label (see Patent Document 2, for example).

In this conventional technique, two rolls are provided. One of them is a roll on which abase-material tape (double-faced adhesive tape) is wound, and the other is a roll on which a to-be-printed tape (film tape), onto which characters are printed and which is glued to the base-material tape, is wound. Predetermined characters are printed onto the to-be-printed tape while drawing out the base-material tape and the to-be-printed tape from the two rolls, respectively. Thereafter, the to-be-printed tape on which the characters have been printed and the base-material tape are glued together so as to produce a label.

At this time, a gluing adhesive layer to be glued onto the to-be-printed tape is provided on one side of a main tape part (base layer) of the base-material tape, whereas an affixing adhesive layer used to affix a produced label onto a specified object is provided on the opposite side of the main tape part. Further, the affixing adhesive layer is covered with a pattern sheet of paper that is peeled off when affixed. Therefore, a label formed by gluing the to-be-printed tape and the base-material tape together has a five-layer structure consisting of the to-be-printed tape layer, the gluing adhesive layer of the base-material tape, the base layer, the affixing adhesive layer, and the pattern sheet of paper.

[Patent Document 2] Japanese Published Unexamined Patent Application No. H7-314831 (see FIG. 1 and FIG. 2)

Referring to the tag mentioned above, if information, which is relative to RFID tag information stored in the IC chip but is independent of the RFID tag information, is printed on the label and is used, the related information can be visually checked from the side of users, and will serve the convenience of the users in various ways. Accordingly, a method can be proposed to produce a RFID label on which characters are printed and that contains a RFID circuit element by employing the conventional technique. In this method, the RFID circuit element is disposed in either the gluing adhesive layer or the affixing adhesive layer of the five-layer structure.

However, if the RFID circuit element is disposed in the affixing adhesive layer, an adhesive layer part that is closer to the pattern sheet than the RFID circuit element and that contributes substantially to affixing will be thinned (i.e., the quantity of adhesive will be reduced). As a result, there is a possibility that a sufficient adhesive force cannot be obtained in affixing. There is also a possibility that the RFID circuit element will be damaged since a reaction force that is generated by pressing and that is given from a surface to be affixed is easily applied onto the circuit element when affixed.

On the other hand, if the RFID circuit element is disposed in the gluing adhesive layer, an adhesive layer part that is closer to the to-be-printed tape than the RFID circuit element and that contributes substantially to gluing will be thinned (i.e., the quantity of adhesive will be reduced) in the same way as the above example. As a result, there is a possibility that a sufficient adhesive force cannot be obtained in gluing. There is also a possibility that the RFID circuit element will be damaged since a reaction force that is generated by pressing and that is given from a gluing means (a roller) is easily applied onto the circuit element when glued. Additionally, if the to-be-printed tape is transmissible (e.g., transparent or semitransparent), the RFID circuit element disposed in the gluing adhesive layer will be clearly seen (i.e., is exposed in appearance) from the side of the label surface beyond the to-be-printed tape. As a result, there arise disadvantages, such as externally undesirable matters or illegibleness.

A fifth object of the present invention is to provide a RFID label that can prevent a RFID circuit element from being damaged or being exposed in appearance when produced, a tag tape used to produce the RFID label, and a tag tape roll. According to the present invention, the RFID circuit element can be prevented from being damaged, and can avoid being exposed in appearance.

SUMMARY OF THE INVENTION

The first object indicated above may be achieved according to a first exemplary embodiment, which provides a method for producing a RFID label, the method comprising: conveying a first label base material which is transparent from a first holding portion holding the first label base material; forming an image on a surface of the first label base material; conveying a second label base material including at least one of a RFID antenna conductor and an IC chip from a second holding portion holding the second label base material; and joining the second label base material and the first label base material on which an image has been formed together, wherein, when an image is formed on the first label base material, the image is formed on a surface of the first label base material, the surface being joined to the second label base material. According to the RFID label producing method according to the first exemplary embodiment, it becomes possible to realize at least one of the fact that the IC chip and other elements included in the RFID label are not damaged and the fact that an image printed on the RFID label is kept in an excellent state. In other words, if an image is formed on the RFID label after joining the first label base material which is transparent and the second label base material including at least one (hereinafter, referred to as the "IC chip or the like") of the RFID antenna conductor and the IC chip together, there is a fear that the heat or pressure applied when the image is formed will damage the RFID antenna conductor and other elements included in the RFID label, and there is a fear that, for example, a concave and a convex generated by the IC chip or the like will appear on the surface of the RFID label, and hence the image cannot be formed in a normal manner. Therefore, as in the first exemplary embodiment, an image is formed on the first label base material that does not include the IC chip or the like before joining the first label base material and the second label base material together. Additionally, to maintain the quality of an image formed as above, when an image is formed on the first label base material, the image is formed on a surface to be joined to the second label base material of the first label base material.

A second exemplary embodiment provides a RFID label according to the method according to the first exemplary embodiment. In this RFID label, an image is formed on the surface to be joined to the second label base material of the first label base material, and the image-formed surface is covered with the second label base material. According to the RFID label according to the second exemplary embodiment, since no element comes into contact with the image-formed surface directly from outside, the image formed thereon can be prevented, for example, from being worn out, and the image can be kept in an excellent state.

The invention according to a third exemplary embodiment provides a device for producing a RFID label which put into practice the first exemplary embodiment, the device comprising: a first holding portion that holds a first label base material which is transparent; a second holding portion that holds a second label base material including at least one of a RFID antenna conductor and an IC chip; a joining means for adjusting the first label base material and the second label base material in a width direction and joining the first and second label base materials together while conveying the first label base material and the second label base material; a conveying-path forming means for forming a conveying path to convey the first label base material and the second label base material along mutually different paths from each of the first and second holding portions to a position at which the first label base material and the second label base material are joined together by the joining means; and an image forming means for forming an image on one side of the first label base material on the conveying path of the first label base material formed by the conveying-path forming means; wherein the image forming means forms an image on a surface of the first label base material, the surface being joined to the second label base material. That is, for the same reason as the first exemplary embodiment, an image is formed on one side of the first label base material, i.e., on a surface to be joined to the second label base material of the first label base material by the image forming means on the conveying path before joining the first label base material and the second label base material together. According to the RFID label producing device according to the third exemplary embodiment, the image formed on the RFID label can be kept in an excellent state without damaging the circuit and other elements included in the RFID label.

The first label base material and the second label base material may be joined together by, for example, a means for pressing the whole of the RFID label, which is used as the joining means, more preferably, by the joining means according to a fourth exemplary embodiment, which consists of a pair of rollers between which the first label base material and the second label base material are sandwiched, and the first label base material and the second label base material are joined together by rotations of each of the rollers while being conveyed. According to the RFID label producing device according to the fourth exemplary embodiment, since the first and second label base materials are joined together successively from the end of each label base material by the pair of rollers serving as the joining means, air is discharged from the inside of the RFID label formed by joining the label base materials together. Therefore, the external appearance can be prevented from being impaired by air put into the RFID label.

A fifth exemplary embodiment provides the device according to the fourth exemplary embodiment, wherein the first holding portion, the second holding portion, the conveying-path forming means, and one of the two rollers that constitute the joining means are disposed within a cartridge detachably attached to a main body of the RFID label producing device. According to the RFID label producing device ef according to the fifth exemplary embodiment, since a user of the RFID label producing device can exchange each label member held by each holding portion or can load new label members, the job of exchanging or loading the label members becomes easy.

The present invention according to a sixth exemplary embodiment provides the device of any one of the third to fifth exemplary embodiments, wherein the conveying-path forming means forms a space so as not to come into contact with a range where an image can be formed on an image-formed side of the first label base material in an area ranging from a position at which an image is formed by the image forming means on the conveying path of the first label base material to a position at which the first and second label base materials are joined together by the joining means. That is, since the image-formed surface of the first label base material is bared until the first label base material is joined to the second label base material after an image is formed on the first label base material, the conveying-path forming means is formed so as not to come into contact with the range where the image has been formed. Accordingly, no element is brought into contact with the image-formed surface until the first label base material is joined to the second label base material after an image is formed on the first label base material. Therefore, according to the RFID label producing device according to the sixth exemplary embodiment, since no element is brought into contact with the image-formed surface until the first label base material is joined to the second label base material after an image is formed on the first label base material, the image formed thereon can be kept in an excellent state.

The present invention according to a seventh exemplary embodiment provides a cartridge used for a RFID label, the cartridge capable of being detachably attached to a RFID label producing device that has an image forming means for forming an image on a surface of a label base material, the cartridge comprising: a first holding portion that holds a first label base material which is transparent; a second holding portion that holds a second label base material including at least one of a RFID antenna conductor and an IC chip; a joining part that adjusts the first label base material and the second label base material in a width direction and joins the first and second label base materials together in cooperation with a joining mechanism provided in the RFID label producing device; and a conveying-path forming means for forming a conveying path to convey the first label base material and the second label base material to the joining part, the image forming means of the RFID label producing device being disposed near the conveying path of the first label base material so that an image can be formed on a surface of the first label base material, the surface being joined to the second label base material when the cartridge is mounted in a main body of the RFID label producing device. Since the cartridge is structured in this way, each label base material can be easily carried, and an image can be formed on the surface to be joined to the second label base material of the first label base material when the cartridge is used by being attached to the main body of the RFID label producing device. Therefore, according to the cartridge according to the seventh exemplary embodiment, as mentioned above, each label base material can be easily carried, and an image can be formed on the surface to be joined to the second label base material of the first label base material when the cartridge is used by being attached to the main body of the RFID label producing device, and hence it becomes possible to realize at least one of the fact that the IC chip and other elements included in the RFID label are not damaged and the fact that an image printed on the RFID label is kept in an excellent state.

An eighth exemplary embodiment provides the cartridge according to the seventh exemplary embodiment, wherein the conveying-path forming means forms a space so as not to come into contact with a range where an image can be formed on an image-formed side of the first label base material in an area ranging from a position at which an image is formed by the image forming means on the conveying path of the first label base material to the joining part. According to the cartridge of invention of claim the eighth exemplary embodiment, as in the sixth exemplary embodiment, no element is brought into contact with the image-formed surface until the first label base material is joined to the second label base material after an image is formed on the first label base material, and hence the image formed thereon can be kept in an excellent state.

The second object indicated above may be achieved according to the principle according to a ninth exemplary embodiment, which provides a sheet member used for a RFID label, the sheet member including an information discriminating portion capable of wirelessly discriminating information, the sheet member being shaped like a sheet, the sheet member comprising: an adhesive layer in contact with the information discriminating portion; and a sheet-shaped separation member peelably stacked on the adhesive layer, wherein the sheet member being stacked in an adjusted manner together with other sheet members used for RFID labels. In other words, a plurality of sheet members used for RFID labels are stacked together so that a separation member of a sheet member and an adhesive layer of another sheet member contiguous to the separation member in the thickness direction are brought into contact with each other. Since the separation member is formed peelably from the adhesive layer, the adhesive layer is exposed by separating the separation member therefrom when the sheet member for RFID labels is used.

A tenth exemplary embodiment provides a sheet member used for a RFID label, the sheet member including an information discriminating portion capable of wirelessly discriminating information, the sheet member being shaped like a sheet, the sheet member comprising: an adhesive layer in contact with the information discriminating portion; and a sheet-shaped separation member peelably stacked on the adhesive layer, wherein the sheet member being wound like a roll. In other words, instead of a structure in which a plurality of sheet members used for RFID labels are stacked together in the same way as in the ninth exemplary embodiment, a structure in which a sheet member used for a RFID label is wound like a roll in the same way as in the tenth exemplary embodiment may be employed. Preferably, in this case, the adhesive layer is in contact with the separation member of the sheet member next to the adhesive layer in the thickness direction. The sheet member wound in this way is brought into contact like a roll.

According to the sheet member according to the ninth or tenth exemplary embodiments, at least one of three disadvantages is prevented. One disadvantage is the troublesome job of performing a positional adjustment to remove a deviation from each other in sheet members for RFID labels stacked together in the thickness direction. Another disadvantage is the abrasion caused by friction generated when the sheet member slip out of place. Still another disadvantage is the damage of the sheet member for RFID labels suffered by the occurrence of static electricity. When the sheet member for RFID labels is stored in, for example, the RFID label producing device, the sheet member for RFID labels can be stored even if the storage part is small. If the storage part has the same size, a sheet member for RFID labels greater in volume can be stored. Additionally, articles between the sheet member for RFID labels is placed can be stuck together without applying another adhesive agent onto the sheet member for RFID labels or onto the article whenever the sheet member for RFID labels is stuck onto the article.

An eleventh exemplary embodiment provides the sheet member according to the tenth exemplary embodiment, wherein a plurality of the information discriminating portions are disposed on the adhesive layer. According to the sheet member according to the eleventh exemplary embodiment, a plurality of RFID labels can be produced from one sheet member.

A twelfth exemplary embodiment provides the sheet member according to the ninth or tenth through eleventh exemplary embodiments, respectively, wherein the adhesive layer consists of a first adhesive layer peelably stacked on the separation member and a second adhesive layer placed on a surface of the first adhesive layer which is an opposite surface of the first adhesive layer on which the separation member is placed, and the information discriminating portion is disposed between the first adhesive layer and the second adhesive layer. According to the sheet member according to the twelfth exemplary embodiment, since the information discriminating portion is disposed between the first adhesive layer and the second adhesive layer, each adhesive layer can protect the information discriminating portion, for example, from being damaged.

A thirteenth exemplary embodiment provides the sheet member for RFID levels of according to the twelfth exemplary embodiment, further comprising a base material harder than each of the first and second adhesive layers, the base material being disposed between the first and second adhesive layers. According to the sheet member for RFID labels according to the thirteenth exemplary embodiment, the sheet member for RFID labels can become so strong that its shape is not easily changed even when a compression force or the like is exerted on the sheet member for RFID labels.

A fourteenth exemplary embodiment provides the sheet member of respectively, according to the thirteenth exemplary embodiment, wherein the base material is opaque, and the information discriminating portion is disposed between the base material and the first adhesive layer. According to the sheet member for RFID labels according to the fourteenth exemplary embodiment, the opaque base material can conceal the information discriminating portion from the second adhesive layer.

A fifteenth exemplary embodiment provides the sheet member of any one of the twelfth to fourteenth exemplary embodiments, wherein: the first adhesive layer serves to fix the sheet member used for a RFID label to an article, whereas the second adhesive layer serves to join the sheet member used for a RFID label and a sheet-shaped member substantially equal in width to the sheet member used for a RFID label together while adjusting the sheet member and the sheet-shaped member in a width direction, and only the separation member is separated from the sheet member used for a RFID label when the sheet member used for a RFID label is fixed to the article. Thus, the first adhesive layer is used to fix the sheet member for RFID labels to an article. The second adhesive layer is used to join the sheet member for RFID labels and a sheet-shaped member substantially equal in width to the sheet member together while adjusting the sheet member for RFID labels and the sheet-shaped member in a width direction. Only the separation member is separated from the sheet member for RFID labels when the sheet member for RFID labels is fixed to the article. The phrase "substantially equal" denotes both a case in which the width of the sheet member for RFID labels is exactly equal to that of the sheet-shaped member and a case in which the width of the sheet member for RFID labels is almost equal to that of the sheet-shaped member. According to the sheet member for RFID labels according to the fifteenth exemplary embodiment, the sheet member can be reliably fixed to other articles.

A sixteenth exemplary embodiment provides the sheet member of any one according to ninth through fifteen exemplary embodiments, wherein the sheet member used for a RFID label is contained in any one of an image forming device for forming an identification image on the sheet member, an identification data writing device for writing identification data onto the information discriminating portion, a cartridge attachable to at least one of the image forming device and the identification data writing device, and a wrapper for enclosing the sheet member. According to the sheet member for RFID labels according to the sixteenth exemplary embodiment, in the image forming device, in the identification data writing device, in the cartridge attachable to these devices, or in the wrapper for the sheet member for RFID labels, a containing part or a containing space used to contain the sheet member for RFID labels can be made smaller. Even if the containing part is the same in size, a sheet member for RFID labels greater in volume can be contained therein.

The third object indicated above may be achieved according to the principle according to a seventeenth exemplary embodiment, which provides a sheet member used for a RFID label, wherein a plurality of information discriminating portions that can discriminate information by radio are disposed in the sheet member in a longitudinal direction of the sheet member, and adjoining information discriminating portions of the plurality of information discriminating portions are deviated from each other in a direction perpendicular to the longitudinal direction of the sheet member. According to the invention according to the seventeenth exemplary embodiment, when sheet members are wound or stacked together, information discriminating portions disposed in the sheet member are rarely overlapped with each other in the radial direction of the rolled-up sheet member or in the stack direction, and the quantity or size of a projection of the information discriminating portion protruding from the sheet member is smaller than a case in which the information discriminating portions are not deviated from each other. Therefore, the thickness of the sheet member in the radial direction of the roll-up sheet member or in the stack direction can be made smaller than a case in which the information discriminating portions are not deviated from each other, and hence the whole of the sheet member can be reduced in size.

An eighteenth exemplary embodiment provides a sheet member used for a RFID label, the sheet member being formed by arranging a plurality of information discriminating portions, each of which can discriminate information by radio and is long, in a band-shaped sheet member in a longitudinal direction of the band-shaped sheet member and by winding the band-shaped sheet member like a roll, wherein the plurality of information discriminating portions are arranged to be nonparallel to an axis extending in the longitudinal direction of the sheet member. According to the eighteenth exemplary embodiment, when the band-shaped sheet member is wound like a roll, adjoining information discriminating portions are rarely overlapped with each other in the radial direction of the rolled-up sheet member, and a projection protruding from the band-shaped sheet member can be restricted to a smaller amount than a structure in which the plurality of information discriminating portions are disposed in parallel with the axis extending in the longitudinal direction of the sheet member. Therefore, a space-saving can be achieved.

A nineteenth exemplary embodiment provides the sheet member according to the seventeenth exemplary embodiment, wherein adjoining information discriminating portions of the plurality of information discriminating portions are disposed axisymmetrically with respect to a center axis between the adjoining information discriminating portions. According to the nineteenth exemplary embodiment, adjoining information discriminating portions are more rarely overlapped with each other, and a larger space-saving can be achieved.

A twentieth exemplary embodiment provides a sheet member used for a RFID label, wherein a plurality of information discriminating portions each of which consists of a RFID element and a RFID antenna conductor are arranged in a band-shaped sheet member in a longitudinal direction of the band-shaped sheet member, the plurality of information discriminating portions being deviated from each other in a direction perpendicular to the longitudinal direction of the sheet member. According to the twentieth exemplary embodiment, RFID elements having a greater thickness among the RFID elements are disposed to be deviated from each other. Therefore, when the band-shaped sheet member is wound or the sheet members are stacked together, the information discriminating portions disposed in the band-shaped sheet member are never overlapped with each other in the radial direction of the rolled-up sheet member or in the stack direction. Therefore, compared to a structure in which the information discriminating portions are not deviated from each other, since the quantity or size of a projection of the information discriminating portion protruding from the sheet member is smaller, the thickness of the sheet member in the radial direction of the rolled-up sheet member or in the stack direction can be made smaller, and hence the whole of the sheet member can be reduced in size.

A twenty-first exemplary embodiment provides a sheet member used for a RFID label in which a plurality of holding sheet members each of which holds an information discriminating portion capable of discriminating information by radio are stacked together, wherein the plurality of holding sheet members are stacked together so that positions of the information discriminating portions of the holding sheet members facing each other differ from each other in a plane perpendicular to a direction in which the plurality of holding sheet members are stacked together. According to the twenty-first exemplary embodiment, the information discriminating portions disposed in the stacked holding sheet members are never overlapped with each other in the stack direction, and the thickness of the whole of the stacked holding sheet members becomes smaller than a structure in which the positions of the information discriminating portions coincide with each other in a plane perpendicular to the stack direction. Therefore, a space-saving can be achieved.

A twenty-second exemplary embodiment provides the sheet member according to the seventeenth. eighteenth, twentieth, and twenty-first exemplary embodiments, wherein the sheet member used for a RFID label is contained in any one of an image forming device for forming an identification image on the sheet member, an identification data writing device for writing identification data onto the information discriminating portion, a cartridge attachable to at least one of the image forming device and the identification data writing device, and a wrapper for enclosing the sheet member. According to the twenty-second exemplary embodiment, since the sheet member for RFID labels of any one of the seventeenth through twenty-first exemplary embodiments is contained as a material of the RFID label, the information discriminating portion never protrudes from the band-shaped sheet member, and the thickness of the whole of the band-shaped sheet member can be reduced, thus creating spatial effectiveness.

The fourth object indicated above may be achieved according to the principle of the a twenty-third exemplary embodiment, which provides a device for producing a RFID label, the device comprising:an image forming means for forming an image on an image-formed object; and a conveying means for joining a sheet member having an information discriminating portion capable of discriminating information by radio and the image-formed object on which an image has been formed by the image forming means together while conveying the sheet member, wherein a pressure absorbing means for absorbing a pressing force exerted on the information discriminating portion of the sheet member is formed on a contact surface of the conveying means with which the sheet member is brought into contact. According to the twenty-third exemplary embodiment, the pressure absorbing means for absorbing a pressing force exerted on the information discriminating portion of the sheet member is formed on a contact surface of the conveying means with which the sheet member is brought into contact, and an excessive pressing force is never exerted on the information discriminating portion. Therefore, a circuit in the information discriminating portion is not short-circuited, and there is no fear that a change in quality of the information discriminating portion caused by pressure against the information discriminating portion will bring about the loss or crash of identification data stored in the information discriminating portion, and that the information discriminating portion will be destroyed.

A twenty-fourth exemplary embodiment provides the device according to the twenty-third exemplary embodiment, wherein the conveying means comprises a pair of rollers, and the pressure absorbing means is a plurality of concave parts formed in a roller surface of at least one of the pair of rollers over an entire periphery of the roller. According to the twenty-third exemplary embodiment, since the plurality of concave parts by which a pressing force against the information discriminating portion of the sheet member is absorbed are formed in a roller surface of at least one of the pair of rollers, the information discriminating portion never comes into contact with the roller surface, and an excessive pressing force is not exerted on the information discriminating portion. Therefore, advantageously, a circuit in the information discriminating portion is not short-circuited, and there is no fear that a change in quality of the information discriminating portion caused by pressure against the information discriminating portion will bring about the loss or crash of identification data stored in the information discriminating portion, and that the information discriminating portion will be destroyed.

A twenty-fifth exemplary embodiment provides the device according to the twenty-third exemplary embodiment, wherein the conveying means comprises a pair of rollers, and the pressure absorbing means is an elastic body disposed on a roller surface of at least one of the pair of rollers, the elastic body being elastically deformable in accordance with the shape of a swell of a sheet surface of the sheet member. According to the twenty-fifth exemplary embodiment, since the elastic body elastically deformable in accordance with the shape of a swell of the sheet surface of the sheet member is formed on the roller surface of at least one of the pair of rollers, a pressing force is absorbed by the elastic body that is deformed by being pressed by the information discriminating portion, and an excessive pressing force is never exerted on the information discriminating portion. Therefore, advantageously, a circuit in the information discriminating portion is not short-circuited, and there is no fear that a change in quality of the information discriminating portion caused by pressure against the information discriminating portion will bring about the loss or crash of identification data stored in the information discriminating portion, and that the information discriminating portion will be destroyed.

A twenty-sixth exemplary embodiment provides the device according to the twenty-fourth or twenty-fifth exemplary embodiments, wherein the pair of rollers are disposed at a discharge portion from which the band-shaped sheet member is discharged outwardly. According to the twenty-sixth exemplary embodiment, since the RFID label has its maximum thickness when the RFID label is finally produced and when the pair of rollers discharge the RFID label outwardly, the pair of rollers are disposed at the discharge portion from which the RFID label is discharged outwardly. Therefore, with even greater effect, identification data can be prevented from being lost by a change in quality of the information discriminating portion included in the RFID label having a maximum thickness, and the information discriminating portion can be prevented from being destroyed.

A twenty-seventh exemplary embodiment provides the device according to any one of the twenty-third through twenty-sixth exemplary embodiments, wherein the image forming means is a thermal head that forms an image on the image-formed object with heat or an ink jet head that forms an image on the image-formed object by discharging ink. According to the twenty-seventh exemplary embodiment, the RFID label producing device that uses either a thermal head or an ink jet head as the image forming means never has a printing problem caused by a swell or projection of the information discriminating portion, and can excellently perform printing.

A twenty-eighth exemplary embodiment provides a device for producing a RFID label comprising:

an image forming means having a thermal head or an ink jet head for forming an image on an image-formed object having an information discriminating portion capable of discriminating information by radio; and a platen facing the image forming means and coming into contact with the image-formed object in order to allow the image-formed object to move along the thermal head or the ink jet head, wherein the platen is provided with at least one of an elastic body and a concave part used to absorb a pressing force between the information discriminating portion and the thermal head or the ink jet head by being elastically deformed by the information discriminating portion of the image-formed object or used to reduce the approach of the image-formed object and the thermal head or the ink jet head to each other caused by the information discriminating portion. According to the twenty-eighth exemplary embodiment, when an image is formed directly onto an image-formed object having the information discriminating portion, the platen is provided with at least one of an elastic body and a concave part used to absorb a pressing force between the information discriminating portion and the thermal head or the ink jet head or used to reduce the approach of the image-formed object and the thermal head or the ink jet head to each other caused by the information discriminating portion. Therefore, an excessive pressing force is never exerted on the information discriminating portion of the image-formed object that has the information discriminating portion, and an excessive approach does not arise between the image-formed object and the thermal head or the ink jet head. Therefore, in the RFID label producing device that uses either the thermal head or the ink jet head as the image forming means that does not have a fear that a circuit in the information discriminating portion will be short-circuited or a fear that a change in quality of the information discriminating portion caused by pressure against the information discriminating portion will bring about the loss or crash of identification data stored in the information discriminating portion or fear that the information discriminating portion will be destroyed, a printing problem resulting from a swell or projection of the information discriminating portion never occurs, and an image can be excellently formed. Additionally, an image is formed on the image-formed object by either the thermal head or the ink jet head serving as the image forming means.

A twenty-ninth exemplary embodiment provides a cartridge comprising: a holding portion that holds a sheet member having an information discriminating portion capable of discriminating information by radio and the image-formed object in a state in which each of the sheet member and the image-formed object is wound like a roll respectively; a conveying path to convey the sheet member and the image-formed object along mutually different paths from the holding portion to a stack position at which the sheet member and the image-formed object are stacked together; an insertion hole formed in the conveying path of the image-formed object, the insertion hole used to insert the image forming means provided on the side of the RFID label producing device; and a roller disposed at the stack position on the side of an end of the conveying path, the roller stacking the sheet member and the image-formed object together while conveying the sheet member and the image-formed object in cooperation with a roller provided in the RFID label producing device, wherein formed is a pressure absorbing means for absorbing a pressing force exerted on the information discriminating portion of the sheet member on a roller surface of the roller. According to the twenty-ninth exemplary embodiment, when a RFID label is produced by detachably attaching the cartridge for RFID labels having the pressure absorbing means for absorbing a pressing force exerted on the information discriminating portion of the sheet member formed on the roller surface of the roller to the RFID label producing device, an excessive pressing force is never exerted on the information discriminating portion because the pressure absorbing means for absorbing a pressing force exerted on the information discriminating portion of the sheet member is formed on the contact surface of the conveying means with which the sheet member is brought into contact. Therefore, advantageously, a circuit in the information discriminating portion is not short-circuited, and there is no fear that a change in quality of the information discriminating portion caused by pressure against the information discriminating portion will bring about the loss or crash of identification data stored in the information discriminating portion, and that the information discriminating portion will be destroyed.

A thirtieth exemplary embodiment provides the cartridge according to the twenty-ninth exemplary embodiment, wherein the pressure absorbing means comprises a plurality of concave parts formed in the roller over an entire periphery of the roller surface of the roller. As in the twenty-ninth exemplary embodiment, according to the thirtieth exemplary embodiment, since the plurality of concave parts by which a pressing force exerted on the information discriminating portion of the sheet member is absorbed are formed in the roller surface of at least one of the pair of rollers, the information discriminating portion never comes into contact with the roller surface, and an excessive pressing force is never exerted on the information discriminating portion. Therefore, advantageously, a circuit in the information discriminating portion is not short-circuited, and there is no possibility that a change in quality of the information discriminating portion caused by pressure against the information discriminating portion will bring about the loss or crash of identification data stored in the information discriminating portion, and that the information discriminating portion will be destroyed.

A thirty-first exemplary embodiment provides the cartridge according to the twenty-ninth exemplary embodiment, wherein the pressure absorbing means comprises an elastic body that is elastically deformed in accordance with the shape of a swell of a sheet surface of the sheet member. As in the twenty-ninth exemplary embodiment, according to the thirty-first exemplary embodiment, since the elastic body that is elastically deformable in accordance with the shape of a swell or projection of the sheet surface of the sheet member is used as the pressure absorbing means, an pressing force is absorbed by allowing the information discriminating portion to press the elastic body, and an excessive pressing force is never exerted on the information discriminating portion. Therefore, advantageously, a circuit in the information discriminating portion is not short-circuited, and there is no possibility that a change in quality of the information discriminating portion caused by pressure against the information discriminating portion will bring about the loss or crash of identification data stored in the information discriminating portion, and that the information discriminating portion will be destroyed.

The fifth object indicated above may be achieved according to the principle of a thirty-second exemplary embodiment, which provides a RFID label comprising: a to-be-printed tape layer on which predetermined print characters are printed; a tag tape base layer used to dispose a RFID circuit element; a gluing adhesive layer used to glue the tag tape base layer onto the to-be-printed tape layer; a fixing adhesive layer used to fix the RFID circuit element to the tag tape base layer; an affixing adhesive layer provided to affix the RFID circuit element onto a specified object; and a separation material layer with which the affixing adhesive layer is covered, the separation material layer disposed peelably from the affixing adhesive layer. In the-thirty-second exemplary embodiment, the fixing adhesive layer to fix the RFID circuit element to the tag tape base layer is newly provided in addition to the gluing adhesive layer by which the to-be-printed tape layer and the tag tape base layer are glued together and the affixing adhesive layer with which the separation material layer is covered (in other words, at least three adhesive layers are provided). As a result, the adhesive force of the gluing adhesive layer or that of the affixing adhesive layer is never impaired. Additionally, since the entire thickness of the gluing adhesive layer or that of the affixing adhesive layer performs a shock absorbing function when pressure is applied thereonto, the RFID circuit element can be prevented from being damaged. Additionally, since the fixing adhesive layer is disposed closer to the separation material layer than the tag tape base layer, the RFID circuit element cannot be seen from the side of the label surface by the tag tape base layer serving as a blindfold, and hence the RFID circuit element can avoid baring its external appearance.

A thirty-third exemplary embodiment provides the RFID label according to the thirty-second exemplary embodiment, further comprising an intermediate tag tape base layer provided between the tag tape base layer and the separation material layer. Therefore, it is possible to realize a RFID label having a layered structure including the intermediate tag tape base layer placed between the tag tape base layer and the separation material layer.

The object indicated above may be achieved according to the principle according to a thirty-fourth exemplary embodiment, which provides a tag tape comprising: a to-be-printed tape layer on which predetermined print characters are printed; a tag tape base layer provided to dispose a plurality of RFID circuit elements in a longitudinal direction with predetermined intervals; a gluing adhesive layer provided to glue the tag tape base layer onto the to-be-printed tape layer; a fixing adhesive layer provided to fix the RFID circuit element to the tag tape base layer; an affixing adhesive layer provided to affix the RFID circuit element onto a specified object; and a separation material layer with which the affixing adhesive layer is covered, the separation material layer disposed peelably from the affixing adhesive layer. In the thirty-fourth exemplary embodiment, the fixing adhesive layer to fix the RFID circuit element to the tag tape base layer is newly provided in addition to the gluing adhesive layer by which the to-be-printed tape layer and the tag tape base layer are glued together and the affixing adhesive layer with which the separation material layer is covered (in other words, at least three adhesive layers are provided). As a result, the adhesive force of the gluing adhesive layer or that of the affixing adhesive layer is never impaired. Additionally, since the entire thickness of the gluing adhesive layer or that of the affixing adhesive layer performs a shock absorbing function when pressure is applied thereonto, the RFID circuit element can be prevented from being damaged. Additionally, since the fixing adhesive layer is disposed closer to the separation material layer than the tag tape base layer, the RFID circuit element cannot be seen from the side of the label surface by the tag tape base layer serving as a blindfold after the label is produced, and hence the RFID circuit element can avoid baring its external appearance.

A thirty-fifth exemplary embodiment provides the tag tape according to the thirty-fourth exemplary embodiment, further comprising an intermediate tag tape base layer provided between the tag tape base layer and the separation material layer. Therefore, it is possible to realize a tag tape having a layered structure including the intermediate tag tape base layer placed between the tag tape base layer and the separation material layer.

The object indicated above may be achieved according to the principle according to a thirty-sixth exemplary embodiment, which provides a tag tape roll formed by winding a tag tape around an axis substantially perpendicular to a longitudinal direction of the tape, the tag tape comprising: a to-be-printed tape layer on which predetermined print characters are printed; a tag tape base layer provided to dispose a plurality of RFID circuit elements in a longitudinal direction with predetermined intervals; a gluing adhesive layer provided to glue the tag tape base layer onto the to-be-printed tape layer; a fixing adhesive layer provided to fix the RFID circuit element to the tag tape base layer; an affixing adhesive layer provided to affix the RFID circuit element onto a specified object; and a separation material layer with which the affixing adhesive layer is covered, the separation material layer disposed peelably from the affixing adhesive layer. According to the thirty-sixth exemplary embodiment, in the tag tape, the fixing adhesive layer to fix the RFID circuit element to the tag tape base layer is newly provided in addition to the gluing adhesive layer by which the to-be-printed tape layer and the tag tape base layer are glued together and the affixing adhesive layer with which the separation material layer is covered (in other words, at least three adhesive layers are provided). As a result, the adhesive force of the gluing adhesive layer or that of the affixing adhesive layer is never impaired. Additionally, since the entire thickness of the gluing adhesive layer or that of the affixing adhesive layer performs a shock absorbing function when pressure is applied thereonto, the RFID circuit element can be prevented from being damaged. Additionally, since the fixing adhesive layer is disposed closer to the separation material layer than the tag tape base layer, the RFID circuit element cannot be seen from the side of the surface thereof by the tag tape base layer serving as a blindfold, and hence the RFID circuit element can avoid baring its external appearance.

A thirty-seventh exemplary embodiment provides the tag tape roll according to the thirty-sixth exemplary embodiment, wherein the gluing adhesive layer, the fixing adhesive layer, and the affixing adhesive layer are formed by being properly selected so as to have desired adhesive characteristics. For example, the gluing adhesive layer selectively uses a proper adhesive agent having adhesive characteristics suitable for this adhesive layer in consideration of adhesive properties with respect to the to-be-printed tape layer and the tag tape base layer. The fixing adhesive layer selectively uses a proper adhesive agent having adhesive characteristics suitable for this adhesive layer in consideration of adhesive properties with respect to the tag tape base layer, the RFID circuit element, and the affixing adhesive layer. The affixing adhesive layer selectively uses a proper adhesive agent having adhesive characteristics suitable for this adhesive layer in consideration of adhesive properties with respect to the RFID circuit element, the fixing adhesive layer, and an object (label-stuck body) onto which a label is affixed. As a result, the quality as the tag tape can be improved.

A thirty-eighth exemplary embodiment provides the tag tape roll according to the thirty-sixth or thirty-seventh exemplary embodiments, wherein at least two of the gluing adhesive layer, the fixing adhesive layer, and the affixing adhesive layer are formed to differ from each other in adhesive characteristics. Therefore, it becomes possible to individually use a proper adhesive agent having adhesive characteristics suitable for the adhesive layer, and the quality as the tag tape can be improved.

A thirty-ninth exemplary embodiment provides the tag tape roll according to the thirty-sixth or thirty-seventh exemplary embodiments, wherein the gluing adhesive layer, the fixing adhesive layer, and the affixing adhesive layer are formed to have substantially the same adhesive force. Therefore, it becomes possible to realize a low-cost, general-purpose tag tape in which all adhesive layers have substantially the same structure and substantially the same adhesive properties.

A fortieth exemplary embodiment provides the tag tape roll according to the thirty-sixth exemplary embodiment, wherein the tag tape roll has an intermediate tag tape base layer provided between the tag tape base layer and the separation material layer. Therefore, it is possible to realize a tag tape having a layered structure including the intermediate tag tape base layer placed between the tag tape base layer and the separation material layer.

A forty-first exemplary embodiment provides the tag tape roll according to the fortieth exemplary embodiment, wherein the tag tape roll has an intermediate adhesive layer placed between the fixing adhesive layer and the intermediate tag tape base layer. Therefore, it is possible to realize a tag tape having a layered structure including the intermediate tag tape base layer placed between the tag tape base layer and the separation material layer and including the intermediate adhesive layer placed between the intermediate tag tape base layer and the fixing adhesive layer.

A forty-second exemplary embodiment provides the tag tape roll according to the forty-first exemplary embodiment, wherein the gluing adhesive layer, the fixing adhesive layer, the intermediate adhesive layer, and the affixing adhesive layer are formed by being properly selected so as to have desired adhesive characteristics. For example, the gluing adhesive layer selectively uses a proper adhesive agent having adhesive characteristics suitable for this adhesive layer in consideration of adhesive properties with respect to the to-be-printed tape layer and the tag tape base layer. The fixing adhesive layer selectively uses a proper adhesive agent having adhesive characteristics suitable for this adhesive layer in consideration of adhesive properties with respect to the tag tape base layer, the RFID circuit element, and the intermediate adhesive layer. The intermediate adhesive layer selectively uses a proper adhesive agent having adhesive characteristics suitable for this adhesive layer in consideration of adhesive properties with respect to the RFID circuit element, the fixing adhesive layer, and the intermediate tag tape base layer. The affixing adhesive layer selectively uses a proper adhesive agent having adhesive characteristics suitable for this adhesive layer in consideration of adhesive properties with respect to the intermediate tag tape base layer and an object onto which a label is affixed. As a result, the quality as the tag tape can be improved.

A forty-third exemplary embodiment provides the tag tape roll according to the forty-first or forty-second exemplary embodiments, wherein at least two of the gluing adhesive layer, the fixing adhesive layer, the intermediate adhesive layer, and the affixing adhesive layer are formed to differ from each other in adhesive characteristics. Therefore, it becomes possible to individually use a proper adhesive agent having adhesive characteristics suitable for the adhesive layer, and the quality as the tag tape can be improved.

A forty-fourth exemplary embodiment provides the tag tape roll according to the thirty-sixty or forty-first exemplary embodiments, wherein the gluing adhesive layer, the fixing adhesive layer, the intermediate adhesive layer, and the affixing adhesive layer are formed to have substantially the same adhesive force. Therefore, it becomes possible to realize a low-cost, general-purpose tag tape in which all adhesive layers have substantially the same structure and substantially the same adhesive properties.

A forty-fifth exemplary embodiment provides the tag tape roll according to the thirty-seventh or forty-second exemplary embodiments, wherein the affixing adhesive layer is formed to become weaker in adhesive force than the other adhesive layers. As a result, it is possible to produce a reusable label capable of being re-peeled off without being broken after having once been stuck.

A forty-sixth exemplary embodiment provides the tag tape roll according to the thirty-seventh or forty-second exemplary embodiment, wherein the affixing adhesive layer is formed to become stronger in adhesive force than the other adhesive layers. As a result, it is possible to produce an affixing label that is not easily peeled off after having once been stuck, i.e., produce an affixing label that has the property of being broken when peeled off.

A forty-seventh exemplary embodiment provides the tag tape roll according to the thirty-seventh exemplary embodiment, wherein the gluing adhesive layer or the fixing adhesive layer is formed to become weaker in cohesive force than the other adhesive layers. As a result, when a produced label receives a force in a direction in which the label is peeled off, the gluing adhesive layer or the fixing adhesive layer spontaneously separates and breaks into pieces, and hence the remaining parts other than these, in particular, the RFID circuit element, can be prevented from being destroyed. That is, it becomes possible to realize a security tape capable of storing internal information.

A forty-eighth exemplary embodiment provides the tag tape roll according to the forty-second exemplary embodiment, wherein the gluing adhesive layer or the fixing adhesive layer or the intermediate adhesive layer is formed to become stronger in adhesive force than the other adhesive layers. As a result, when a produced label receives a force in a direction in which the label is peeled off, the gluing adhesive layer or the fixing adhesive layer or the intermediate adhesive layer spontaneously separates and breaks into pieces, and hence the remaining parts other than these, in particular, the RFILD circuit element, can be prevented from being destroyed. That is, it becomes possible to realize a security tape capable of storing internal information.

A forty-ninth exemplary embodiment provides the tag tape roll of any one of the thirty-sixth to forty-eighth exemplary embodiments, wherein at least one of the gluing adhesive layer and the fixing adhesive layer is formed by an adhesive agent colored in desired color. If the to-be-printed tape layer is optically transmissible, the color of the adhesive agent is visually shown as the color of the tag tape and as the color of the label without being changed. Therefore, a tag tape and a label having a more colorful color can be produced by coloring the gluing adhesive layer, and the RFID circuit element disposed on the reverse side can be reliably blinded from view. The fixing adhesive layer may be colored.

A fiftieth exemplary embodiment provides the tag tape roll of any one of the thirty-sixth to forty-ninth exemplary embodiments, wherein a thickness of the affixing adhesive layer is set at $\lambda/50$ or more where $\lambda$ is a wavelength of a communication frequency of the RFID circuit element. An adverse influence to be exerted on a radio-wave sending and receiving function of the RFID circuit element can be reduced or prevented by setting the thickness of the affixing adhesive layer at $\lambda/50$ or more, which is relatively thick, where $\lambda$ is a wavelength of a communication frequency even when the produced RFID label is affixed to a metallic object.

A fifty-first exemplary embodiment provides the tag tape roll of any one of the thirty-sixth to fiftieth exemplary embodiments, wherein an attracting magnetic layer is provided instead of the separation material layer, and an attaching adhesive layer to attach the magnetic layer to the fixing adhesive layer is provided instead of the affixing adhesive layer, the attaching adhesive layer being placed between the magnetic layer and the fixing adhesive layer. As a result, a produced RFID label can be attached to a specified object with the magnetic layer therebetween.

A fifty-second exemplary embodiment provides the tag tape roll of any one of the thirty-sixth to fiftieth exemplary embodiments, wherein a detachable element is provided instead of the separation material layer, and an attaching adhesive layer to attach the detachable element to the fixing adhesive layer is provided instead of the affixing adhesive layer, the attaching adhesive layer being placed between the detachable element and the fixing adhesive layer. As a result, a produced RFID label can be attached to a specified object with the detachable element therebetween, and can be detached therefrom.

A fifty-third exemplary embodiment provides the tag tape roll of any one of the fortieth to forty-third exemplary embodiments, wherein the affixing adhesive layer and the separation material layer are omitted, and the intermediate tag tape base layer is placed as an outermost layer. Therefore, it is possible to produce a card-type RFID tag without the premise that the tag is stuck.

BRIEF DESCRIPTION OF THE DRAWINGS

FIGS. 12A, 12B, 12C, and 12D show a band-shaped sheet member of another embodiment being extended by drawing an end of the sheet member, FIG. 12A being a perspective view showing an arrangement pattern of an information discriminating portion, FIGS. 12B to 12D being schematic plan views, each showing an example of another arrangement pattern.

BEST MODE FOR CARRYING OUT THE INVENTION

A RFID label producing device 1 and other components according to an embodiment of the present invention will be hereinafter described in detail with reference to the attached drawings.

First Embodiment

Figure 1:
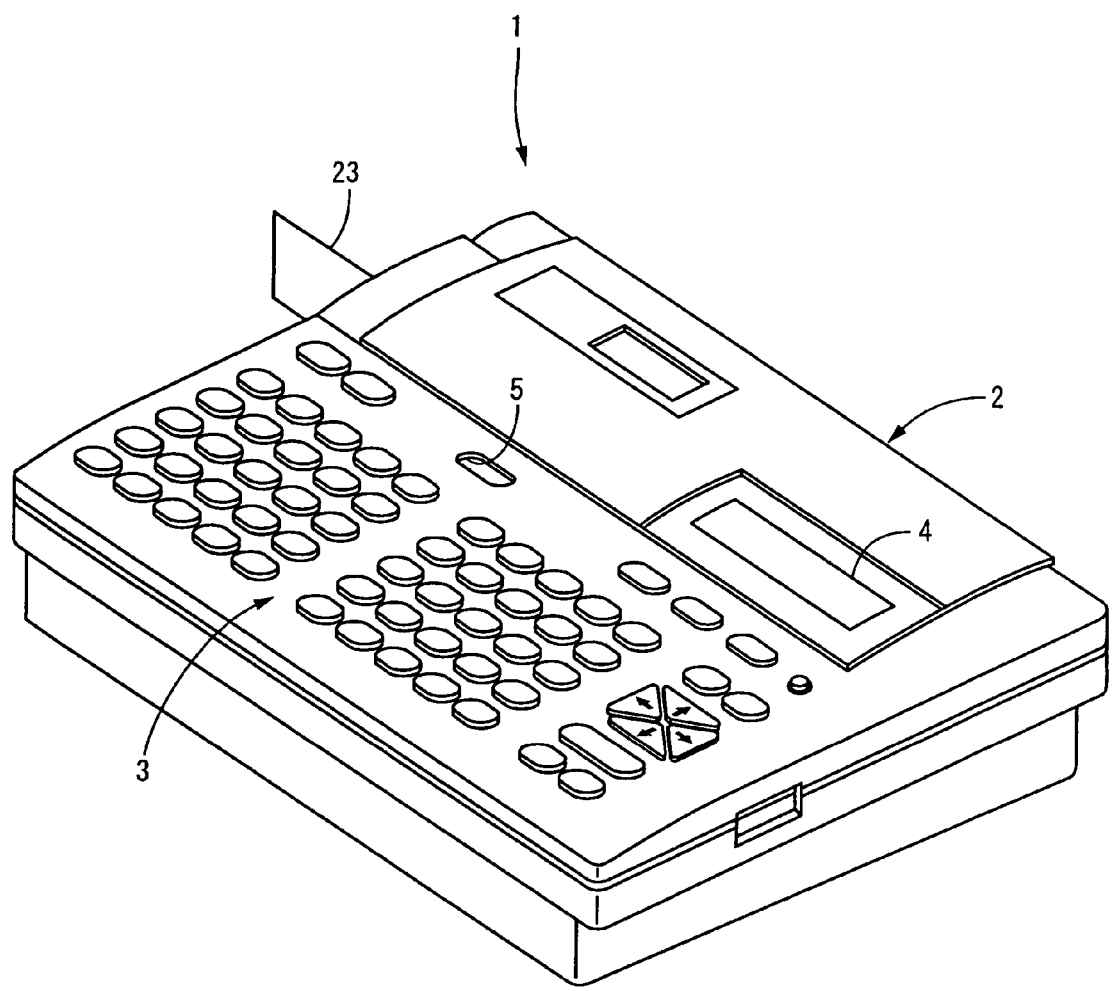
FIG. 1 is an overall view of a device for producing a RFID label.

FIG. 1 is a perspective view showing the whole of a RFID label producing device 1 for producing a RFID label 70 called a RFID tag, for example.

Figure 2:
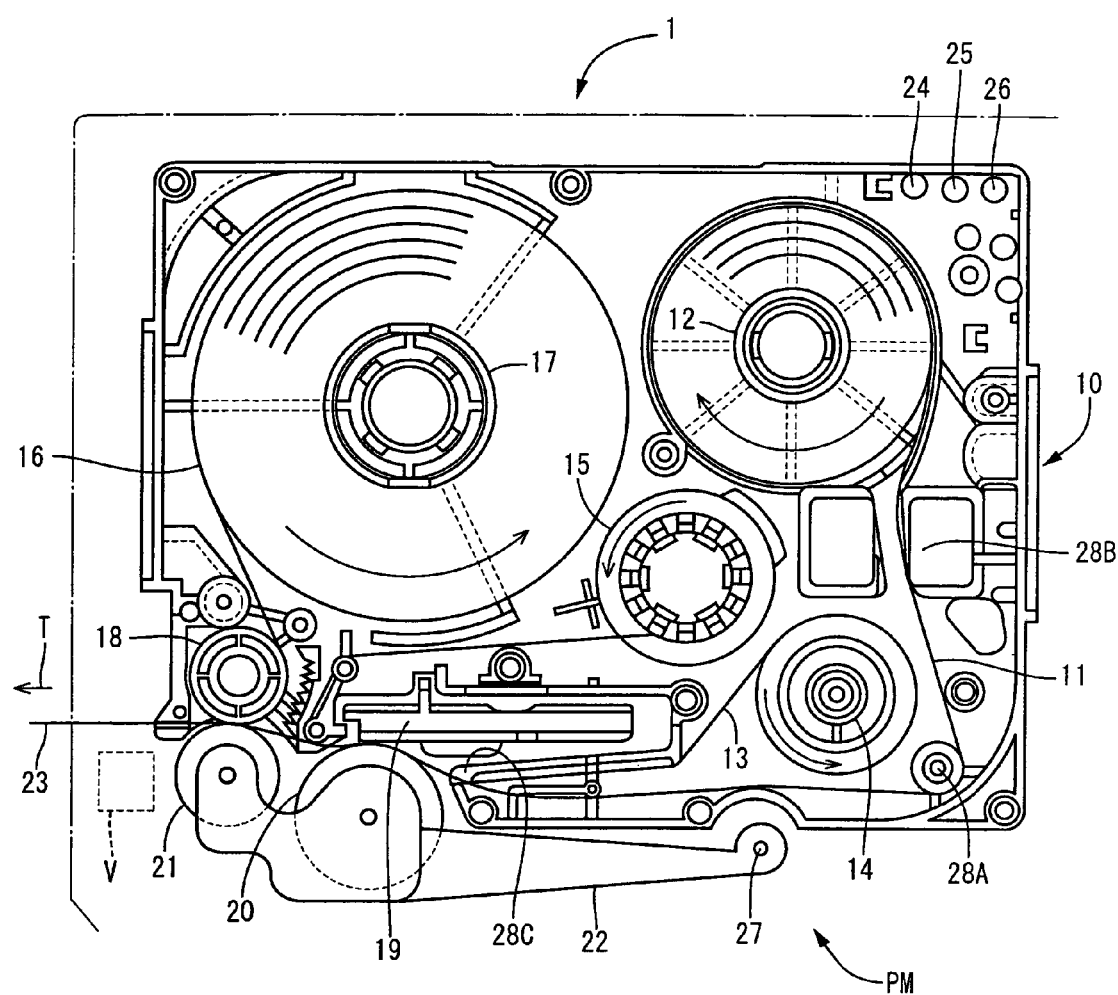
FIG. 2 depicts a cartridge and a thermal printing mechanism part by opening a cover case of the RFID label producing device of FIG. 1, in which an upper surface wall of the cartridge is cut to show the inside of the cartridge.

In FIG. 1, a keyboard 3 is disposed at the front part of the RFID label producing device 1. A thermal printing mechanism PM (see FIG. 2) corresponding to an image forming means of the present invention is disposed inside the RFID label producing device 1 and behind the keyboard 3. A cover case 2 that can be opened and closed to exchange a cartridge 10 shown in FIG. 2 is disposed behind the keyboard 3. The cover case 2 has a display 4, such as a liquid crystal display (LCD), on which characters or symbols input by the keyboard 3 are displayed. An operating knob 5 that is operated to open the cover case 2 is disposed between the cover case 2 and the keyboard 3.

The keyboard 3 has character keys used to input alphabetical letters, numerals, and marks, space keys, end-of-line keys, cursor moving keys used to move a cursor from right to left or up and down, typical-label producing keys used to easily produce a label that is produced with great frequency, editing keys, such as execution keys and cancel keys, print keys used to command printing, power keys used to turn a power source on or off, etc.

FIG. 2 is an enlarged view of the cartridge 10 and the thermal printing mechanism PM that appear by opening the cover case 2. The inside of the cartridge 10 is shown by removing its upper surface wall.

In FIG. 2, the cartridge 10 shaped like a rectangular box is detachably attached to the RFID label producing device 1.

The cartridge 10 includes, for example, a tape spool 12 on which a laminate tape 11, which is a transparent resin film or a translucent colored resin film made of PET (polyethylene terephthalate), is wound like a roll, a ribbon spool 14 on which an ink ribbon 13 is wound, a ribbon take-up spool 15 that takes up the ink ribbon 13, a feed spool 17 on which a band-shaped sheet member 16, which is substantially the same in width as the laminate tape 11 and which has an antenna conductor 63, an IC chip 64, a resonance circuit, etc., is wound like a roll, and a tape feed roller 18 and a sub-roller 21 that are used as a pair and that press or nip the laminate tape 11 and the band-shaped sheet member 16 between the tape feed roller 18 and the sub-roller 21 so as to cause them to adhere to each other. The tape spool 12, the ribbon spool 14, the ribbon take-up spool 15, the feed spool 17, the tape feed roller 18, and the sub-roller 21 are rotatably provided.

In this embodiment, the laminate tape 11 functions as a first label base material, the band-shaped sheet member 16 functions as a second label base material, the tape spool 12 functions as a first holding portion, the feed spool 17 functions as a second holding portion, and the tape feed roller 18 and the sub-roller 21, which are used as a pair, function as a conveying means or an adhering means.

The cartridge 10 is provided with a guide roller 28A and guide walls 28B and 28C that correspond to a conveying-path forming means for forming a conveying path used to convey a tape from the tape spool 12 of the laminate tape 11 to the tape feed roller 18. The laminate tape 11 is conveyed to the position of the tape feed roller 18 without coming into contact with the band-shaped sheet member 16 while following a course regulated by the guide roller 28A and the guide walls 28B and 28C.

The ribbon spool 14 and the ribbon take-up spool 15 are disposed on the back side of the laminate tape 11, i.e., on the side where the laminate tape 11 is adhered to the band-shaped sheet member 16. Accordingly, the laminate tape 11 and the ink ribbon 13 are superposed on each other and are sandwiched between a rotatable platen 20 and a thermal head 19 erected on the body of the RFID label producing device 1.

The platen 20 and the sub-roller 21 are rotatably supported by a roller supporter 22, and a bias is given toward the thermal head 19 and the sub-roller 21 when the RFID label 70 is produced. The band-shaped sheet member 16 and the laminate tape 11 contained in the cartridge 10 are rotated while being held between the sub-roller 21 and the tape feed roller 18, so that the sub-roller 21 feeds the tape while allowing the laminate tape 11 and the band-shaped sheet member 16 to adhere to each other.

When the cartridge 10 is detached, the roller supporter 22 is rotated on a supporting shaft 27, and the platen 20 and the sub-roller 21 supported by the roller supporter 22 recede from the cartridge 10. When the RFID label 70 shown in FIG. 4C is produced after the cartridge 10 is attached, the platen 20 and the sub-roller 21 are urged toward the cartridge 10, and are brought into contact with the cartridge 10, i.e., reach the state of FIG. 2.

Therefore, when the elements contained in the cartridge 10, i.e., the laminate tape 11, the band-shaped sheet member 16, and the ink ribbon 13 run out, or when the width or kind of the tape is changed, such a replenishment or change can be easily made by allowing a user of the RFID label producing device 1 to exchange the cartridge 10.

The thermal head 19 has a plurality of heater elements, e.g., 128 heater elements (not shown) arranged in the upward and downward directions, i.e., in the width direction of the laminate tape 11. A range where an image can be formed by the thermal head 19 is determined in accordance with the tape width of the laminate tape 11. For example, this range is a part corresponding to the width dimension of the laminate tape 11 that is stuck in an area specified between two alternate-long-and-two-short-dashes lines shown in FIG. 6.

When the RFID label 70 is produced, a tape feed motor 36 (see FIG. 3) is first driven in a predetermined rotational direction by driving the RFID label producing device 1. Thereafter, the tape feed roller 18 and the ribbon take-up spool 15 are synchronously driven in a predetermined winding rotational direction through a gear mechanism (not shown) by driving the tape feed motor 36 in this way. The rotational direction of the ribbon take-up spool 15 is shown by the arrow of FIG. 2.

The heater elements of the thermal head 19 are energized in accordance with the conveyance of the laminate tape 11, and characters and marks (including bar codes) are printed on the back surface of the laminate tape 11 by a plurality of dot arrays printed by the heater elements. Thereafter, the band-shaped sheet member 16 is adhered to the back surface of the laminate tape 11, so that a RFID label 23 extending like a tape is produced. The RFID label 23 is then sent in a tape feed direction T, and is discharged out of the RFID label producing device 1 as shown in FIG. 1 and FIG. 2. The RFID label 23 is then cut into RFID labels 70 by a cutter (not shown). Since the details of the thermal printing mechanism PM are known from a conventional technique (see Japanese Published Unexamined Patent Application No. H2-106555, for example), a description of this mechanism is omitted here.

The laminate tape 11 wound on the tape spool 12 that has a predetermined tape width or spool width (for example, one of five kinds of widths 6 mm, 9 mm, 12 mm, 18 mm, and 24 mm) is beforehand placed in the cartridge 10. Three detection holes 24, 25, and 26 are formed in the bottom wall of the cartridge 10. The detection holes 24, 25, and 26 are closed according to different combinations of the detection holes so that the tape width, which is one of the five kinds, can be detected. A cassette sensor 30 (see FIG. 3), which outputs tape cassette information by detecting the width or kind of the tape from a combination of the detection holes 24, 25, and 26 any one of which is open or closed, is attached to a part of the RFID label producing device 1 supporting the lower side of the cartridge 10.

Figure 3:
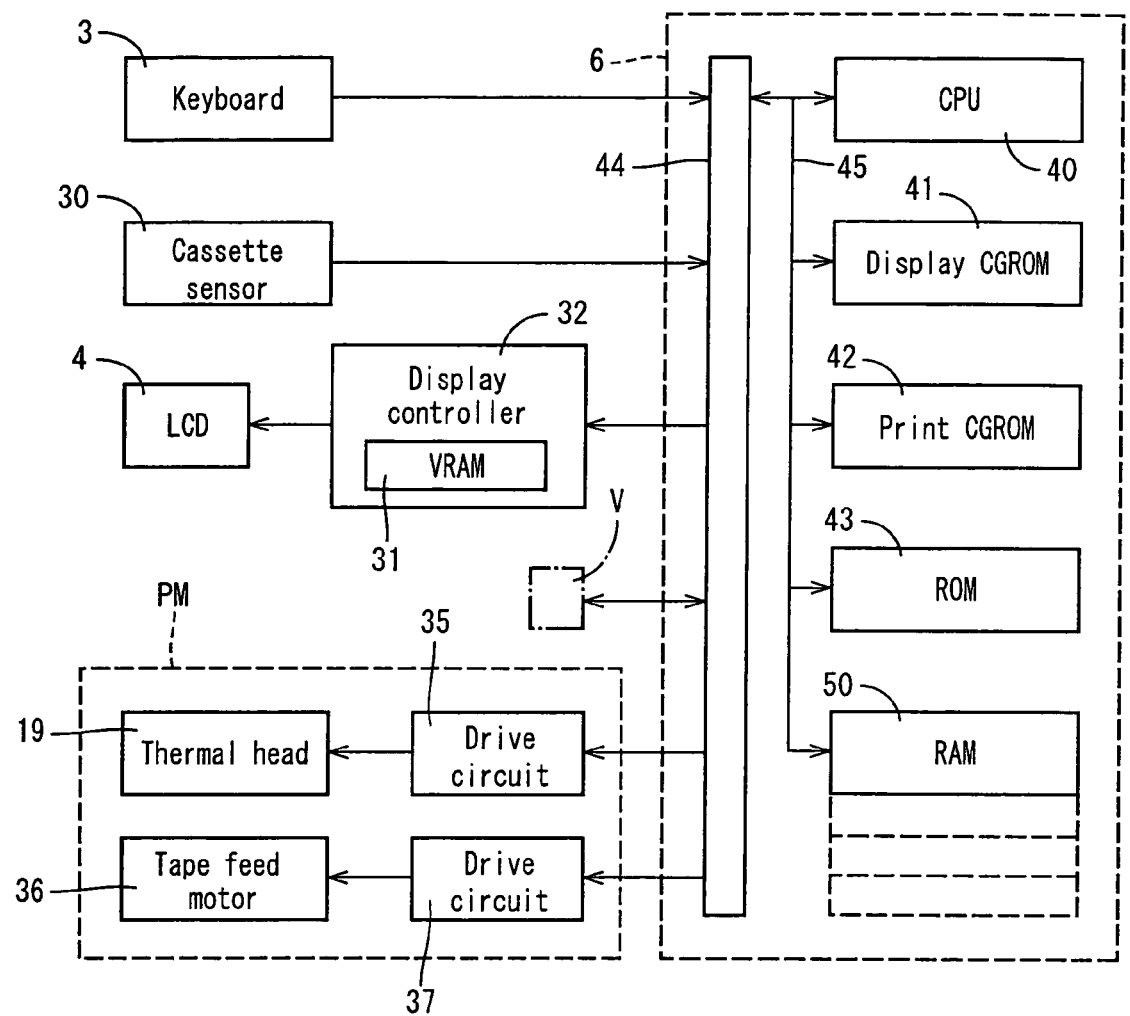
FIG. 3 is a block diagram showing an electric connection of the RFID label producing device of FIG. 1.

Next, an electric structure of the RFID label producing device 1 will be described with reference to the block diagram of FIG. 3.

A control unit 6 is made up of a CPU 40, an input-output interface 44 connected to the CPU 40 through a bus 45, such as a data bus, a display character generator ROM (a display CG-ROM) 41, a print character generator ROM (a print CG-ROM) 42, a ROM 43, and a RAM 50. Display dot pattern data of predetermined character sizes concerning each of many characters, such as alphabetical letters and marks, is stored in the display CG-ROM 41. Print dot pattern data concerning each of many characters, such as alphabetical letters and marks, is stored in the print CG-ROM 42, including a plurality of print character sizes in correspondence with code data for each font.

The keyboard 3, the cassette sensor 30, a display controller 32 including a video RAM (VRAM) 31 used to output display data to the display 4, a drive circuit 35 that drives the thermal head 19, and a drive circuit 37 that drives the tape feed motor 36 are connected to the input-output interface 44 of the control unit 6.

A display drive control program that controls the display controller 32 in accordance with code data about characters, such as letters, numerals, and marks, input from the keyboard 3, a print drive control program that gives printing instructions to sequentially transfer dot pattern data for each one-dot array for printing to the thermal head 19 or to the tape feed motor 36, and a control program for text input control, typical-label production control, label name selection control, typical-label data input control, text registration control, or bar code production control are stored in the ROM 43 of the control unit 6.

The CPU 40 allows the display 4 to show an image while sequentially reading data from the CG-ROMs 41 and 42 based on the input from the keyboard 3, the detection of the kind of the cartridge 10 by the cassette sensor 30, and the control programs stored in the ROM 43. The CPU 40 further gives instructions to drive the tape feed motor and to control the thermal head 19 through the drive circuits 35 and 37.

Next, referring to FIGS. 4A to 4C and FIGS. 5A and 5B, a layered structure of the band-shaped sheet member 16 contained in the cartridge 10 will be described. FIGS. 4A to 4C and FIGS. 5A and 5B are sectional side views that schematically show the band-shaped sheet member 16. In other words, FIGS. 4A to 4C and FIGS. 5A and 5B are longitudinal sectional views along the longitudinal direction of the band-shaped sheet member 16 and through the middle in the width direction of the band-shaped sheet member 16. FIGS. 4A to 4C and FIG. 5A are views obtained by enlarging one sheet of the band-shaped sheet member 16 or one piece of the RFID label 70 in the thickness direction. FIG. 5B is a view obtained by enlarging a part of the band-shaped sheet member 16 wound like a roll in the thickness direction, i.e., in the radial direction of the roll.

Figure 4A:
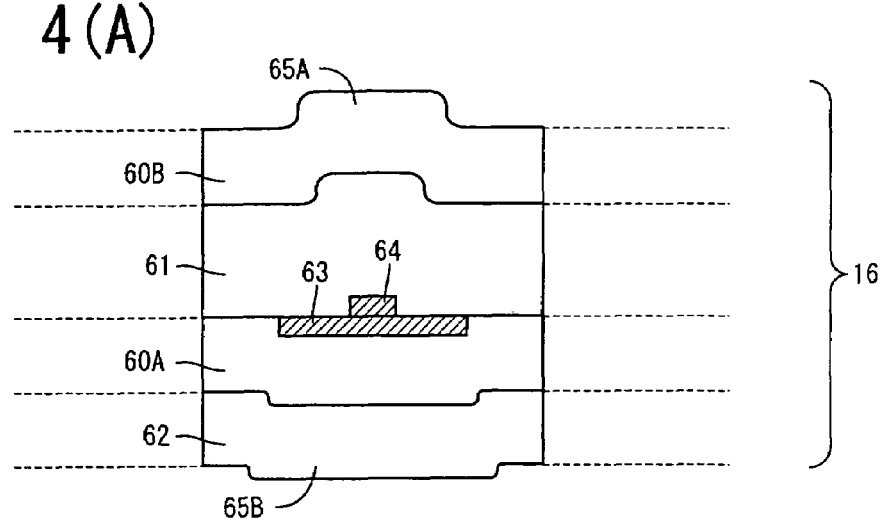
FIGS. 4A to 4C are sectional side views, each showing a RFID label and a band-shaped sheet member serving as a base material of the label, FIG. 4A showing a state in which a laminate film has not yet been bonded, FIG. 4B showing a state in which the laminate film is about to be bonded, FIG. 4C showing a state in which the laminate film has been bonded.

As shown in FIG. 4A, the band-shaped sheet member 16 has a layered structure consisting of four layers, i.e., a separation member 62, such as a silicon-applied sheet of paper or a silicon-impregnated sheet of paper, a first adhesive layer 60A, an opaque base-material tape 61, such as a colored resin sheet, and a second adhesive layer 60B stacked in this order. An antenna conductor 63 used to function as a RFID label of an electromagnetic induction type and an IC (RFID) chip 64 connected to the antenna conductor 63 are interposed between the first adhesive layer 60A and the base-material tape 61. Therefore, the band-shaped sheet member 16 is partially thickened in proportion to the thickness of the antenna conductor 63 and the IC chip 64 interposed therebetween. As a result, convex parts 65A and 65B are formed on the upper and lower surfaces, respectively. For convenience, the convex parts 65A and 65B of the band-shaped sheet member 16 are omitted in the longitudinal sectional views of the band-shaped sheet member 16 shown in FIG. 4B and in the other figures subsequent to FIG. 4B. No trouble occurs in adhesion between the band-shaped sheet member 16 and the laminate tape 11 even if the convex parts 65A and 65B are formed.

Figure 5A:
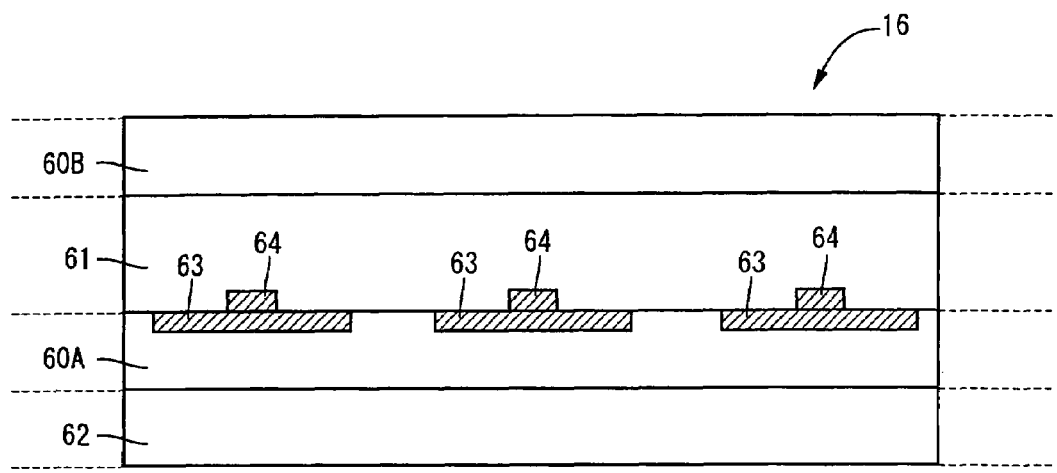
FIGS. 5A and 5B are sectional side views showing a cross section in a longitudinal direction of the band-shaped sheet member of FIGS. 4A to 4C and explaining the cross section of the band-shaped sheet member wound and stacked like a roll.

The antenna conductor 63 and the IC chip 64 are electrically connected together by a connection part (not shown) so as to fulfill a predetermined RFID function. As shown in FIG. 5A, the antenna conductor 63 and the IC chip 64 are placed in the band-shaped sheet member 16 at regular intervals each of which corresponds to one piece in the longitudinal direction of the band-shaped sheet member 16 so that a plurality of RFID labels 70 can be sequentially produced.

Figure 4B:
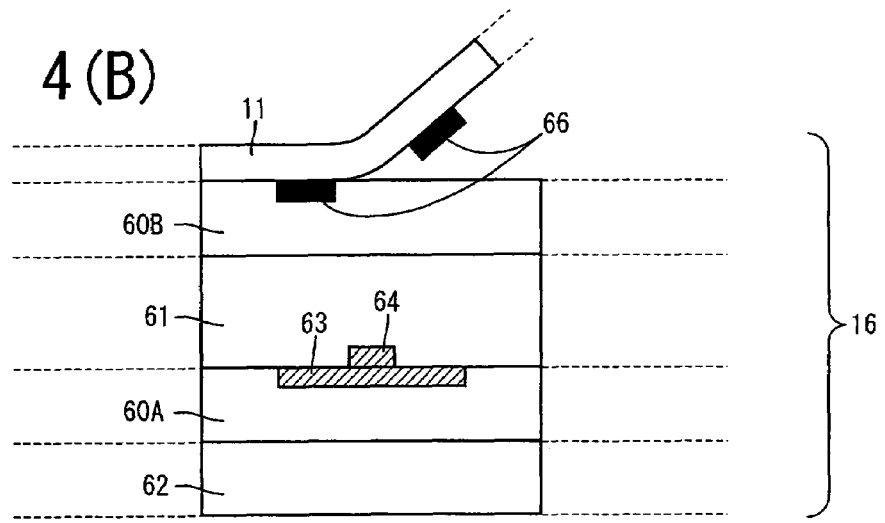
Figure 4C:
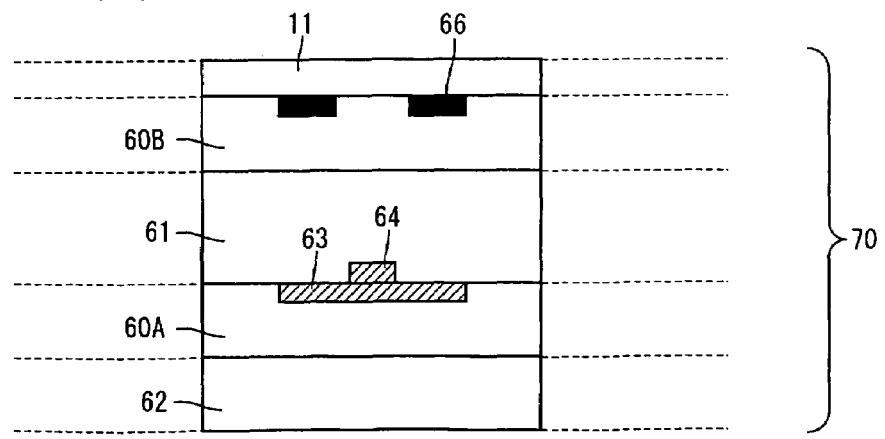
Figure 5B:
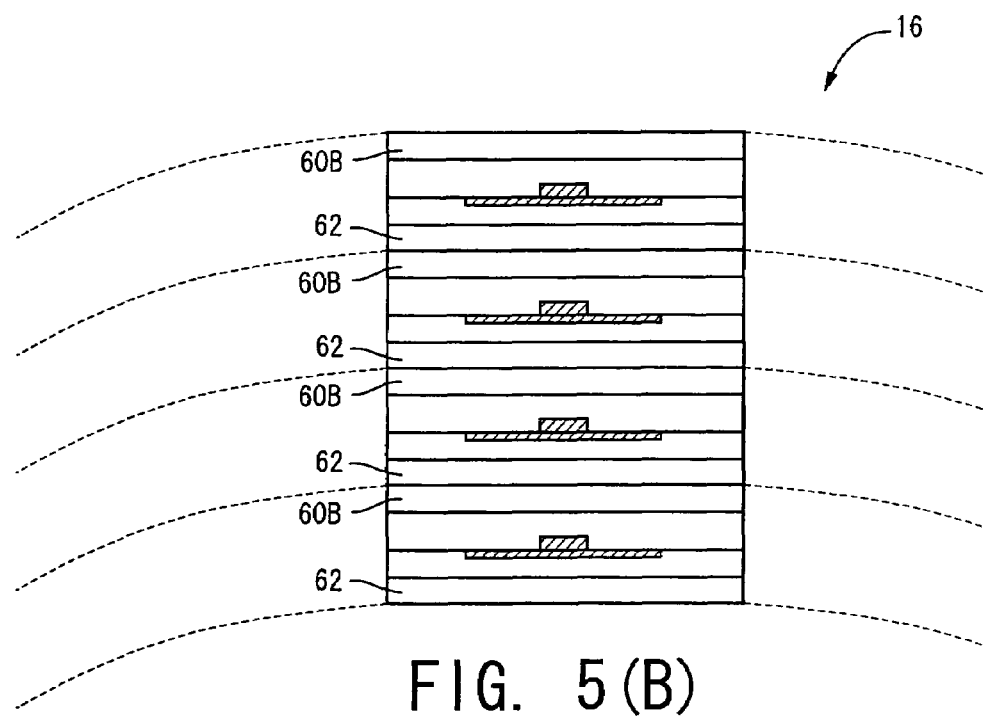

When the band-shaped sheet member 16 is adhered to the laminate tape 11 at the following step, ink 66, which is a part of the ink ribbon 13, is stuck by local heating according to a predetermined pattern as shown in FIG. 4B. The second adhesive layer 60B and the laminate tape 11 on which an image, such as a mark, is formed with the ink 66 are nipped between the tape feed roller 18 and the sub-roller 21, which are used as a pair, and are joined together while being adjusted in the width direction by the guide wall 28C and the other elements. FIG. 4C shows a RFID label 70 in which the laminate tape 11 and the second adhesive layer 60B are joined together in this way. In this state, a surface of the laminate tape 11 onto which the ink 66 has adhered is covered with the laminate tape 11, and is positioned in the inner layer of the RFID label 70, and hence is is never touched directly from the outside.

Figure 6:
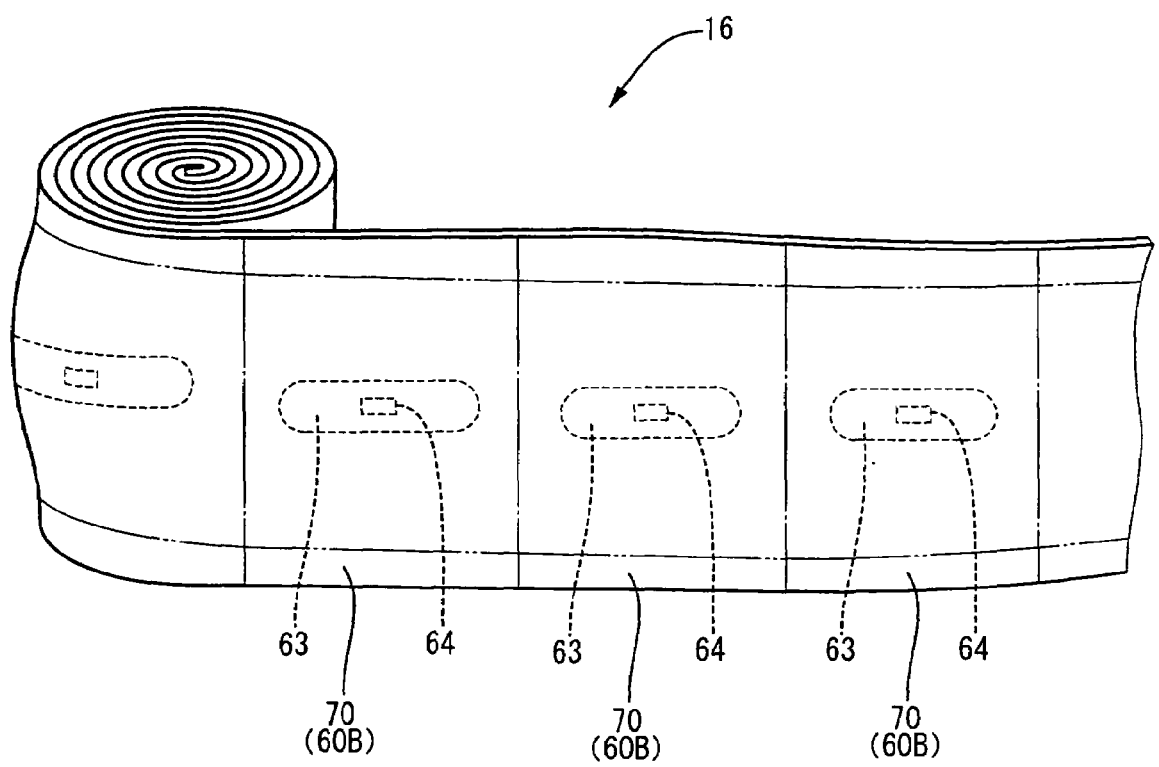
FIG. 6 is a perspective view showing a state in which one end of the band-shaped sheet member wound like a roll has been drawn out.

The thus formed band-shaped sheet member 16 is wound like a roll, and is contained in the cartridge 10. FIG. 5B schematically shows this state. In this state, the band-shaped sheet member 16 is in layers. Since both surfaces of the separation member 62 have undergone silicon processing, the band-shaped sheet member 16 can be appropriately unrolled as shown in FIG. 6 in spite of being in layers. When an end of the band-shaped sheet member 16 wound like a roll and being in layers as shown in FIG. 5B is drawn out, the second adhesive layer 60B is easily separated from another separation member 62 of the band-shaped sheet member 16 contiguous in the thickness direction while the band-shaped sheet member 16 is being continuously unrolled. Thereafter, the second adhesive layer 60B is joined to the back surface of the laminate tape 11, so that a RFID label 70 is formed.

When this RFID label 70 is stuck onto an article or the like, the separation member 62 is peeled off, and the adhesive force of the first adhesive layer 60A enables the adhesion therebetween. In the RFID label 70 stuck onto the article, the base-material tape 61 opaqued by, for example, coloring makes it impossible to visually check the antenna conductor 63 and the IC chip 64, and hence an image with the ink 66 can be easily seen.

Both surfaces of the separation member 62 have undergone silicon processing as mentioned above, and the adhesive force between the first adhesive layer 60A and the base-material tape 61 is set to be sufficiently greater than that between the separation member 62 and the first adhesive layer 60A. Therefore, the first adhesive layer 60A and the base-material tape 61 are never separated from each other when the separation member 62 is separated therefrom. Likewise, the adhesive force between the separation member 62 and the first adhesive layer 60A is set to be greater than that between the second adhesive layer 60B and the separation member 62. Therefore, the separation member 62 and the first adhesive layer 60A are never separated from each other when the band-shaped sheet member 16 in a wound state is unrolled. When the band-shaped sheet member 16 is wound, the band-shaped sheet member 16 may undergo pressure from the outside so that adjacent layers of the band-shaped sheet member 16 wound to have a layered structure come into close contact with each other, or the band-shaped sheet member 16 may use its own weight so that the adjacent layers thereof come into close contact with each other.

Outside the cartridge 10, the RFID label 70 formed in this way is sequentially cut into each individual RFID label 70 (see FIG. 4C) having a usable form by a cutting mechanism (not shown) provided in the RFID label producing device 1 along the alternate-long-and-short-dash line of FIG. 6 at intervals in each of which the antenna conductor 63 and the IC chip 64 are disposed.

As described above, in the RFID label producing device 1 of this embodiment, an image is formed on the laminate tape 11 that does not include the IC chip 64 before joining the laminate tape 11 and the band-shaped sheet member 16 together. To maintain the quality of an image that is formed on the laminate tape 11, the image is formed on the back surface of the laminate tape 11 to which the band-shaped sheet member 16 is joined. Therefore, the image printed on the RFID label can be kept in an excellent state without damaging the IC chip 64 and the other elements included therein.

Additionally, in the RFID label producing device 1 of this embodiment, the tape feed roller 18 and the sub-roller 21 between which the laminate tape 11 and the band-shaped sheet member 16 are sandwiched are disposed. The laminate tape 11 and the band-shaped sheet member 16 are adhered to each other while being conveyed by rotating these rollers, so that each label base material can be joined sequentially from the end thereof. Therefore, advantageously, the RFID label 70 can be prevented from being permeated with air by which the outward appearance of the label is impaired.

Additionally, in the RFID label producing device 1 of this embodiment, the laminate tape 11 and the band-shaped sheet member 16 are joined together by the tape feed roller 18 and the sub-roller 21. Therefore, there is no need to newly provide a carrier roller, or the like, that is used to convey each label base material. This makes it possible to simplify the structure and to reduce production costs.

Additionally, in this embodiment, since the tape spool 12, the feed spool 17, the guide roller 28A, the guide walls 28B and 28C, and one of the two rollers 18 and 21 that constitute an adhering means are disposed in the cartridge detachably attached to the RFID label producing device 1, a user of the RFID label producing device 1 can easily perform the job of exchanging or substituting each label member held by each holding portion.

Additionally, in this embodiment, the back surface of the laminate tape 11 on which an image is formed is exposed until the laminate tape 11 is joined to the band-shaped sheet member 16 after the image is formed thereon. However, the carrier members, such as the guide roller 28A and the guide walls 28B and 28C, never come into contact with the area in which the image of the laminate tape 11 is formed, and hence the formed image can be kept in a more excellent state.

Additionally, each label base material can be easily carried by using the cartridge 10 of this embodiment. Since an image is formed on the back surface of the laminate tape 11, to which the band-shaped sheet member 16 is joined, by attaching the cartridge 10 to the RFID label producing device 1, the image printed on the RFID label 70 can be kept in an excellent state without damaging the IC chip 64 and the other elements included therein. In particular, when a bar code is imaged with the ink 66, no distortion occurs in the image of the bar code without exerting a bad influence on the readout of the bar code.

Additionally, the use of the RFID label producing device 1 of this embodiment makes it easy to stop the operation of producing the RFID label 70 whenever one sheet of the RFID label 70 is produced. Therefore, it is possible to easily produce RFID labels 70 each of which has an image differing from the others.

Additionally, in the RFID label 70 of this embodiment, an image is formed on a surface of the laminate tape 11 to which the sheet member 16 is joined, and the surface on which the image is formed can never be touched directly from the outside. Therefore, the image formed thereon can be protected from becoming blurred, and the image can be kept in an excellent state.

Additionally, in the RFID label 70 of this embodiment, the base-material tape 61 is opaque. Therefore, the antenna conductor 63.and the IC chip 64 do not disturb the perception of an image formed with the ink 66. In particular, in a bar code, a bad influence is not exerted on accuracy in reading the bar code.

Additionally, in the band-shaped sheet member 16 of this embodiment, the separation member 62, which is placed in an outer layer of the band-shaped sheet member 16 being in layers, is brought into contact with the second adhesive layer 60B, which is placed in an inner layer than the layer of the separation member 62 and which is adjacent to the separation member 62, as shown in FIG. 5B. The band-shaped sheet member 16 is wound so that the separation member 62 and the second adhesive layer 60B adjoining each other are further adhered to each other. Therefore, the band-shaped sheet member 16 wound like a roll never slips out of place in the width direction. Thus, the band-shaped sheet member 16 does not wear down by friction occurring when the band-shaped sheet member 16 is unrolled or loosened, and the IC chip 64 can be prevented from being damaged by the generation of static electricity.

Additionally, in this embodiment, since the band-shaped sheet member 16 wound as in FIG. 5B has layers that are pressed against each other and are in close contact with each other, the band-shaped sheet member 16 can be made compact when the band-shaped sheet member 16 is loaded into the RFID label producing device 1. In other words, the band-shaped sheet member 16 can be more efficiently contained therein.

Additionally, in this embodiment, since the band-shaped sheet member 16 is wound in a state in which a plurality of antenna conductors 63 and IC chips 64 are contained in the first adhesive layer 60A, a plurality of RFID labels 70 can be sequentially produced from one sheet of the band-shaped sheet member 16.

Additionally, in this embodiment, since the antenna conductor 63 and the IC chip 64 are disposed between the first adhesive layer 60A and the second adhesive layer 60B, the adhesive layers 60A and 60B can protect the antenna conductor 63 and the IC chip 64 against an external force such as a shock.

Additionally, in this embodiment, since the base-material tape 61 harder than the adhesive layers 60A and 60B is disposed between the first adhesive layer 60A and the second adhesive layer 60B, the band-shaped sheet member 16 is not easily deformed even when an external force, such as compression, is applied onto the band-shaped sheet member 16.

Additionally, in this embodiment, the antenna conductor 63 and the IC chip 64 are disposed between the opaque base-material tape 61 and the first adhesive layer 60A. Therefore, when the laminate tape 11 with an image formed facing the second adhesive layer 60B is stuck, the image formed on the surface of the laminate tape 11 can be improved in visibility without allowing the antenna conductor 63 and the IC chip 64 to be seen. In particular, when a bar code is imaged with the ink 66, the image of the bar code can be advantageously prevented from being overlapped with the antenna conductor 63 and the IC chip 64 and from making a mistake in reading the bar code.

Additionally, in this embodiment, the first adhesive layer 60A is used to fix the band-shaped sheet member 16 to other objects, such as articles of commerce, whereas the second adhesive layer 60B is used to join the band-shaped sheet member 16 and a sheet-like member having the same width as the band-shaped sheet member 16 together while adjusting them in the width direction. When the band-shaped sheet member 16 is fixed to an object, only the separation member 62 is separated from the band-shaped sheet member 16. Therefore, the band-shaped sheet member 16 is prevented from being damaged. The band-shaped sheet member 16 can be more efficiently loaded into the RFID label producing device 1, and can be reliably fixed to an object.

Additionally, in this embodiment, the band-shaped sheet member 16 is contained in the cartridge 10 attachable to the RFID label producing device 1. Therefore, when the band-shaped sheet member 16 is loaded into the RFID label producing device 1, the band-shaped sheet member 16 can be more efficiently contained therein, and it is possible to reduce the size of a containing part, which contains the band-shaped sheet member 16, of the cartridge 10 attachable to an image forming device.

Second Embodiment

Next, another embodiment of the present invention will be described. In the following description, the same reference numerals as in the foregoing embodiment are given to the same element, and a description of the same element are omitted.

Figure 7A:
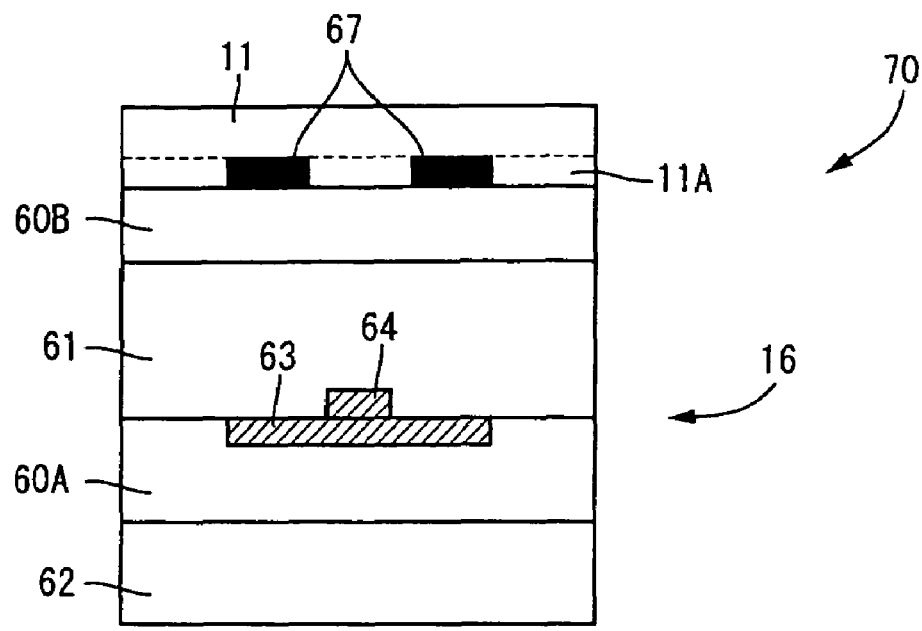
FIGS. 7A to 7B are sectional side views showing a RFID label and a sheet member of another embodiment, FIG. 7A showing an example of the RFID label using a laminate film that has a thermosensitive layer, FIG. 7B showing an example of the sheet member in which an IC chip and an antenna conductor are disposed inversely in upward and downward directions.

FIG. 7A is a sectional side view of a RFID label 70 using a laminate tape 11 according to another embodiment. The RFID label 70 of FIG. 7A is different from the aforementioned RFID label 70 (see FIG. 4A to FIG. 5B) only in the laminate tape 11 used to produce the RFID label 70.

The laminate tape 11 of FIG. 7A according to this embodiment is not a mere transparent film. This laminate tape 11 has a thermosensitive layer 11A that includes a color-producing reagent prepared so that a heated part can be colored by local heating in its surface to be joined to the band-shaped sheet member 16 and that is partially colored into a preset color, such as black or blue.

The thus structured laminate tape 11 is drawn from the cartridge 10, and the thermosensitive layer 11A of the laminate tape 11 is heated by the thermal head 19 on the conveying path. As a result, the heated part is partially colored, and appears as a colored part 67. Accordingly, the RFID label 70 of FIG. 7A is obtained by being joined to the band-shaped sheet member 16 in this state.

When the laminate tape 11 having the thermosensitive layer 11A is used, it becomes unnecessary to provide the ink ribbon. 13, the ribbon spool 14 used to wind the ink ribbon 13, and the ribbon take-up spool 15 in the cartridge 10, and hence the structure of the inside of the cartridge 10 becomes simple. It also becomes unnecessary to provide the mechanism that rotates and drives the ribbon take-up spool 15.

Even the RFID label 70 of FIG. 7A that uses the laminate tape 11 having the thermosensitive layer 11A can have the same function as the RFID label 70 shown in FIG. 4A to FIG. 5B. Even when the surface of the RFID label 70 is unintentionally rubbed, the thermosensitive layer 11A can be prevented from being colored by the frictional heat, because the thermosensitive layer 11A is disposed inside the RFID label 70.

In the first embodiment, the adhesive layer 60B used to stick the laminate tape 11 and the band-shaped sheet member 16 together is pre-formed on the base-material tape 61. However, it is recommended to apply the adhesive layer 60B onto at least one of the laminate tape 11 and the band-shaped sheet member 16 immediately before they are stuck together.

Additionally, unless the image formed with the ink 66, the antenna conductor 63, and the IC chip 64 are damaged, it is permissible to melt either the laminate tape 11 or the band-shaped sheet member 16 with heat or ultrasonic waves so as to weld the laminate tape 11 and the band-shaped sheet member 16 together without using an adhesive layer or an adhesive (i.e., laminating agent). Alternatively, it is permissible to dispose a welding member other than the laminate tape 11 and the band-shaped sheet member 16 therebetween and weld the laminate tape 11 and the band-shaped sheet member 16 together by melting the welding member.

The phrase "adjusting . . . in a width direction" denotes that, if the first label base material and the second label base material are equal in width, the two are arranged so as to exactly coincide with each other in the width direction, and, if the first label base material and the second label base material are not equal in width, the two are arranged so that, as a minimum, the label base material smaller in width does not protrude from the label base material greater in width.

Additionally, in this embodiment, the laminate tape 11 and the band-shaped sheet member 16 that mutually have the same width are used. However, without being limited to this, the laminate tape 11 and the band-shaped sheet member 16 may be different in width from each other. If the laminate tape 11 and the band-shaped sheet member 16 are different in width, the laminate tape 11 and the band-shaped sheet member 16 may be arranged so that, as a minimum, the one that is smaller in width does not protrude from the other that is greater in width.

Additionally, unless an obstruction is caused to the image formation or to the conveyance of the RFID label 70 and the other elements, the laminate tape 11 and the band-shaped sheet member 16 may disagree in the width direction. In other words, it is recommended to establish a desired positional relationship between the laminate tape 11 and the band-shaped sheet member 16 in order to desirably stick these together.

The phrase "a range where an image can be formed" denotes that, since an image cannot always be formed on the whole of the back surface of the laminate tape (first label base material) 11 on the side where the laminate tape 11 is stuck onto the band-shaped sheet member 16 (second label base material) depending on the thermal print-head (image forming means) 19 mounted in the RFID label producing device 1, no disadvantage is caused by allowing the conveying-path forming means to come into contact with a no-image formation part of the back surface when an image cannot be formed on the whole of the back surface. For example, in this embodiment, the guide roller 28A and the guide walls 28B and 28C provided in the cartridge 10 are disposed so as not to come into contact with the image formation surface of the laminate tape 11 on which an image has been formed. However, it is permissible to stabilize a tape movement by bringing the conveying members (the guide roller tag tape base layer is placed as an outermost layer. Therefore, it is possible to produce a card-type RFID tag without the premise that the tag is stuck. 28A, the guide walls 28B and 28C, etc.) into contact with the no-image formation part of the image formation surface of the laminate tape 11.

In the first embodiment, the produced RFID label 70 is structured as an electromagnetic induction type RFID label 70 by containing the antenna conductor 63 and the IC chip 64 in the band-shaped sheet member 16. However, without being limited to this, the RFID label 70 may be structured, for example, as an electrostatic coupling type, a UHF type, or an electromagnetic coupling type RFID label 70. Alternatively, the produced RFID label 70 may be structured as a microwave type RFID label 70 by containing the antenna conductor 63 and a reflection circuit. The antenna conductor 63 may be formed by printing. An upper-lower relationship between the antenna conductor 63 and the IC chip 64 may be reversed.

Additionally, in the cartridge 10 according to the first embodiment, the tape spool 12, which serves as a winding core, and the feed spool 17 are used as members supporting the laminate tape 11 and the band-shaped sheet member 16, and each tape is held by these spools. However, without being limited to this, each tape may be held by walls regulating the outer shape of the laminate tape 11 and the outer shape of the band-shaped sheet member 16.

Additionally, the laminate tape 11 and the band-shaped sheet member 16 do not need to be contained in the cartridge 10 while being rolled as shown in FIG. 6. For example, a plurality of strip-like tapes each of which includes one antenna conductor 63 and one IC chip 64 may be stacked up as shown by the solid line of FIG. 5B. If an extremely thin antenna conductor 63 and an extremely thin IC chip 64 are included, the convex parts 65A and 65B can hardly be formed, and hence an influence exerted on printing is slight. Although there is a fear that the antenna conductor 63 and the IC chip 64 will be damaged by the heat of the thermal head 19 or by pressure generated by being sandwiched between the thermal head 19 and the platen 20, the damage can be prevented by applying the present invention in this case.

Additionally, although the RFID label 70 having both the antenna conductor 63 and the IC chip 64 is produced, it is permissible to produce a label having either one of the antenna conductor 63 and the IC chip 64, and then stick the other one onto the label.

Figure 7B:
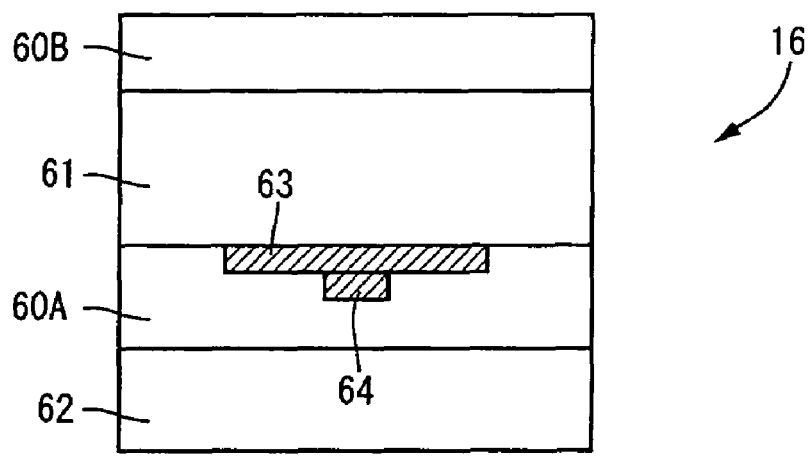

FIG. 7B is a sectional side view of a sheet member 16 used for the RFID label 70 using the laminate tape 11. The sheet member 16 of FIG. 7B is different from the aforementioned RFID label 70 (see FIG. 4A to FIG. 5B) only in that an upper-lower positional relationship between the IC chip 64 and the antenna conductor 63 interposed between the base-material tape 61 and the first adhesive layer 60A is reversed.

Figure 8A:
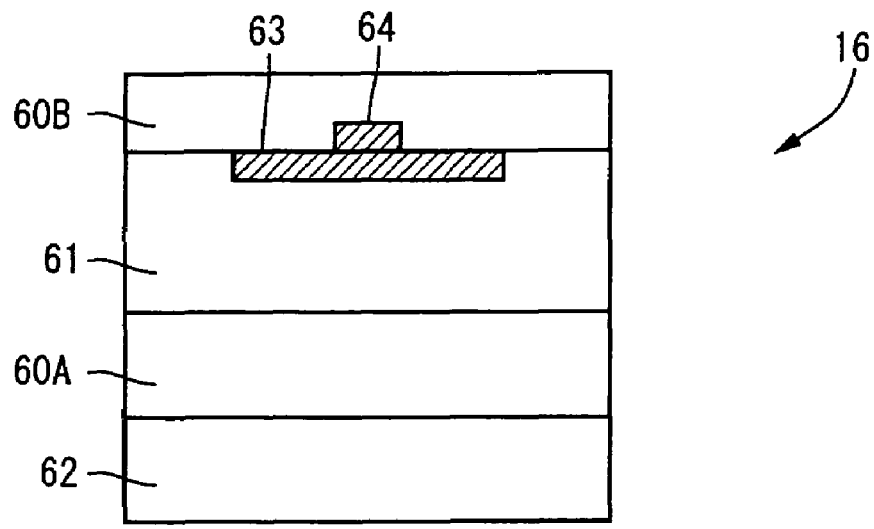
FIGS. 8A and 8B are sectional views, each showing a band-shaped sheet member of another embodiment in which an IC chip and an antenna conductor are provided between a base-material tape and a second adhesive layer, FIG. 8A showing an example in which the IC chip is disposed on the side of the second adhesive layer, and the antenna conductor is disposed on the side of the base-material tape, FIG. 8B showing an example in which the antenna conductor is disposed on the side of the second adhesive layer, and the IC chip is disposed on the side of the base-material tape.

In a band-shaped sheet member 16 shown in FIG. 8A, the antenna conductor 63 and the IC chip 64 are disposed between the base-material tape 61 and the second adhesive layer 60B.

Figure 8B:
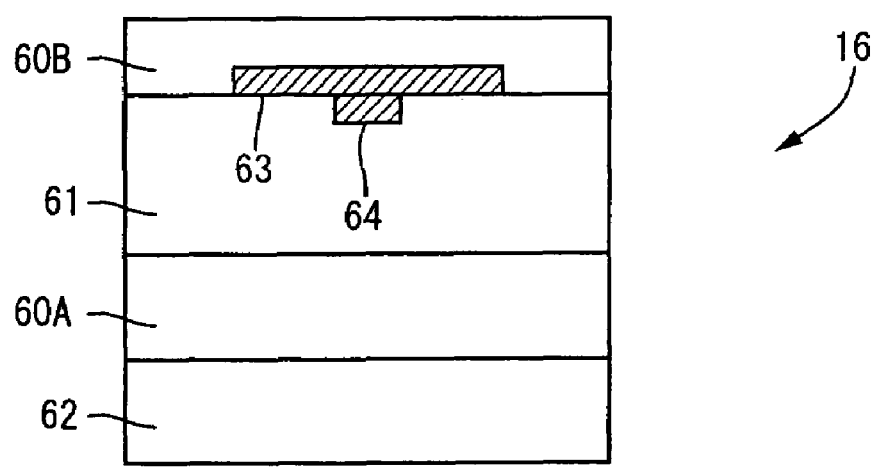

In a band-shaped sheet member 16 shown in FIG. 8B, the IC chip 64 is disposed on the opposite side of the antenna conductor 63 with respect to the band-shaped sheet member 16 of FIG. 8A.

Figure 9A:
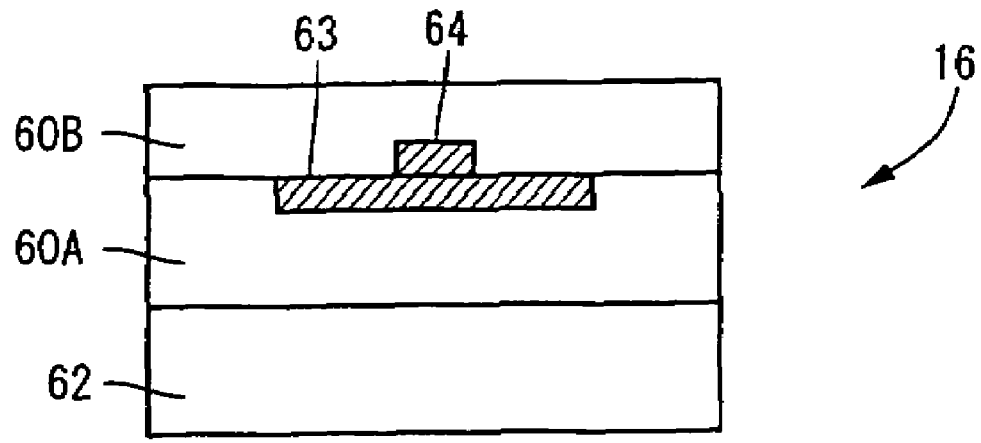
FIGS. 9A and 9B are sectional views, each showing a sheet member in which a base-material tape is not provided between a first adhesive layer and a second adhesive layer, FIG. 9A showing an example in which the IC chip is disposed on the side of the second adhesive layer, and the antenna conductor is disposed on the side of the first adhesive layer, FIG. 9B showing an example in which the antenna conductor is disposed on the side of the second adhesive layer, and the IC chip is disposed on the side of the first adhesive layer.

A band-shaped sheet member 16 shown in FIG. 9A consists of three layers, i.e., the separation member 62, the first adhesive layer 60A, and the second adhesive layer 60B without including the base-material tape 61, in which the antenna conductor 63 and the IC chip 64 are disposed between the first adhesive layer 60A and the second adhesive layer 60B.

Figure 9B:
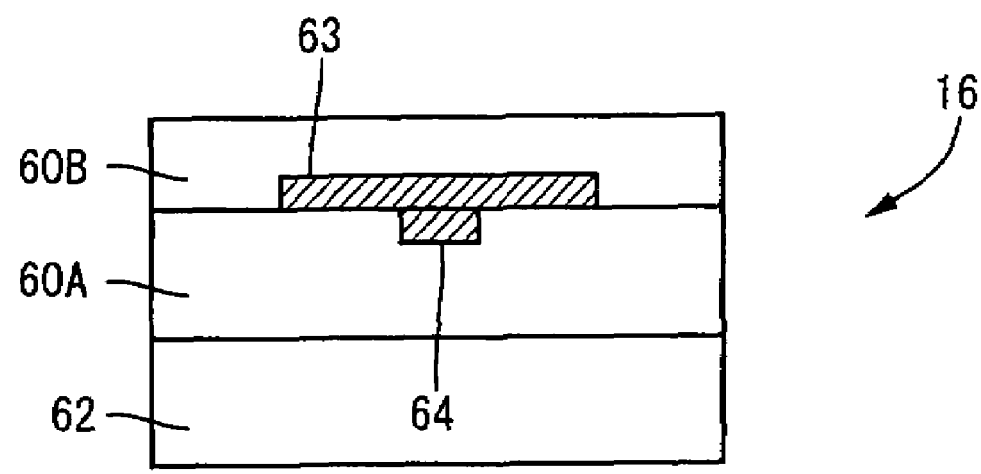

In a band-shaped sheet member 16 shown in FIG. 9B, the IC chip 64 is disposed on the opposite side of the antenna conductor 63 with respect to the band-shaped sheet member 16 of FIG. 9A.

A band-shaped sheet member 16 shown in each of FIGS. 10A to 10D consists of only two layers, i.e., the separation member 62 and the adhesive layer 60. In particular, in the band-shaped sheet member 16 of FIG. 10A, the antenna conductor 63 and the IC chip 64 are disposed so that the IC chip 64 is placed on the side of the adhesive layer 60 between the separation member 62 and the adhesive layer 60.

Figure 10A:
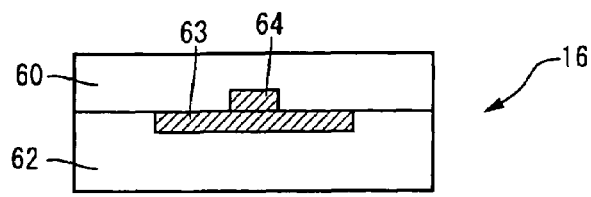
FIGS. 10A, 10B, 10C, and 10D are sectional views, each showing a sheet member that includes an adhesive layer and a separation member, FIG. 10A showing an example in which the IC chip is disposed on the side of the adhesive layer, and the antenna conductor is disposed on the side of the separation member, FIG. 10B showing an example in which the antenna conductor is disposed on the side of the adhesive layer, and the IC chip is disposed on the side of the separation member, FIG. 10C showing an example in which the IC chip and the antenna conductor are stuck onto a surface of the adhesive layer opposite the separation member so that the antenna conductor faces the separation member, FIG. 10D showing an example in which the IC chip is stuck onto a surface opposite the separation member which the adhesive layer and separation member face each other.
Figure 10B:
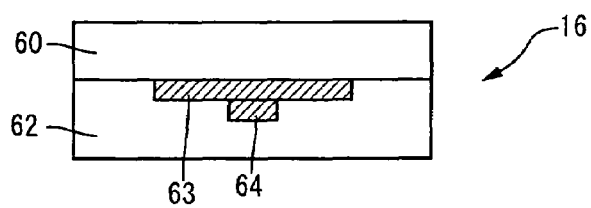

In the band-shaped sheet member 16 of FIG. 10B, the IC chip 64 is disposed on the opposite side of the antenna conductor 63 with respect to the band-shaped sheet member 16 of FIG. 10A.

Figure 10C:
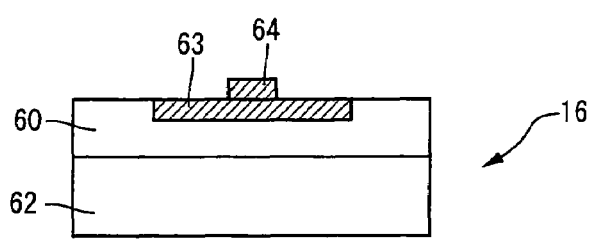

In the band-shaped sheet member 16 of FIG. 10C, the antenna conductor 63 and the IC chip 64 are disposed so that IC chip 64 is placed on the opposite side of the separation member 62 on a surface of the adhesive layer 60 opposite the separation member 62.

Figure 10D:
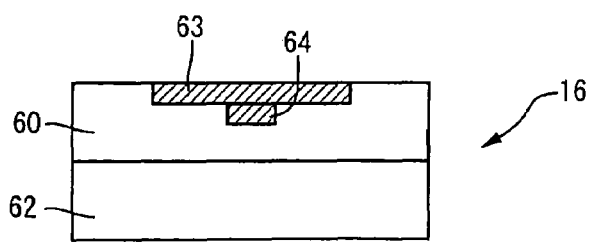

In the band-shaped sheet member 16 of FIG. 10D, the IC chip 64 is disposed on the opposite side of the antenna conductor 63 with respect to the band-shaped sheet member 16 of FIG. 10C.

The same RFID label 70 as the RFID label 70 described in the first embodiment can be produced even if the thus structured band-shaped sheet member 16 is used.

In the band-shaped sheet member 16, the second adhesive layer 60B may be partially covered with the antenna conductor 63 and the IC chip 64.

In this embodiment, the band-shaped sheet member 16 is contained in the cartridge 10 attached to the RFID label producing device 1, and, when the band-shaped sheet member 16 is completely used up, a user exchanges the cartridge 10 so as to be replenished with a new band-shaped sheet member 16. However, without being limited to this structure, it is permissible to, for example, contain the band-shaped sheet member 16 in a position, which the user of the RFID label producing device 1 cannot touch, and supply a new band-shaped sheet member 16 to that position by a special service person or a similar person when the band-shaped sheet member 16 is used up.

Although the RFID label 70 having both the antenna conductor 63 and the IC chip 64 is produced in the above embodiment, it is permissible to produce a label having either one of the antenna conductor 63 and the IC chip 64, and then stick the other one onto the label. It is also permissible to construct the RFID label producing device 1 so that data can be written into or read from the IC chip 64 by a read/write device V simultaneously or almost simultaneously with image formation. Alternatively, pre-written data may be read.

Even in this case, the band-shaped sheet member 16 does not wear down by friction occurring when the band-shaped sheet member 16 slips out of place, and the band-shaped sheet member 16 can be prevented from being damaged by the generation of static electricity. When the band-shaped sheet member 16 is loaded into the RFID label producing device 1, the band-shaped sheet member 16 can be more efficiently contained.

In the aforementioned embodiment, the band-shaped sheet member 16 is contained in the cartridge 10 attached to the RFID label producing device 1. However, without being limited to this, the band-shaped sheet member 16 may be contained in the cartridge 10 attachable to an identification data writing device for writing identification data to the IC chip 64. Even in this example, a containing part in which the band-shaped sheet member 16 is contained can be made compact.

Since the separation member 62 can be separated from the first adhesive layer 60A, the second adhesive layer 60B is exposed by separating the separation member 62 from the band-shaped sheet member 16 without joining the second adhesive layer 60B and the laminate tape 11 together, and hence the band-shaped sheet member 16 can be used as a double-faced tape. Therefore, articles between which the band-shaped sheet member 16 is placed can be stuck together without applying an adhesive or a similar agent onto either the band-shaped sheet member 16 or the article whenever the band-shaped sheet member 16 is stuck onto the article.

In the sheet member 16 used for the RFID label, the adhesive layer may be partially covered with the information discriminating portion. Even in the thus structured sheet member 16, the same effect as the aforementioned sheet member used for the RFID label can be obtained.

Third Embodiment

Figure 11:
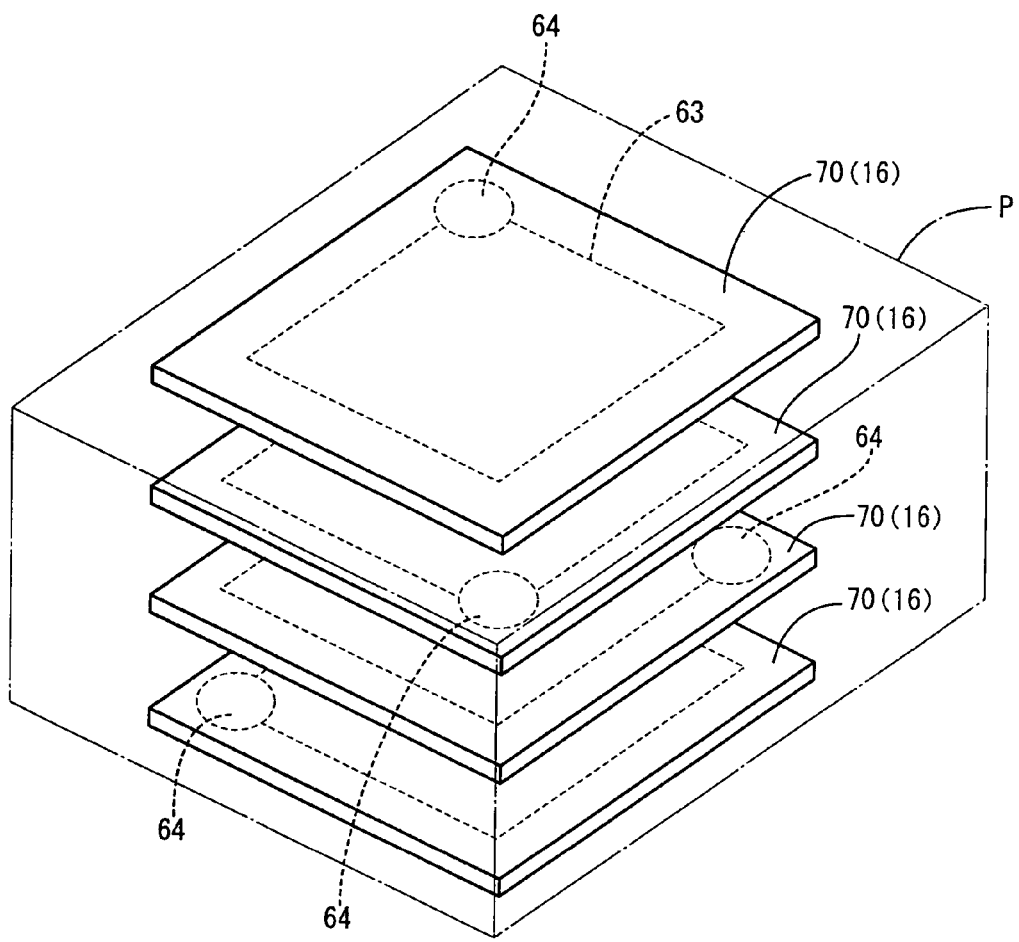
FIG. 11 is a perspective view showing rectangular or square RFID labels or sheet members that are stacked one by one and are contained in a box.

FIG. 11 shows an example in which square or rectangular sheet members 16 or RFID labels 70 are contained in a box P, which is a wrapper, shown by the alternate long and short dash line, for example, to sell the band-shaped sheet members 16 as a single item. In this example, the band-shaped sheet members 16 are conveyed while each tape is peeled off so as to sequentially produce the RFID labels 70. Even in this example, an image printed on the RFID label 70 can be kept in an excellent state without damaging the IC chip 64 and the other elements included in the RFID label 70.

Since the IC chips 64 are disposed so as not to coincide with each other in the plane direction between the sheet members 16 or the RFID labels 70 adjoining in the thickness direction, the box P can be made smaller, or, if the size of the box P is fixed, more sheet members 16 or more RFID labels 70 can be contained therein.

Fourth Embodiment

Figure 13:
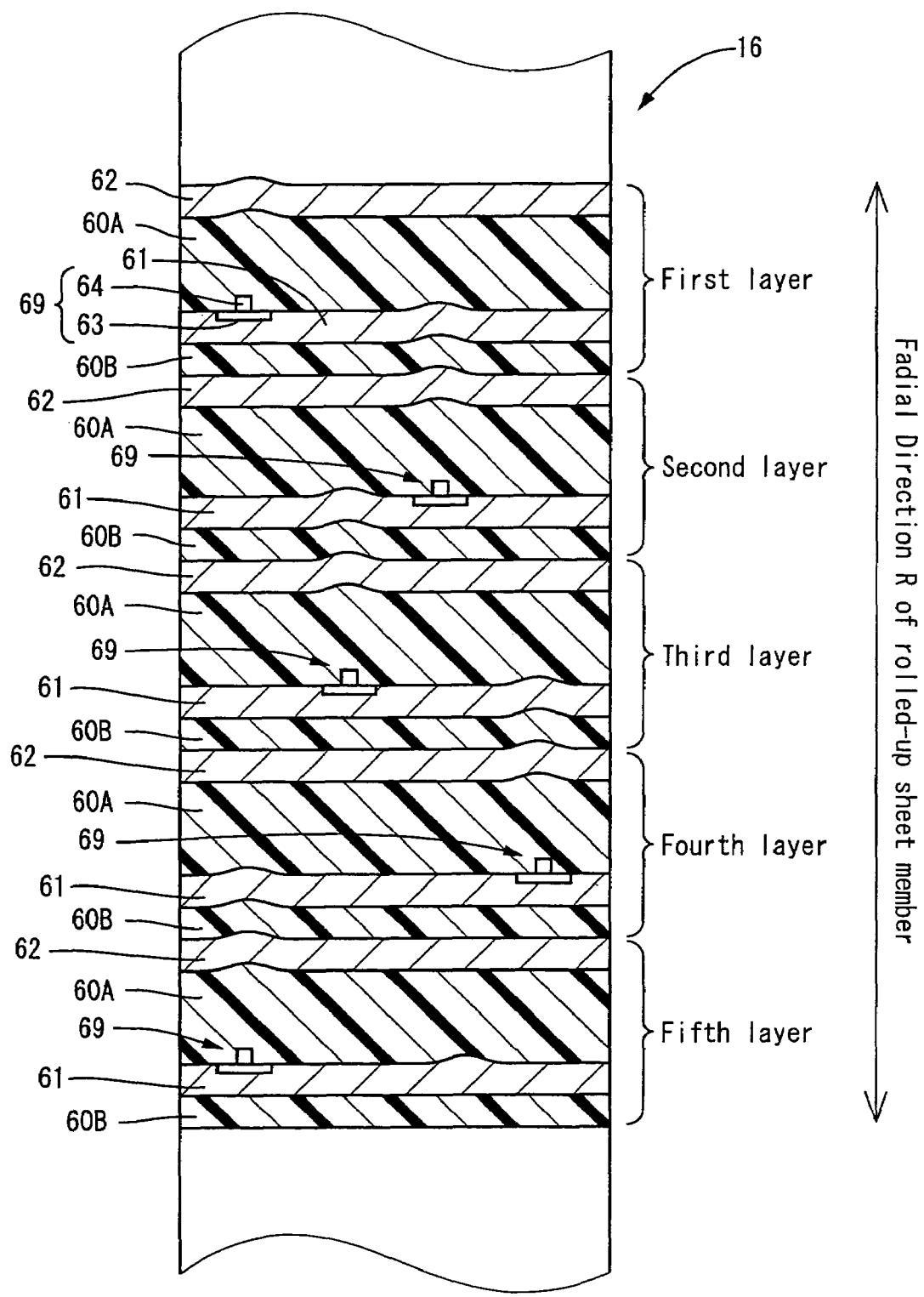
FIG. 13 is a sectional view of the band-shaped sheet member of FIG. 12A wound like a roll in a radial direction R of the roll.

FIG. 12A is an explanatory drawing for explaining the details of a band-shaped sheet member 16 according to another embodiment of the present invention, and FIG. 13 is a sectional view of the band-shaped sheet member 16 wound like a roll so as to be in layers in the thickness direction, i.e., in the radial direction of the roll. In FIG. 12A, an RFID chip 64, which is a RFID element, and a long antenna conductor 63 parallel to a band-shaped base-material tape 61 in the longitudinal direction are disposed as one label unit on the base-material tape 61. The RFID chip 64 and the antenna conductor 63 are embedded in the base-material tape 61 by allowing a separation member 62 to be joined from above the base-material tape 61 with a first adhesive layer 60A between the separation member 62 and the base-material tape 61. Thus, labels 68 each of which has one information discriminating portion 69 serving as a responder consisting of the antenna conductor 63 and the RFID chip 64 are produced. The band-shaped sheet member 16 is formed by continuously arranging the labels 68 in the longitudinal direction.

The RFID chip 64 and the RFID antenna conductor 63 are connected together by a connecting portion (not shown) so that the information discriminating portion 69 fulfills a predetermined RFID function.

The sheet member 16 is an aggregation of band-shaped labels as a whole formed by arranging a plurality of labels 68 each of which has the information discriminating portion 69 in the longitudinal direction of the base-material tape 61.

Both sides of the separation member 62 undergo silicon processing, so that the separation member 62 is separable from the second adhesive layer 60B adjoining thereto, and is also separable from the first adhesive layer 60A in the same stack of layers. Therefore, the band-shaped sheet member 16 being in a wound state can be appropriately unrolled while drawing an end thereof.

The information discriminating portions 69 each of which is included in the label 68 are arranged in the longitudinal direction of the extended band-shaped sheet member 16, i.e., in the rightward and leftward directions of FIG. 12A, and the information discriminating portions 69a, 69b, and 69c adjoining in the longitudinal direction are in a non-aligned state in a direction perpendicular to the longitudinal direction of the band-shaped sheet member 16, i.e., in the width direction of the band-shaped sheet member 16, i.e., in the upward and downward directions of FIG. 12A. In other words, the information discriminating portions 69 are dispersed in the width direction by being disposed at different positions in the width direction. Since the adjoining information discriminating portions 69a, 69b, and 69c are arranged in a non-aligned manner in a state of being extended on one plane in the direction perpendicular to the longitudinal direction of the band-shaped sheet member 16, the information discriminating portions 69 adjoining in the thickness direction, in particular, the RFID chips 64 each of which has a greater thickness, are rarely overlapped with each other in a direction R, which is one radial direction of the roll of the rolled band-shaped sheet member 16, or in a direction in which the sheets of the label base materials are stacked up when the band-shaped sheet member 16 is wound like a roll, or when the band-shaped sheet member 16 is cut along the alternate long and short dash line for each label 68 into sheets of RFID label base materials, and these sheets of RFID label base materials are stacked up. Therefore, a widthwise part of the band-shaped sheet member 16 never greatly protrudes from the rolled band-shaped sheet member 16 because of the information discriminating portions 69. Therefore, the radius R of the rolled band-shaped sheet member 16 can be made as small as possible, and, as a result, a spatial advantage can be obtained when the band-shaped sheet member 16 is contained in the cartridge 10, in the RFID label producing device 1, and in the box P used as a wrapper.

The reason is that, even if a plurality of information discriminating portions 69 are disposed in one cross-sectional plane perpendicular to an axis X in the longitudinal direction of the band-shaped sheet member 16, the information discriminating portions 69 are dispersed in the width direction of the band-shaped sheet member 16, and hence the radius of the rolled-up sheet member 16 does not easily become large.

Additionally, when the first and second adhesive layers 60A and 60B are brought into contact with a part swollen from the information discriminating portion 69 and are pressed in accordance with the winding of the band-shaped sheet member 16, the adhesive layers 60A and 60B are compressed to somewhat absorb the swell, because the first and second adhesive layers 60A and 60B are elastic. In other words, in the band-shaped sheet member 16 wound to be in layers, the layers are in close contact with each other, and hence the radius of the rolled-up sheet member 16 does not easily become large by cooperation between the widthwise dispersion of the information discriminating portions 69 and the elasticity of the first and second adhesive layers 60A and 60B.

Additionally, when the band-shaped sheet member 16 is cut for each label 68 into rectangular or square sheets of RFID label base materials, and the sheets of RFID label base materials are stacked up, the thickness of the whole of the sheets of RFID label base materials stacked up can be reduced by arranging the information discriminating portions 69 in a non-aligned state.

The first and second adhesive layers 60A and 60B do not always need to be compressed. Additionally, if the band-shaped sheet member 16 is wound so that a widthwise part of the band-shaped sheet member 16 remarkably swells, there is a fear that this swell will cause a warp after a label is completed. However, in this embodiment, the cause of the warp is removed.

In the longitudinal direction of the band-shaped sheet member 16 that has been extended, i.e., that has been unrolled, examples shown in FIG. 12B to FIG. 12D can be mentioned as examples of an arrangement pattern in which the information discriminating portions 69 are arranged with predetermined intervals in the width direction and in the longitudinal direction of the band-shaped sheet member 16, besides the arrangement pattern of FIG. 12A.

First, in the arrangement pattern of FIG. 12B, a plurality of information discriminating portions 69 are arranged such that the information discriminating portions 69 gradually approach a side edge of the band-shaped sheet member 16, and gradually recede from the side edge thereof correspondingly with the progression of the information discriminating portions 69 in the longitudinal direction of the band-shaped sheet member 16. Let us see the row of the information discriminating portions 69 from the left to the right in FIG. 12B. When one of the information discriminating portions 69 is disposed near the upper side edge of the band-shaped sheet member 16 shown in FIG. 12B, the next information discriminating portion 69 is disposed closer to the lower side edge of the band-shaped sheet member 16 than the information discriminating portion 69 disposed near the upper side edge with respect to the widthwise position of the band-shaped sheet member 16. In other words, the information discriminating portions 69 are sequentially arranged toward either one of both side edges of the band-shaped sheet member 16, the information discriminating portions 69 following the information discriminating portion disposed near the side edge are arranged to approach the opposite side edge of the band-shaped sheet member 16 with respect to the width direction of the band-shaped sheet member 16.

As in the arrangement pattern of FIG. 12B, in the arrangement pattern of FIG. 12C, when one of the information discriminating portions 69 is disposed near the upper side edge of the band-shaped sheet member 16 shown in FIG. 12C, the next information discriminating portion 69 is disposed closer to the lower side edge of the band-shaped sheet member 16 than the information discriminating portion 69 disposed near the upper side edge with respect to the widthwise position of the band-shaped sheet member 16. However, when one of the information discriminating portions 69 is disposed near one of both side edges, i.e., near the upper side edge of the band-shaped sheet member 16 in FIG. 12C, the next information discriminating portion 69 is disposed near the opposite side edge, i.e., near the lower side edge of the band-shaped sheet member 16, and the information discriminating portions 69 following the next information discriminating portion are arranged to gradually approach the upper side edge of the band-shaped sheet member 16 again.

In the arrangement pattern of FIG. 12D, when one of the information discriminating portions 69 is disposed near the upper side edge of the band-shaped sheet member 16 in FIG. 12D, the next information discriminating portion 69 following this one is likewise disposed near the upper side edge, and the information discriminating portions following this next one are arranged to gradually approach the lower side edge of the band-shaped sheet member 16 in FIG. 12D.

Among the aforementioned arrangement patterns, the arrangement patterns of FIGS. 12C and 12D are preferable to the arrangement pattern of FIG. 12B, because the information discriminating portions 69 are more dispersed as a whole in the width direction of the band-shaped sheet member 16, and parts swollen by the information discriminating portions 69 are more rarely overlapped with each other in the radial direction R of the rolled-up sheet member 16.

Fifth Embodiment

Next, three modifications of the band-shaped sheet member 16 will be described with reference to FIG. 14, FIG. 15, and FIG. 16.

Figure 14:
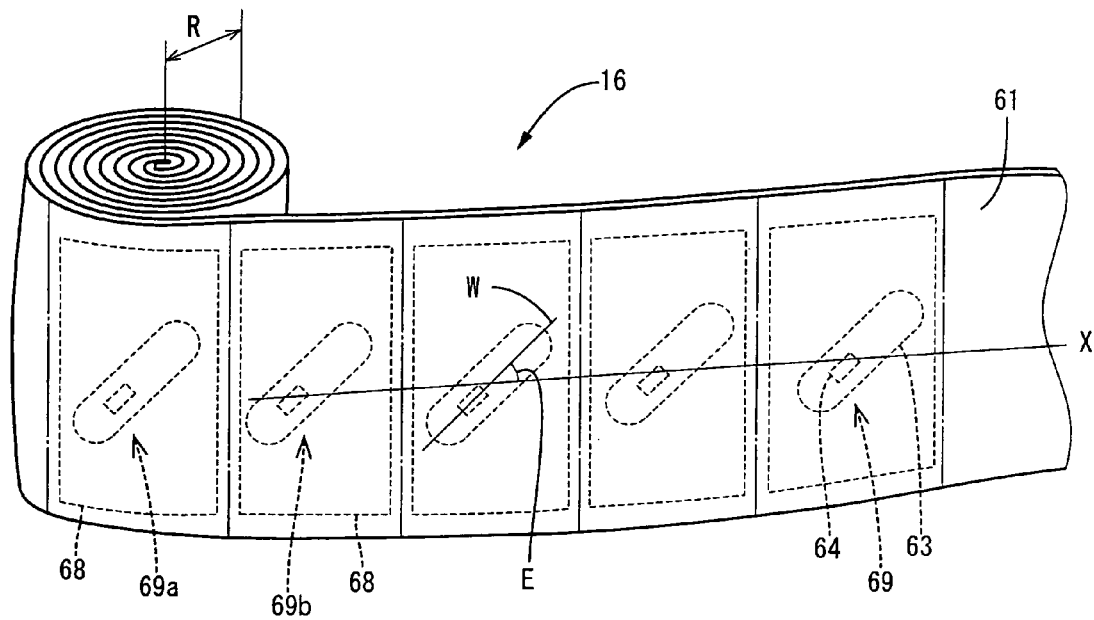
FIG. 14 is a view for explaining a band-shaped sheet member of another embodiment, corresponding to FIG. 12A.

In the band-shaped sheet member 16 of FIG. 14, a plurality of information discriminating portions 69 are disposed in the longitudinal direction of the band-shaped sheet member 16 unrolled as shown in FIG. 14. In the band-shaped sheet member 16 unrolled in the longitudinal direction, a center axis W extending in the longitudinal direction of each of the information discriminating portions $69a$ and $69b$ is set so as to be nonparallel to the axis X extending in the longitudinal direction of the unrolled band-shaped sheet member 16 (in rightward and leftward directions in FIG. 14), i.e., is slantingly set to make a tilt angle E with the axis X extending in the longitudinal direction of the band-shaped sheet member 16, i.e., is set so as to be nonparallel to the axis X (so as to intersect the axis X) extending in the longitudinal direction.

When the information discriminating portions 69 are arranged in this way, parts swollen by the information discriminating portions 69 are not easily overlapped with each other. Therefore, a widthwise part of the band-shaped sheet member 16 is not remarkably protruded from the band-shaped sheet member 16 wound like a roll because of the information discriminating portions 69, and the radius R of the rolled-up sheet member 16 can be made as small as possible. Therefore, when the band-shaped sheet member 16 is contained in at least one of the cartridge 10, the RFID label producing device 1, and the box P used as a wrapper, a spatial advantage can be obtained. The information discriminating portions 69 may be brought into a non-aligned state in the width direction of the band-shaped sheet member 16 as in the foregoing embodiment.

Figure 15:
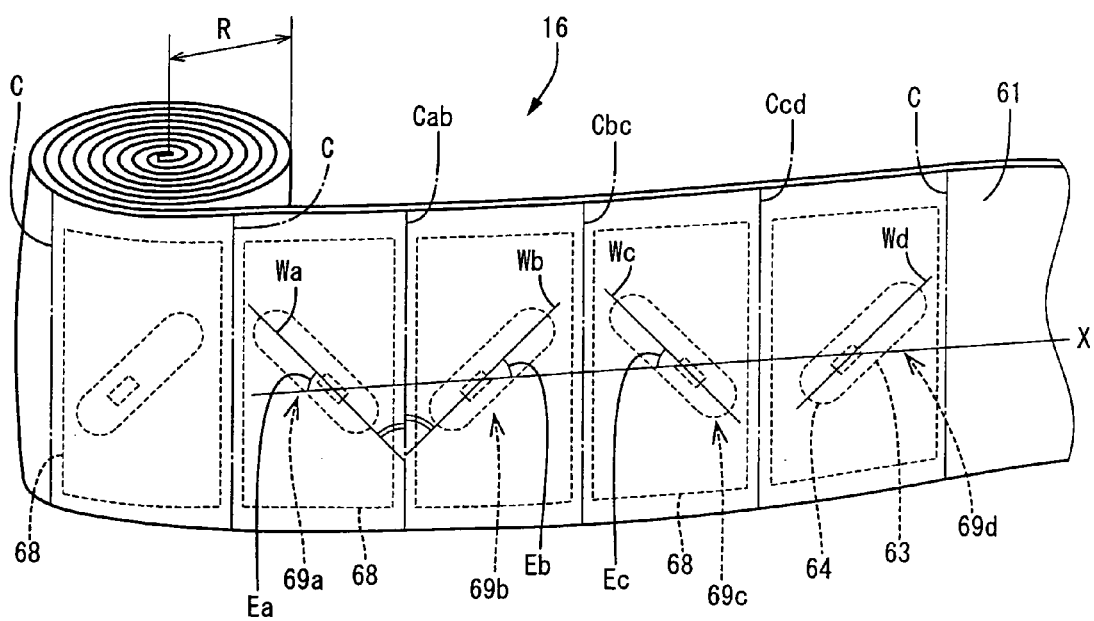
FIG. 15 is a view for explaining a band-shaped sheet member of another embodiment, corresponding to FIG. 12A.

In the band-shaped sheet member 16 of FIG. 15, the band-shaped sheet member 16 is unrolled and extended in the longitudinal direction, and a plurality of information discriminating portions 69 are arranged in the longitudinal direction of the band-shaped sheet member 16. Center axes Wa and Wb extending in the longitudinal direction of the adjoining information discriminating portions 69a and 69b, i.e., of the antenna conductors 63 are set so as to be nonparallel to the axis X (so as to intersect the axis X) extending in the longitudinal direction of the extended band-shaped sheet member 16 (in rightward and leftward directions in FIG. 15), and are set axisymmetrically (angle Ea=angle Eb) with respect to a center axis Cab between the adjoining information discriminating portions 69a and 69b. Likewise, the adjoining information discriminating portions 69b and 69c are disposed so as to be nonparallel to the axis X in the longitudinal direction of the extended band-shaped sheet member 16, and are disposed axisymmetrically (angle Eb=angle Ec) with respect to a center axis between the adjoining information discriminating portions.

As a result of arranging the information discriminating portions 69 in this way, parts swollen by the information discriminating portions 69 are not easily overlapped with each other as in the foregoing example. Therefore, a widthwise part of the band-shaped sheet member 16 is not remarkably protruded from the band-shaped sheet member 16 wound like a roll because of the information discriminating portions 69, and the radius R of the rolled-up sheet member 16 can be made as small as possible. Therefore, when the band-shaped sheet member 16 is contained in at least one of the cartridge 10, the RFID label producing device 1, and the box P used as a wrapper, a spatial advantage can be obtained.

Figure 16:
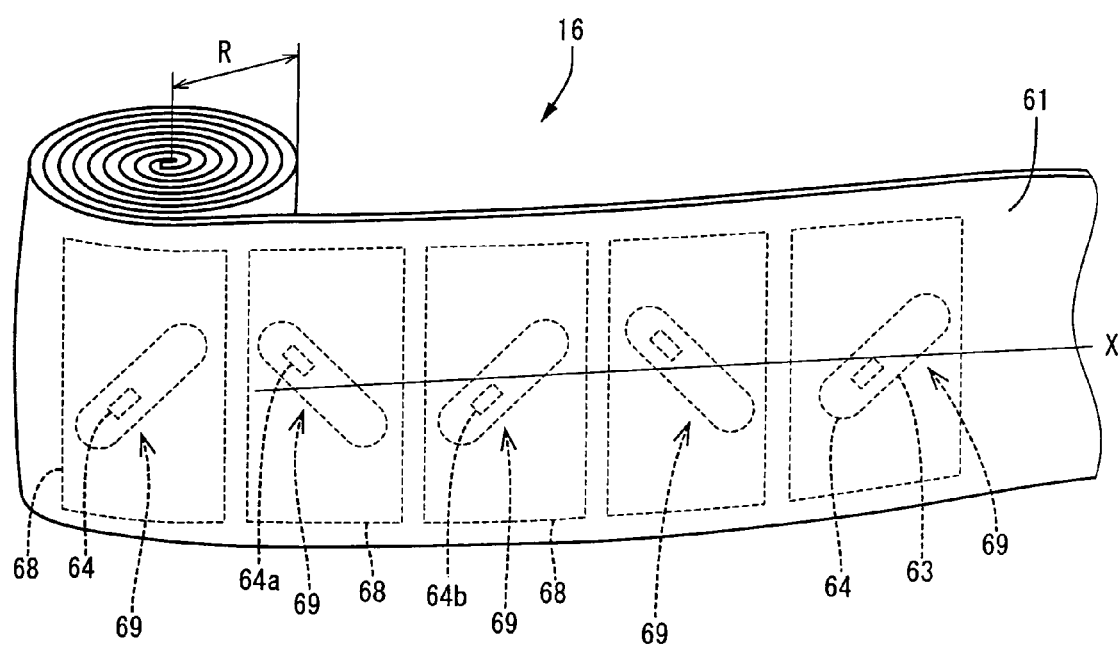
FIG. 16 is a view for explaining a band-shaped sheet member of another embodiment, corresponding to FIG. 12A.

In the band-shaped sheet member 16 of FIG. 16, the band-shaped sheet member 16 is unrolled and extended in the longitudinal direction, and a plurality of information discriminating portions 69 are arranged in the longitudinal direction of the band-shaped sheet member 16. As in FIG. 15, adjoining RFID chips 64a and 64b are deviated from a direction perpendicular to the axis X extending in the longitudinal direction of the sheet member 16 (rightward and leftward directions in FIG. 16), i.e., are deviated from the width direction of the band-shaped sheet member 16, and are alternately disposed with respect to a substantially central axis in the width direction. When the RFID chips 64 are deviated from the direction perpendicular to the longitudinal direction of the sheet member 16 in this way, the RFID chips can be effectively prevented from being overlapped with each other even if the band-shaped sheet member 16 is wound like a roll. Therefore, a widthwise part of the band-shaped sheet member 16 is not remarkably protruded from the band-shaped sheet member 16 because of the information discriminating portions 69, and the radius R of the rolled-up sheet member 16 can be made small.

In the foregoing embodiment and modifications, a description has been given of an example in which the labels 68 including the information discriminating portions 69 are formed on the band-shaped base-material tape 61. However, even when a member to which substantially rectangular labels 68 each of which has a predetermined size shown by the broken line of FIG. 14 to FIG. 16 are joined by separation paper, instead of the band-shaped base-material tape 61, is used as a band-shaped sheet member, the same effect can be obtained.

Sixth Embodiment

Figure 17:
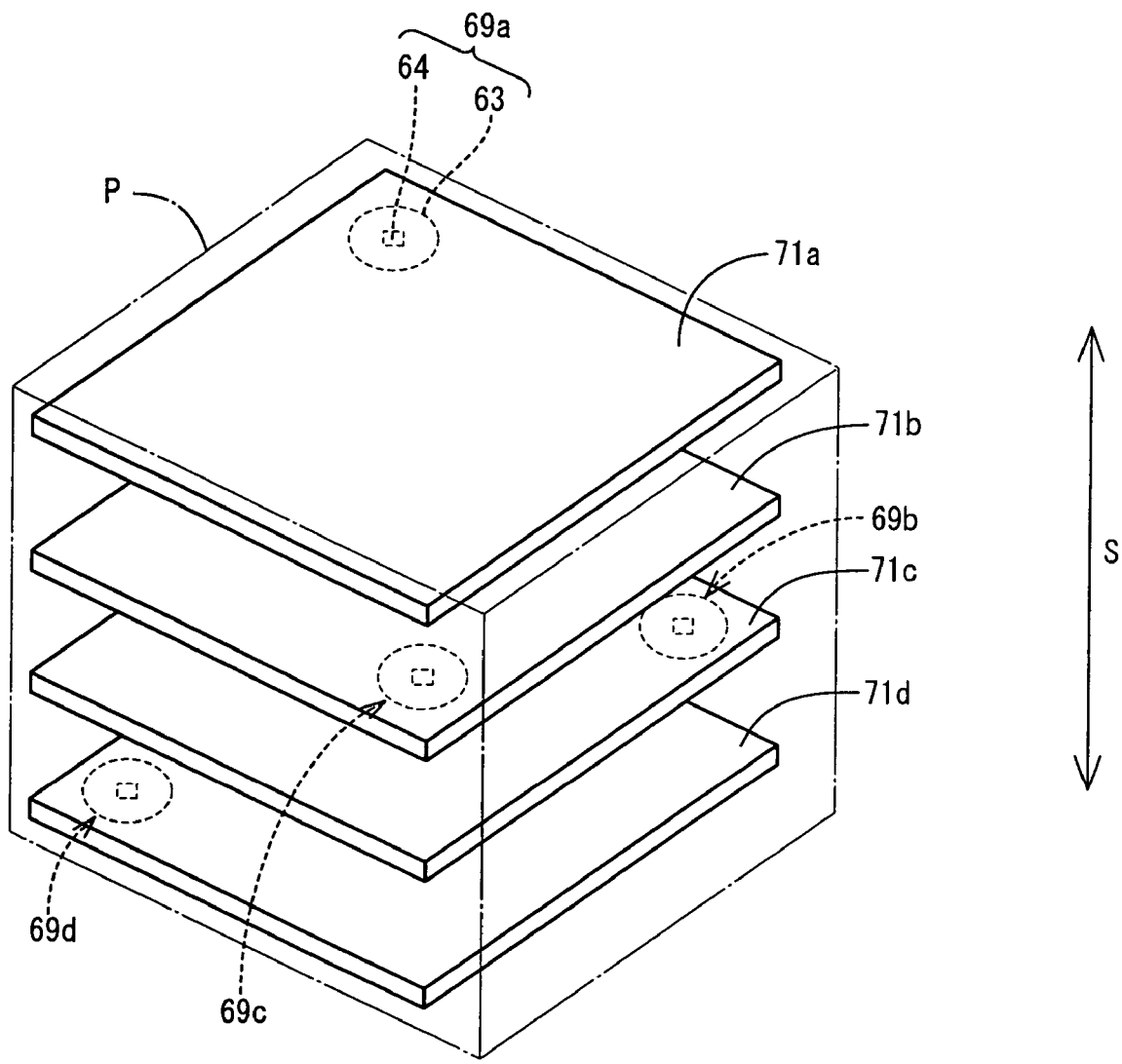
FIG. 17 is a perspective view showing a state in which rectangular holding sheet members of another embodiment are stacked up.

In FIG. 17, an information discriminating portion 69 is embedded in a square holding sheet member 71 corresponding to the sheet member 16 of the RFID label 70. A plurality of holding sheet members (e.g., four holding sheet members) 71 are contained in a box P in a state of being stacked up in upward and downward directions. The holding sheet members 71a and 71b facing each other among these holding sheet members 71 are stacked up so that the positions of the information discriminating portions 69 do not coincide with each other in a plane perpendicular to a stack direction S (i.e., upward and downward directions in FIG. 17). Seeing the holding sheet members 71a and 71b stacked up from the stack direction S, the plane perpendicular to the stack direction S is a plane perpendicular to the stack direction S when planes formed by the holding sheet members 71a and 71b are stacked up.

When stacked in this way, the holding sheet members 71 have their information discriminating portions 69 disposed diagonally to each other, for example. This reduces the frequency of overlapping the swells caused by the information discriminating portions 69 with each other in the stack direction S. Therefore, the thickness of the whole of the holding sheet members 71 stacked up is never increased by the swells caused by the information discriminating portions 69, and hence a noticeable space-saving effect can be obtained.

Figure 18:
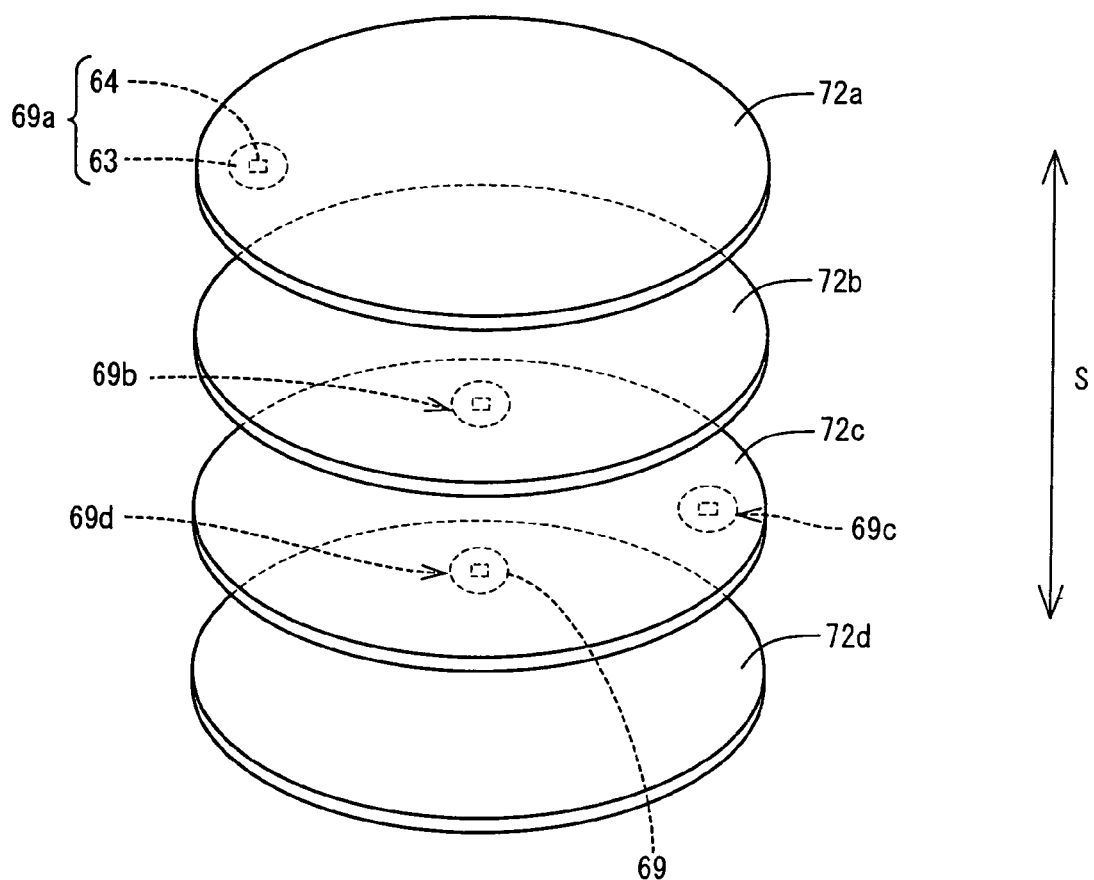
FIG. 18 is a perspective view showing a state in which circular holding sheet members of another embodiment are stacked up.

In FIG. 18, an information discriminating portion 69 is embedded in a circular holding sheet member 72 instead of the square holding sheet member 71 of FIG. 17. The circular holding sheet members 72 are stacked up in upward and downward directions S in FIG. 18. At this time, the information discriminating portions 69 of the holding sheet members 72a and 72b facing each other are disposed with intervals of 90 degrees, and hence the holding sheet members 72 are stacked up so that the positions of the information discriminating portions 69 do not coincide with each other in a plane perpendicular to the stack direction S as in the modification of FIG. 17. Therefore, since the frequency of overlapping the information discriminating portions 69 with each other in the stack direction S is decreased even when the circular holding sheet members 72 of this embodiment are stacked up, the thickness of the whole of the holding sheet members 72 stacked up is restrained from being increased by the swells caused by the information discriminating portions 69, and a noticeable space-saving effect can be obtained.

In the circular holding sheet member 72, the interval angle at which the information discriminating portions 69 are disposed is not limited to 90 degrees. An angle of 30 degrees, 45 degrees, or 120 degrees may be appropriately employed depending on the shape or size of the information discriminating portion 69.

In the holding sheet member 71 of FIG. 17 and the holding sheet member 72 of FIG. 18, the circular RFID antenna conductor 63 is used. However, instead of this, various types of antenna conductors, such as a long one as shown in FIG. 12, an elliptic one, a rectangular one, or a larger one than that of FIG. 12 can be used. Likewise, the square holding sheet member 71 or the circular holding sheet member 72 may be a rectangular or elliptic holding sheet member.

Many of the information discriminating portions 69 are not overlapped with each other in a predetermined direction in every structure mentioned above, and hence, even if excessive pressure is applied from one direction, many of the information discriminating portions 69 will not be damaged by the pressure.

Since the RFID chip 64 has a greater thickness than the antenna conductor 63 formed by a thin film metal or by printing, a part in which the RFID chip 64 is embedded appears as the top of a swollen part in the band-shaped sheet member 16 in most cases. However, if the information discriminating portion 69 is formed by disposing the RFID chip 64 so as to come into close contact with the flat part of the antenna conductor 63, the RFID chip 64 appears as the top of a swollen part in the band-shaped sheet member 16, without being limited to a case in which the RFID chip 64 is thicker than the antenna conductor 63. In other words, in the band-shaped sheet member 16 and the holding sheets 31 and 32 according to the foregoing embodiments and the third to fifth modifications, the top of a swollen part resulting from the presence of the RFID chip 64, which is one of the members constituting the information discriminating portion 69, is properly dispersed in the width direction or other directions. Therefore, the band-shaped sheet member 16 and the holding sheets 31 and 32 are formed so that the overlap of the swollen part caused by the RFID chip 64 becomes small in the radial direction of the rolled-up sheet member or in the stack direction.

In the modifications of FIG. 14 and FIG. 15, the RFID chips 64 are arranged in a line in the longitudinal direction of the band-shaped sheet member 16 unrolled and extended. The band-shaped sheet member 16 is formed so that a swollen part resulting from the presence of the antenna conductor 63, which is one of the members constituting the information discriminating portion 69, can be appropriately dispersed when the band-shaped sheet member 16 is wound. In other words, the sheet member 16 is formed so that the overlap of a part swollen by the antenna conductor 63 in the radial direction R of the rolled-up sheet member becomes smaller by allowing the antenna conductor 63 to intersect with the longitudinal direction of the band-shaped sheet member 16 than a conventional arrangement pattern shown in FIG. 19 in which a direction in which conventional information discriminating portions 270 are arranged, the longitudinal direction of a band-shaped sheet member 160, and the longitudinal direction of the information discriminating portion 270 are made parallel to each other.

Figure 19:
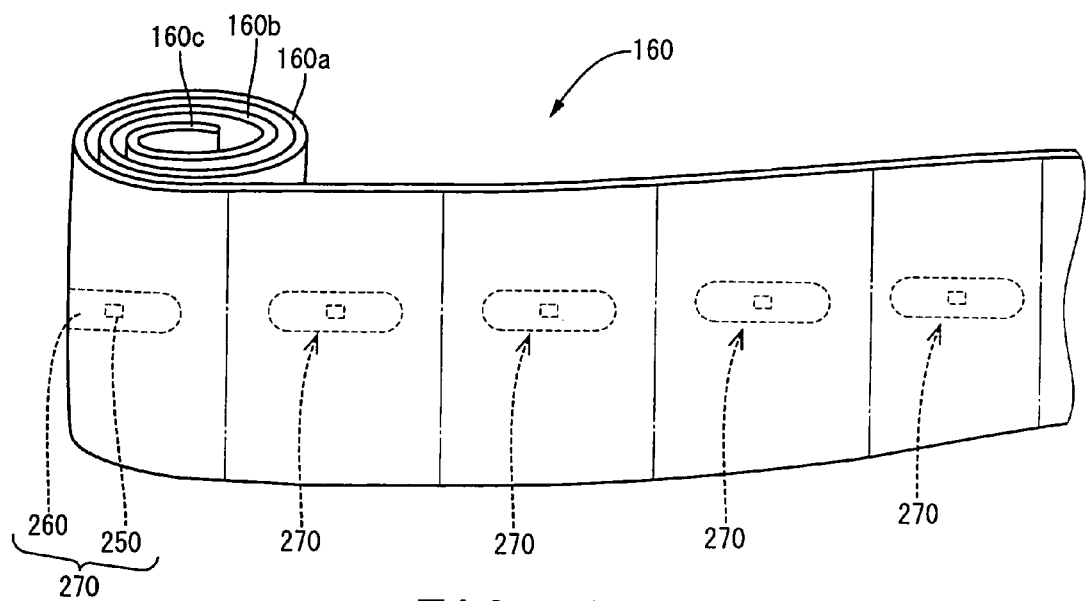
FIG. 19 is a perspective view for explaining a conventional band-shaped sheet member.

In a conventional technique, to produce the RFID label member, each information discriminating portion 270 is nipped from both sides, and is embedded in a band-shaped sheet member 160 made of, for example, paper so that the information discriminating portions 270 each of which is made up of an RFID chip 250 and a RFID antenna conductor 260 are arranged in a line in the longitudinal direction of the band-shaped sheet member 160 as shown in FIG. 19, and an image is printed directly onto the surface of the band-shaped sheet member 160. When each band-shaped sheet member 160 is wound or rolled in order to keep a large number of band-shaped sheet members 160, the surface of the band-shaped sheet member 160 is partially swollen since the information discriminating portion 270 having a certain degree of thickness is embedded in the band-shaped sheet member 160. When this band-shaped sheet member 160 is wound, a gap occurs between adjoining layers in the radial direction of the rolled-up sheet member 160 being layers in the thickness direction of the band-shaped sheet member 160, e.g., between a first peripheral layer part 160a and a second peripheral layer part 160b shown in FIG. 13. Therefore, the radius of the roll of the rolled-up sheet member 160 becomes larger across the full width thereof than a case in which the information discriminating portion 270 is not embedded in the band-shaped sheet member 160. In particular, if the information discriminating portions 270 embedded in adjoining layers, in particular, the RFID chips 250, are disposed so as to face each other when the band-shaped sheet member 160 is wound, the roll radius will become larger than a case in which the RFID chips 250 do not face each other in the whole of the rolled-up sheet member 160.

In the structure in which the information discriminating portions 270 are arranged in a line, the information discriminating portions 270 gather at a specific position in the width direction of the band-shaped sheet member 160, and a swollen part of a layer is overlapped with a swollen part of another layer. Therefore, even if the band-shaped sheet member 160 is more tightly wound to remove a gap between the layers, the neighborhood of the information discriminating portion 270 will be only tightened. The specific part, at which the information discriminating portions 270 gather, in the width direction of the band-shaped sheet member 160 remarkably rises, and the roll radius corresponding to the specific part hardly decreases. In the conventional technique, the plane shape of the label base material to be embedded in the information discriminating portion 270 is not a long one like a band, but a rectangular, square, or circular one. Likewise, when sheets of label base materials are stacked up to keep many sheets of label base materials, the whole of the sheets of label base materials stacked up becomes larger in thickness in the stack direction than a case in which the information discriminating portion 270 is not embedded in the sheet of label base material. Therefore, the conventional technique has a problem in the fact that a large space is required to keep the RFID labels having the information discriminating portions and the band-shaped sheet member used as a material thereof or to contain these members in, for example, a cartridge.

Seventh Embodiment

Figure 20:
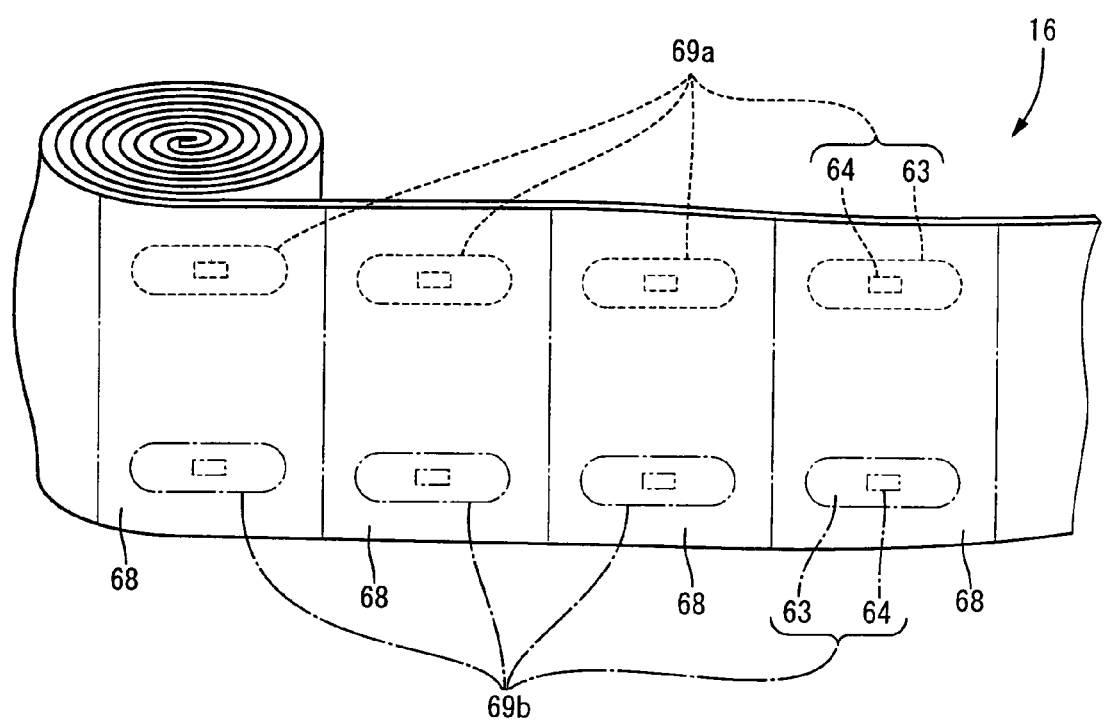
FIG. 20 is a view for explaining a band-shaped sheet member of another embodiment, corresponding to FIG. 12A.

FIG. 20 is a view for explaining an embodiment according to which the information discriminating portion 69 of the band-shaped sheet member 16 is reliably prevented from being damaged.

In FIG. 20, the RFID chip 64, which is a RFID element, and the long RFID antenna conductor 63 are embedded as one label unit in the band-shaped base-material tape 61. The label 68 having the information discriminating portion 69 is formed by being cut along the alternate long and short dash line of FIG. 20. A plurality of labels 68 each of which has the information discriminating portion 69 can be formed in the longitudinal direction of the base-material tape 61, i.e., in the rightward and leftward directions of FIG. 20, and the whole thereof is the band-shaped sheet member 16 of the present invention.

Figure 21:
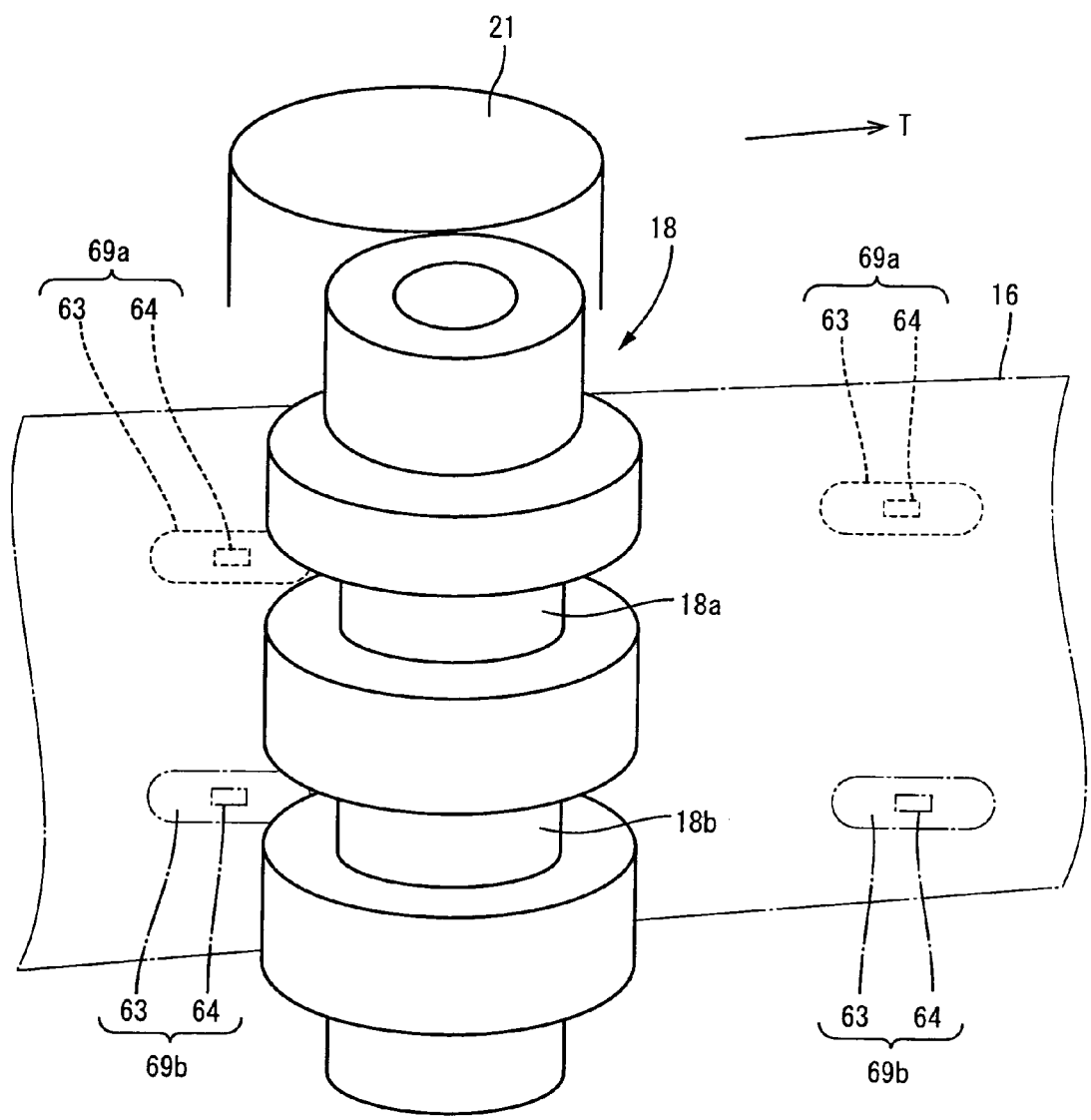
FIG. 21 is a perspective view showing a carrier roller used to convey the band-shaped sheet member of FIG. 20.

In the RFID label producing device 1, when the band-shaped sheet member 16 wound like a roll is used, a part of the band-shaped sheet member 16 is protruded from the band-shaped sheet member 16 because of the thickness of both the RFID chip 64 and the RFID antenna conductor 63 of the information discriminating portion 69, and, as a result, a swell is formed. As shown in FIG. 21, a plurality of annular concave grooves, i.e., two concave parts 18a and 18b in this embodiment, serving as pressure-absorbing means for absorbing a force pressing against the information discriminating portion 69 by partially reducing the diameter are formed at positions, which face the swells, of the roller surface (i.e., the outer peripheral surface) of a tape feed roller 18 that functions as a carrier roller.

The width of each of the concave parts 18a and 18b, i.e., the width dimension of the annular concave groove is greater than the width dimension of the information discriminating portion 69 in a direction perpendicular to a direction in which the information discriminating portion 69 is conveyed, i.e., in the upward and downward directions in FIG. 20. If the RFID antenna conductor 63 is formed like a thin film by printing, the width of each of the concave parts 18a and 18b may be smaller than the width of the RFID antenna conductor 63 as long as the width of each of the concave parts 18a and 18b is greater than the width of the RFID chip 64.

The use of the tape feed roller 18 having the concave parts 18a and 18b formed in the roller surface makes it possible to absorb an excessive force pressing against the information storage part 69 embedded in the band-shaped sheet member 16 when the band-shaped sheet member 16 is sandwiched between the tape feed roller 18 and the feed roller 21 while being conveyed, and makes it possible to reliably prevent identification data used as pieces of information from being lost or reliably prevent the information discriminating portion 69 from being destroyed by a deterioration in the RFID chip 64 resulting from the excessive pressing force against the RFID chip 64.

Additionally, the information discriminating portion 69 is prevented from not fulfilling a predetermined RFID function as a result of the destruction of a connecting portion between the RFID chip 64 and the RFID antenna conductor 63 by the pressure against the information discriminating portion 69.

It is recommended to form the concave parts 18a and 18b so as to have a depth proportional to the height of a swollen part generated by the thickness of the RFID chip 64 or the thickness of the RFID antenna conductor 63 of the information discriminating portion 69. That is, the width dimension or the depth dimension is determined so that the roller surface functioning as the bottom of each of the concave parts 18a and 18b does not exert an excessive pressing force on the information discriminating portion 69. The amount of the hollow of each of the concave parts 18a and 18b may be determined so that a pressing force is not exerted on the information discriminating portion 69 by keeping the information discriminating portion 69 and the roller surface apart from each other, or so that such a certain degree of pressing force as not to destroy or degrade the information discriminating portion 69 is exerted on the information discriminating portion 69 by bringing the information discriminating portion 69 and the roller surface into slight contact with each other. The reason is that the laminate tape 11 and the band-shaped sheet member 16 are appropriately stuck together by exerting such a certain degree of pressing force as not to destroy or degrade the information discriminating portion 69 thereon, or that the laminate tape 11 and the band-shaped sheet member 16 are excellently conveyed by increasing a contact area between the information discriminating portion 69 and the roller surface without keeping the two apart from each other. In many cases, in the information discriminating portion 69, the RFID chip 64 is thicker than the RFID antenna conductor 63, and the RFID chip 64 is more protruded toward the tape feed roller 18 than the RFID antenna conductor 63. Therefore, it is recommended to uniformly form the recess in accordance with the RFID chip 64. However, if the RFID chip 64 is surrounded with the RFID antenna conductor 63 that is thicker than the RFID chip 64 or that is more protruded toward the tape feed roller 18 than the RFID chip 64, the RFID antenna conductor 63 is more protruded toward the tape feed roller 18 than the RFID chip 64. If so, it is recommended to uniformly form the recess in accordance with the RFID antenna conductor 63. In other words, the recess is formed in accordance with a part that is farthest protruded toward the tape feed roller 18. There is no need to form a two-step recess.

The position where the information discriminating portion 69 shown in FIG. 20 is embedded and the position where the concave parts 18a and 18b shown in FIG. 21 are formed can be arbitrarily determined so that these positions coincide with each other.

The concave part 18a faces the information discriminating portions 69a arranged in series in the longitudinal direction of the band-shaped sheet member 16 on the upper side of the band-shaped sheet member 16 in FIG. 20 as shown by the broken line of FIG. 20, whereas the concave part 18b faces the information discriminating portions 69b arranged in series in the longitudinal direction of the band-shaped sheet member 16 on the lower side of the band-shaped sheet member 16 in FIG. 20 as shown by the alternate long and short dash line of FIG. 20. As described above, several rows of information discriminating portions 69 arranged in the longitudinal direction of the band-shaped sheet member 16 (e.g., a row of the information discriminating portions 69a shown by the broken line in FIG. 20 and a row of the information discriminating portions 69b shown by the alternate long and short dash line in FIG. 20) are disposed so that the rows are apart from each other at different positions in the width direction of the band-shaped sheet member 16, i.e., in a direction in which the rotational axis center of the tape feed roller 18 used to convey the band-shaped sheet member 16 extends. Even if several rows of information discriminating portions 69 are embedded in the band-shaped sheet member 16 in this way, it is possible to absorb an excessive pressing force exerted on the information discriminating portions 69 embedded at positions apart from each other in the width direction of the band-shaped sheet member 16 by providing a plurality of concave parts (e.g., the concave parts 18a and 18b) with a gap therebetween in the width direction of the band-shaped sheet member 16 in accordance with the positions where the information discriminating portions 69 are embedded in the width direction of the band-shaped sheet member 16 or in accordance with the number of rows of the information discriminating portions 69 in the width direction, i.e., in accordance with the number ("2" in FIG. 20) of rows extending in the longitudinal direction of the band-shaped sheet member 16.

For example, even in a case in which the two rows, i.e., the row of information discriminating portions 69a shown by the broken line in FIG. 20 and the row of information discriminating portions 69b shown by the alternate long and short dash line in FIG. 20 are provided in the band-shaped sheet member 16 with an interval between the two rows in the width direction of the band-shaped sheet member 16 and in which the two rows of information discriminating portions 69a and 69b simultaneously pass between the tape feed roller 18 and the feed roller 21, the two concave parts 18a and 18b are formed on the entire periphery of the tape feed roller 18 in accordance with the positions of the two rows of information discriminating portions 69a and 69b in the width direction of the band-shaped sheet member 16, and excessive pressing forces exerted on the row of information discriminating portions 69*a* and on the row of information discriminating portions 69*b* can be simultaneously absorbed. Additionally, even in a case in which the two rows of information discriminating portions 69*a* and 69*b* pass between the tape feed roller 18 and the feed roller 21 not at the same time but with a time lag, i.e., even in a case in which the information discriminating portions 69*a* and 69*b* are disposed in a zigzag in the longitudinal direction of the band-shaped sheet member 16 every other information discriminating portion, the excessive pressing force exerted on the information discriminating portions 69*a* or on the information discriminating portions 69*b* can be appropriately absorbed by this tape feed roller 18. Even in a case in which the band-shaped sheet member 16 is replaced with another band-shaped sheet member 16 differing in the widthwise position where the information discriminating portion 69 is embedded, the tape feed roller 18 does not need to be replaced with another if the tape feed roller 18 has a concave part corresponding to the position of an information discriminating portion 69 of the other band-shaped sheet member 16, and the job time is reduced.

Additionally, if the information discriminating portion 69 faces only a specific part of the periphery of the tape feed roller 18 when the information discriminating portion 69 passes between the tape feed roller 18 and the feed roller 21, there is no need to form the concave parts 18*a* and 18*b* on the entire periphery of the tape feed roller 18. However, an excessive pressing force exerted on the information discriminating portions 69 can be appropriately absorbed by forming the concave parts 18*a* and 18*b* on the entire periphery of the tape feed roller 18 even when a deviation in-the conveyance of the band-shaped sheet member 16 occurs or even when intervals with which the information discriminating portions 69 are arranged in the longitudinal direction of the band-shaped sheet member 16 are not fixed. Preferably, the number of rows of information discriminating portions 69 arranged in the longitudinal direction of the band-shaped sheet member 16 is two or more, without being limited to two.

Eighth Embodiment

Figure 22:
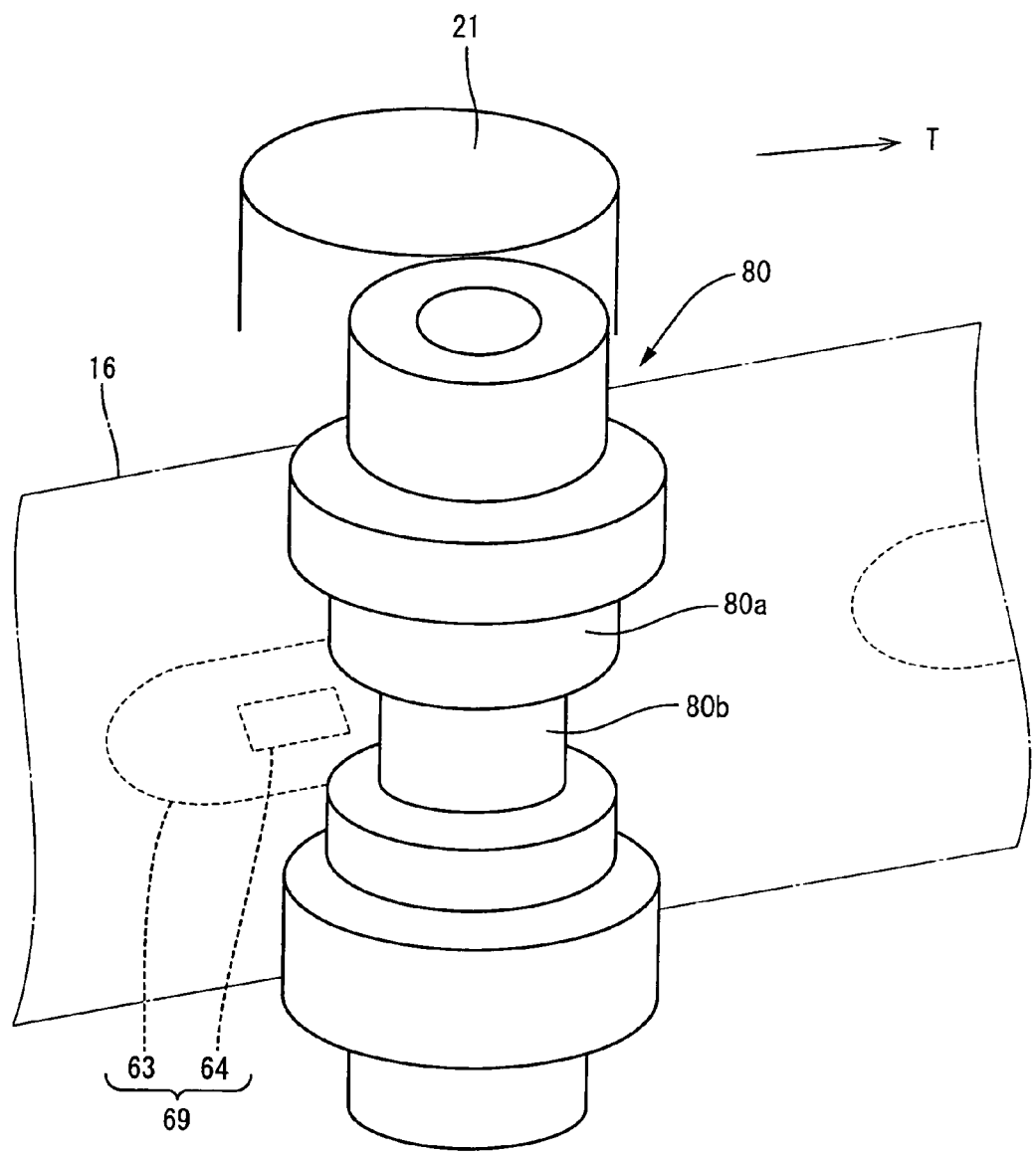
FIG. 22 is a perspective view showing a carrier roller of another embodiment, corresponding to FIG. 21.

Referring now to FIG. 22, a tape feed roller 80 that is a carrier roller according to another embodiment will be described.

In FIG. 22, a first concave part 80*a* is formed at a position of the tape feed roller 80 facing the RFID antenna conductors 63 that occupy the center in the width direction of the band-shaped sheet member 16 and that are arranged in the longitudinal direction thereof (see FIG. 23) by partially making the diameter of the tape feed roller 80 smaller, whereas a second concave part 80*b* greater in depth than the first concave part 80*a* is formed at a position of the tape feed roller 80 facing the RFID chips 64 by partially making the diameter of the tape feed roller 80 even smaller. In other words, two concave parts 80*a* separated from each other in the width direction of the band-shaped sheet member 16, i.e., in the axial direction of the tape feed roller 80 are formed in the tape feed roller 80. A two-step concave part is formed in accordance with the cross-sectional shape of the information discriminating portion 69 (i.e., the shape of a cross section perpendicular to the longitudinal direction of the band-shaped sheet member 16) by forming a concave part 80*b*, which is greater in the amount of a hollow (i.e., in depth) than the concave part 80*a* and which communicates with the concave part 80*a*, between the two concave parts 80*a*. It is obvious that these two concave parts 80*a* and 80*b* are included in the scope of a plurality of concave parts of the present invention. Alternatively, a two-step concave part is formed in accordance with the cross-sectional shape of the information discriminating portion 69 (i.e., the shape of a cross section perpendicular to the longitudinal direction of the band-shaped sheet member 16) by forming a concave part 80*a* in the tape feed roller 80 and by forming a concave part 80*b* communicating with the circumferential surface serving as the bottom of the concave part 80*a* so as to become greater in the amount of a hollow (i.e., in depth) than the concave part 80*a* in the middle of the concave part 80*a*. Likewise, it is obvious that these two concave parts 80*a* and 80*b* are included in the scope of a plurality of concave parts of the present invention.

In many cases, in the information discriminating portion 69, the RFID chip 64 is thicker than the RFID antenna conductor 63, and the RFID chip 64 is more protruded toward the tape feed roller 80 than the RFID antenna conductor 63, and, accordingly, the concave part 80*b* is formed so as to be greater in the amount of a hollow (i.e., in depth) than the concave part 80*a*. Therefore, even if the RFID chip 64 is surrounded with the RFID antenna conductor 63 that is not more protruded toward the tape feed roller 80 than the RFID chip 64 or even if the RFID chip 64 is disposed on the surface of the tape feed roller 80 in the RFID antenna conductor 63, an excessive pressing force is never exerted on the RFID antenna conductor 63, and the excessive pressing force against the information discriminating portion 69 can be absorbed, because the amount of the hollow of the concave part 80*b* is greater than that of the concave part 80*a*.

Since the concave parts 80*a* and 80*b* depend on the cross section perpendicular to the longitudinal direction of the band-shaped sheet member 16, the concave parts 80*a* between which the concave part 80*b* is formed do not need to be equal to each other in the amount of a hollow, for example, if the thickness of the RFID antenna conductor 63 is not uniform. Additionally, since the hollowed part is structured as a two-step concave part without making the concave parts 80*a* and 80*b* uniform in the amount of a hollow, an extra space can be removed by forming an appropriate gap between the information discriminating portion 69 and the roller surface so as not to exert a pressing force on the information discriminating portion 69 as the amount of a hollow matched to the RFID chip 64 or to the RFID antenna conductor 63. Additionally, the laminate tape 11 and the band-shaped sheet member 16 can be excellently conveyed by appropriately sticking the laminate tape 11 and the band-shaped sheet member 16 together or by increasing a contact area between the information discriminating portion 69 and the roller surface without forming an extra gap therebetween so as to exert such a certain degree of pressing force as not to destroy or degrade the information discriminating portion 69. The number of steps can be set at three or more. The amount of the hollow of the concave parts 80*a* and 80*b* may be determined so that the roller surface comes into contact with one of the RFID chip 64 and the RFID antenna conductor 63 but does not come into contact with the other one.

According to this embodiment, an excessive pressing force exerted on the information discriminating portion 69 embedded in the band-shaped sheet member 16 can be absorbed in the same way as in the tape feed roller 18, and identification data used as pieces of information can be reliably prevented from being lost by a deterioration in the RFID chip 64 resulting from the excessive pressing force against the RFID chip 64, or the information discriminating portion 69 can be reliably prevented from being destroyed.

In this embodiment, a description has been given of a structure in which the tape feed rollers 18 and 80 have the plurality of concave parts 18*a* and 18*b* or the concave parts 80*a* and 80*b* differing in depth. However, the same effect can be obtained even by providing an elastic portion made of a cushion, such as a soft sponge, that is elastically deformed by the information discriminating portion 69, instead of the concave parts 18a and 18b.

Alternatively, it is permissible to form the concave parts 18a, 18b, 80a, and 80b and dispose a cushion inside each of the concave parts 18a, 18b, 80a, and 80b.

In the embodiment and the modifications, a description has been given of a structure in which the tape feed rollers 18 and 80 have the pressure absorbing means (the concave parts or the elastic portion). However, the loss of identification data stored in the information discriminating portion 69 can be effectively prevented, and the destruction of the information discriminating portion can be effectively prevented even by employing a structure in which the feed roller 21, which holds the band-shaped sheet member 16 having the information discriminating portion 69 together with the tape feed roller 18 or 80 in a sandwiched manner, is provided with the same pressure absorbing means (the concave parts or the elastic portion) as above.

In the concave parts 18a, 18b, 80a, and 80b, the cross section perpendicular to the longitudinal direction of the band-shaped sheet member 16 is shaped like a rectangle or is shaped by straight lines perpendicular to each other, e.g., by combining rectangles together or turning the convexity upside down. Without being limited to this, the cross section may be shaped by curves or straight lines that intersect each other at an acute angle. For example, the shape of the cross section of the hollowed part maybe a triangle, a trapezoid, a semicircle, or a semi-ellipse. Additionally, sets of two-step concave parts 80a and 80b shown in FIG. 22 may be formed in the single tape feed roller 18 with a gap between the sets in the width direction of the band-shaped sheet member 16 as shown in FIG. 21.

Since the RFID label has its maximum thickness when the RFID label is outwardly discharged after completing the production thereof, the pair of rollers consisting of the carrier roller and the feed roller are disposed at a discharge portion from which the RFID label is outwardly discharged. Therefore, the effect by which the deterioration or destruction of the information discriminating portion 69 is prevented can be more greatly heightened.

In the above embodiment, a description has been given of a structure in which the band-shaped sheet member 16 having the information discriminating portion 69 is stuck onto the laminate tape 11 on which an image has been formed. However, instead of this structure, a possible structure can be proposed to form an image directly on the band-shaped sheet member 16 having the information discriminating portion 69 by a thermal printing mechanism PM serving as an image forming means. According to this structure, the band-shaped sheet member 16 having the information discriminating portion 69 is an object on which an image is formed, and the band-shaped sheet member 16 is pressed against the thermal head 19 by means of the platen 20 facing the thermal head 19. The same applies to a case in which an image is printed on the surface of the band-shaped sheet member 16 after sticking the band-shaped sheet member 16 and the laminate tape 11 together. Even when an image is formed on the band-shaped sheet member 16 having the information discriminating portion 69, an excessive pressing force exerted on the information discriminating portion 69 can be absorbed by forming concave parts in the platen 20 in the same way as in the tape feed rollers 18 and 80 or by providing the platen 20 with an elastic body that is elastically deformed by the information discriminating portion 69. Therefore, the loss of identification data stored in the information discriminating portion 69 can be effectively prevented, and the destruction of the information discriminating portion can be effectively prevented.

Additionally, in the above embodiment, a description has been given of the RFID element where identification data is stored. However, as a matter of course, the present invention can be applied to an identification data writing device that has the read/write device V (see FIG. 3) for reading and writing identification data.

Figure 23:
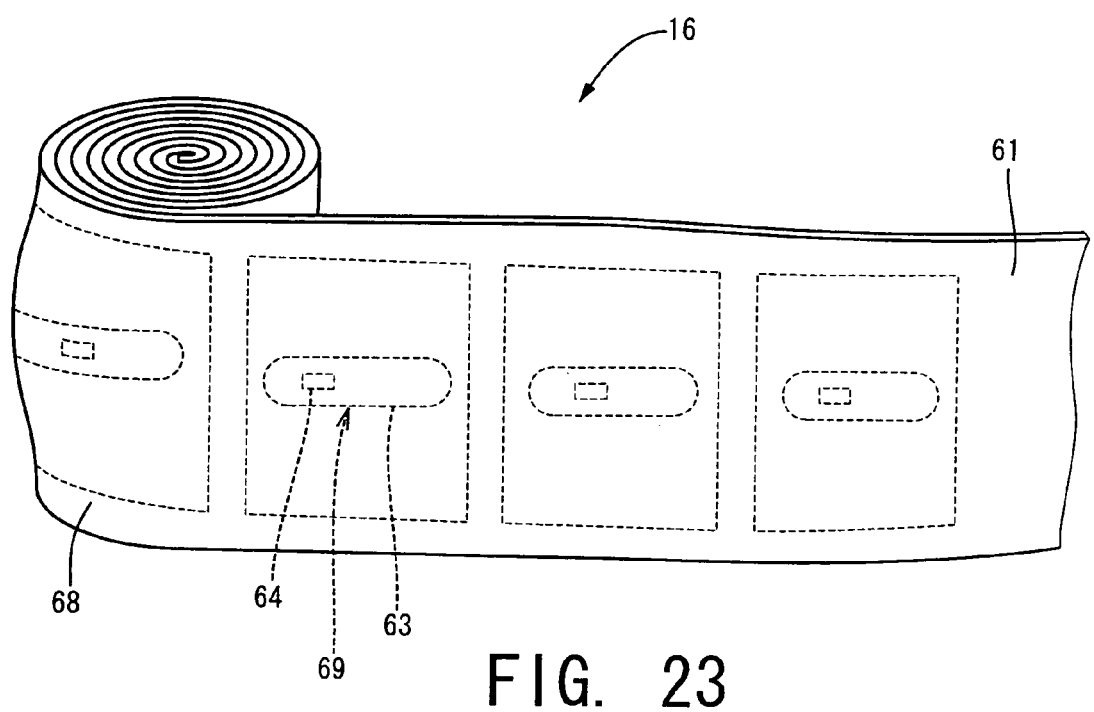
FIG. 23 is a perspective view showing a band-shaped sheet member that is conveyed by the carrier roller of FIG. 22.

Although the band-shaped sheet member 16 is a single, long, continuous surface, the band-shaped sheet member 16 may be formed by placing a rectangular sheet member, such as that shown by the broken line in FIG. 23, on a separation sheet and sticking this onto the laminate tape 11.

Any one of an electrostatic coupling method, an electromagnetic coupling method, an electromagnetic induction method, a microwave method, and a UHF method can be employed as the RFID transmission system. The present invention can, of course, be embodied in various aspects in the scope not departing from the characteristics of the present invention. For example, if a guide roller by which the band-shaped sheet member 16 is bent is provided, the band-shaped sheet member 16 is pressed against the guide roller by its tension. However, as in the above example, the deterioration or destruction of the information discriminating portion 69 can be prevented by forming at least one of the concave parts 18a, 18b, 80a, and 80b in the guide roller.

According to a possible way, an image is formed on the laminate tape 11 or on the band-shaped sheet member 16 by means of an ink jet head that forms an image while discharging ink, instead of the thermal head 19. At this time, if at least one of the concave parts 18a, 18b, 80a, and 80b mentioned above is formed in the platen 20, the laminate tape 11 or the band-shaped sheet member 16 is brought into contact with the platen 20, and a position corresponding to the ink jet head is fixed. Even if the laminate tape 11 or the band-shaped sheet member 16 is partially protruded by the information discriminating portion 69 at this time, a part of the protrusion enters the concave parts 18a, 18b, 80a, and 80b. Therefore, the inkjet head never excessively approaches the image formation surface of the laminate tape 11 or the band-shaped sheet member 16.

Ninth Embodiment

Figure 24:
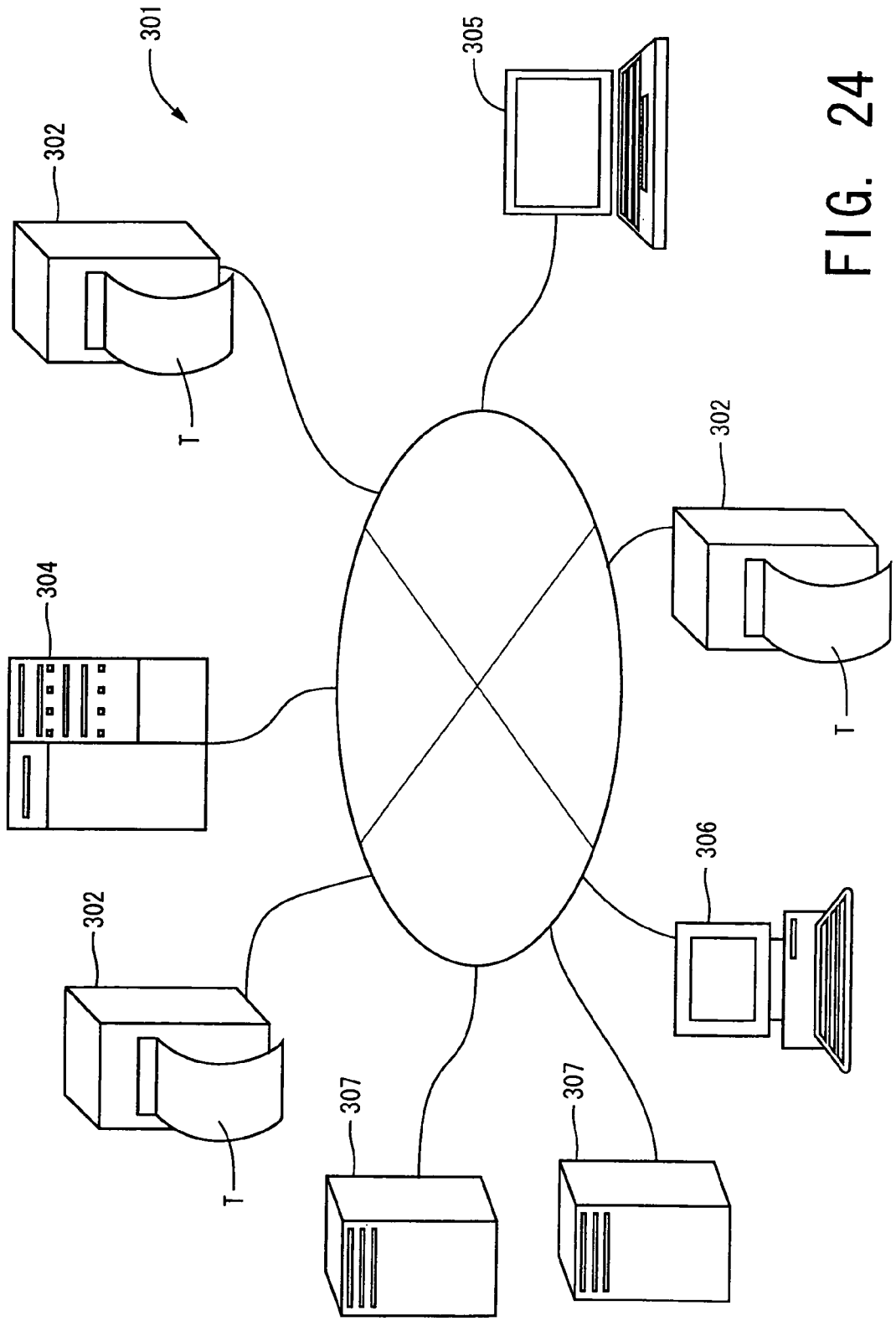
FIG. 24 is a system configuration view showing a RFID-tag manufacturing system to which a tag-label producing device for producing a RFID label according to an embodiment of the present invention is applied.

FIG. 24 is a system configuration view showing a RFID tag manufacturing system including a tag-label producing device for producing a RFID label according to this embodiment.

In the RFID tag manufacturing system 301 of FIG. 24, the tag-label producing device 302 is connected through a wire or wireless communication line 303 to a route server 304, a terminal 305, a general purpose computer 306, and a plurality of information servers 307.

Figure 25:
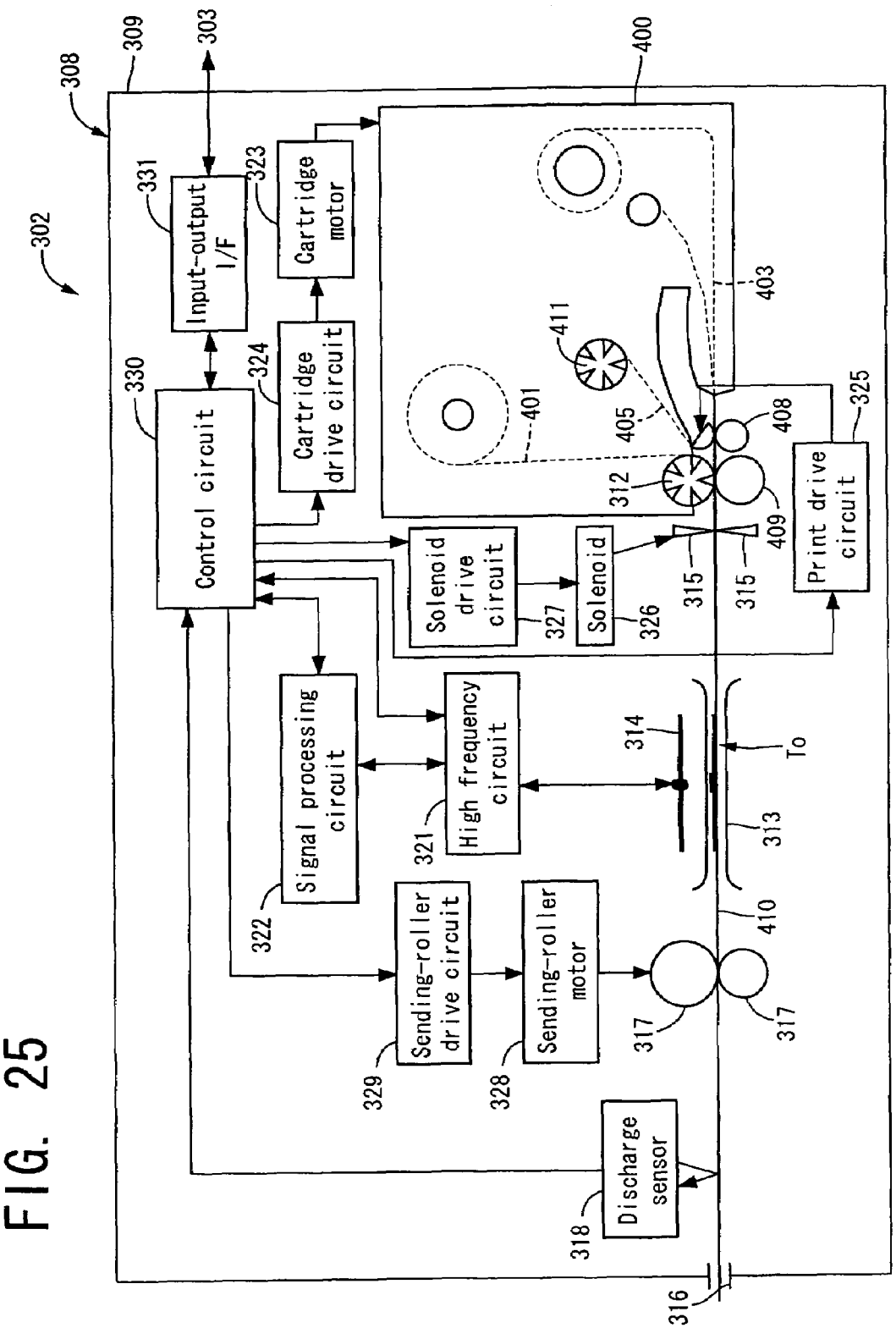
FIG. 25 is a conceptual schematic view showing a detailed structure of the tag-label producing device of FIG. 24.

FIG. 25 is a conceptual schematic view showing a detailed structure of the tag-label producing device of the tag-label producing device 302.

In FIG. 25, a cartridge holding portion (not shown) formed as a concave part is mounted in a main body 308 of the tag-label producing device 302. A cartridge (RFID circuit element cartridge) 400 is detachably attached to the holding portion.

The main body 308 includes a housing 309 that has the cartridge holding portion to which the cartridge 400 is fitted and that forms an outer frame, a print head (thermal head) 310 that applies predetermined marks or characters onto a cover film (to-be-printed tape) 403, a ribbon-take-up-roller drive shaft 311 that drives an ink ribbon 405 that has finished printing onto the cover film 403, a tape-feed-roller drive shaft 312 that sends out the cover film (to-be-printed tape) 403 and a band-shaped tag tape 401 from the cartridge 400 while sticking the cover film 403 and the band-shaped tag tape 401 together as a tag-label tape 410 for a tag label on which an image has been printed, an antenna 314 for exchanging signals with a RFID circuit element To (described later) included in the tag-label tape 410 on a high frequency, such as a UHF wave, by radio communication, a cutter 315 that cuts the tag-label tape 410 into tapes, each of which has a predetermined length, at a predetermined timing and produces label-shaped RFID labels T (described later), a pair of conveyance guides 313 for setting and holding the RFID circuit element To in a predetermined access area that faces the antenna 314 when signals are exchanged by the radio communication and guiding each RFID label T cut by the cutter 315, a sending roller 317 that conveys the RFID label T guided by the guides 313 to a carry-out exit (outlet) 316 and sends the RFID label T therefrom, and a discharge sensor 318 that detects whether the RFID label T is present or absent at the carry-out exit 316.

The discharge sensor 318 is, for example, a reflection type photoelectric sensor consisting of a light emitter and a light receiver. If the RFID label T is not present between the light emitter and the light receiver, light emitted from the light emitter is input to the light receiver. On the other hand, if the RFID label T is present between the light emitter and the light receiver, light emitted from the light emitter is blocked, and a control output from the light receiver is reversed.

The main body 308 further includes a high frequency circuit 321 for accessing (i.e., reading from or writing onto) the RFID circuit element To via the antenna 314, a signal processing circuit 322 for processing a signal read from the RFID circuit element To, a cartridge motor 323 that drives the ribbon-take-up-roller drive shaft 311 and the tape-feed-roller drive shaft 312, a cartridge drive circuit 324 that controls the driving of the cartridge motor 323, a print drive circuit 325 that controls the energization of the print head 310, a solenoid 326 that drives the cutter 315 so that the cutter 315 can perform a cutting operation, a solenoid drive circuit 327 that controls the solenoid 326, a sending-roller motor 328 that drives the sending roller 317, a sending-roller drive circuit 329 that controls the sending-roller motor 328, a control circuit 330 that controls the whole operation of the tag-label producing device 302 through the high frequency circuit 321, the signal processing circuit 322, the cartridge drive circuit 324, the print drive circuit 325, the solenoid drive circuit 327, the sending-roller drive circuit 329, etc.

The control circuit 330, a detailed drawing of which is omitted here, is a so-called microcomputer that is made up of a CPU (central processing unit), a ROM, a RAM, etc. The control circuit 330 performs signal processing in accordance with a program prestored in the ROM while using the temporary memory function of the RAM. The control circuit 330 is connected to, for example, the communication line 303 through an input-output interface 331, and can exchange information with the route server 304, the terminal 305, the general purpose computer 306, and the information server 307 that are connected to the communication line 303.

Figure 26:
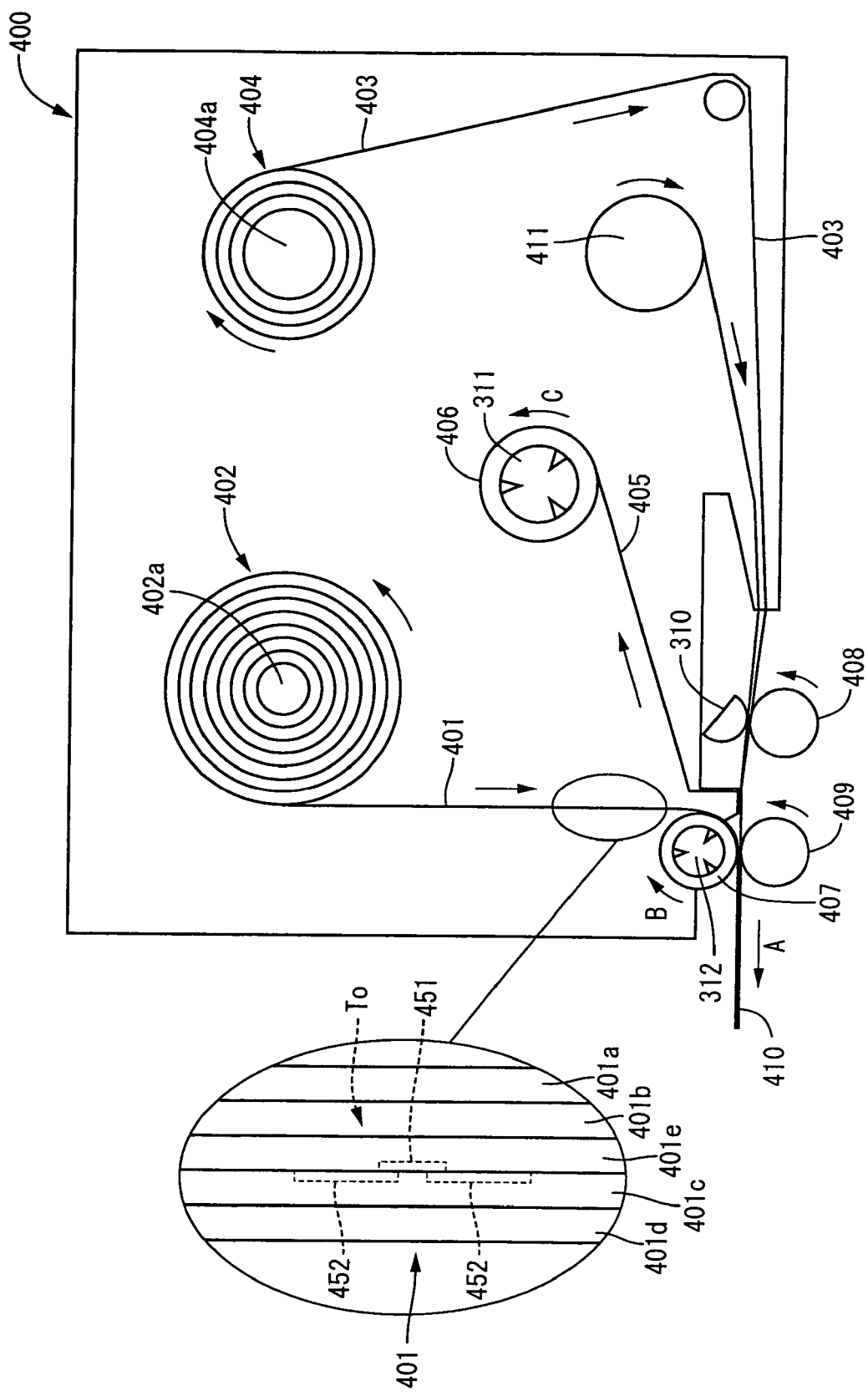
FIG. 26 is an explanatory drawing for explaining a detailed structure of a cartridge shown in FIG. 25.

FIG. 26 is an explanatory drawing for explaining a detailed structure of the cartridge 400 mounted in the tag-label producing device 302.

In FIG. 26, the cartridge 400 includes a first roll (tag tape roll) 402 on which the tag tape 401 is wound, a second roll (to-be-printed tape roll) 404 on which the cover film 403, which has substantially the same width as the tag tape 401 and which is optically transmissible (transparent or semitransparent), is wound, a ribbon-supply-side roll 411 that sends out the ink ribbon 405 (thermal transfer ribbon, which becomes unnecessary if the cover film 403 is a thermally-sensitive tape), the ribbon take-up roller 406 that takes up the ink ribbon 405 that has finished printing, and a compression roller 407 that compresses and sticks the tag tape 401 and the cover film 403 together so as to produce the tag-label tape 410 and sends the produced tape in the direction of arrow A.

The first roll 402 has the tag tape 401 wound on a reel member 402a. On the tag tape 401, the RFID circuit elements To are continuously and serially arranged with predetermined equal intervals in the longitudinal direction of the tag tape 401.

The tag tape 401 has a five-layer structure in this example (see a partially enlarged view of the tag tape 401 shown in FIG. 26). As shown in the partially enlarged view of the tag tape 401, the tag tape 401 is structured by an adhesive layer (gluing adhesive layer) 401a that has a proper color and an adhesive properly selected so that desired adhesive characteristics can be obtained, a colored base film (tag tape base layer) 401b that is made of, for example, PET (polyethylene terephthalate), an adhesive layer (fixing adhesive layer) 401e that has an adhesive properly selected so that desired adhesive characteristics can be obtained, an adhesive layer (affixing adhesive layer) 401c that has an adhesive properly selected so that desired adhesive characteristics can be obtained, and a separation sheet (separation material layer) 401d, which are stacked together in this order from a side (i.e., from the right side in FIG. 26) where the tag tape 401 is inwardly wound toward an opposite side (i.e., toward the left side in FIG. 26).

The adhesive layer 401a used to later stick the cover film 403 is placed on the front side (right side in FIG. 26) of the base film 401b. The adhesive layer 401e is placed on the reverse side (left side in FIG. 26) of the base film 401b. The RFID circuit element To, which consists of an IC circuit part 451 that stores information and an antenna (tag side antenna) 452 that is connected to the IC circuit part 451 and that transfers and receives the information, is stack and fixed to the base film 401b by the adhesive layer 401e.

The adhesive layer 401c used to stick the separation sheet 401d to the base film 401b is placed on the reverse side (left side in FIG. 26) of the adhesive layer 401e in such a way that the adhesive layer 401c wraps the RFID circuit element To. The adhesive layer 401c and the adhesive layer 401e are firmly stuck together, so that the adhesive layers 401c and 401e reach a state of being fastened substantially as one united body when the tag tape 401 is produced. When the RFID label T finally formed as a complete label is stuck onto, for example, a predetermined article, the separation sheet 401d is separated from the main side of the tag tape (i.e., from the adhesive layer 401c), and the RFID label T is stuck and affixed to the article by the adhesive layer 401c.

As mentioned above, the adhesive layer 401c is placed on the whole surface of the reverse side of the adhesive layer 401e in such a way that the adhesive layer 401c wraps the RFID circuit element To. However, without being limited to this, the adhesive layer 401b may be placed at a position other than the position of the RFID circuit element To disposed on the reverse side of the adhesive layer 401e. Likewise, the adhesive layer 401c may be placed at a position other than the position of the RFID circuit element To disposed thereon. Advantageously, in these cases, the tag tape 401 or the RFID label T completely produced can be made thinner.

The second roll 404 has the cover film 403 wound on a reel member 404a. The ink ribbon 405, which is driven by the ribbon take-up roller 406 and the ribbon-supply-side roll 411 disposed on the side of the back surface of the cover film 403 (i.e., the side where the cover film 403 is stuck onto the tag tape 401), is pressed by the print head 310, and is brought into contact with the back surface of the cover film 403.

The ribbon take-up roller 406 and the compression roller 407 are rotationally driven by transmitting the driving force of the cartridge motor 323 (see FIG. 25), such as a pulse motor, disposed outside the cartridge 400 to the ribbon-take-up-roller drive shaft 311 and the tape-feed-roller drive shaft 312, respectively.

In the cartridge 400 structured as described above, the tag tape 401 is drawn out from the first roll 402, and is fed to the compression roller 407. On the other hand, the cover film 403 is drawn out from the second roll 404, and the back surface of the cover film 403 comes into contact with the ink ribbon 405 as described above.

When the cartridge 400 is attached to the cartridge holding portion of the main body 308, and a roll holder (not shown) is moved from a separate position to a contact position, the cover film 403 and the ink ribbon 405 are sandwiched between the print head 310 and a platen roller 408, whereas the tag tape 401 and the cover film 403 are sandwiched between the compression roller 407 and a sub-roller 409. The ribbon take-up roller 406 and the compression roller 407 are synchronously driven and rotated by the driving force of the cartridge motor 323 in the direction of arrow B and in the direction of arrow C, respectively. At this time, since the tape-feed-roller drive shaft 312, the sub-roller 409, and the platen roller 408 are connected together by gears (not shown), the compression roller 407, the sub-roller 409, and the platen roller 408 are rotated in accordance with the driving of the tape-feed-roller drive shaft 312, and the five-layer tag tape 401 is drawn out from the first roll 402, and is fed to the compression roller 407 as described above. On the other hand, the cover film 403 is drawn out from the second roll 404, and a plurality of heater elements of the print head 310 are energized by the print drive circuit 325. As a result, predetermined print characters R, such as letters, marks, or bar codes (see FIG. 30 described later), are printed on the back surface of the cover film 403 (i.e., on the surface on the side of the adhesive layer 401a). (Note that, since printing is performed from the back surface of the cover film, mirror-symmetrical characters or the like (when viewed from the printing side) are printed.) The five-layer tag tape 401 and the cover film 403 on which characters have been printed are then stuck together and are united into the tag-label tape 410 by the compression roller 407 and the sub-roller 409, thus carrying the tag-label tape 410 out of the cartridge 400. The ink ribbon 405 that has finished printing onto the cover film 403 is taken up on the ribbon take-up roller 406 by the driving of the ribbon-take-up-roller drive shaft 311.

Figure 27:
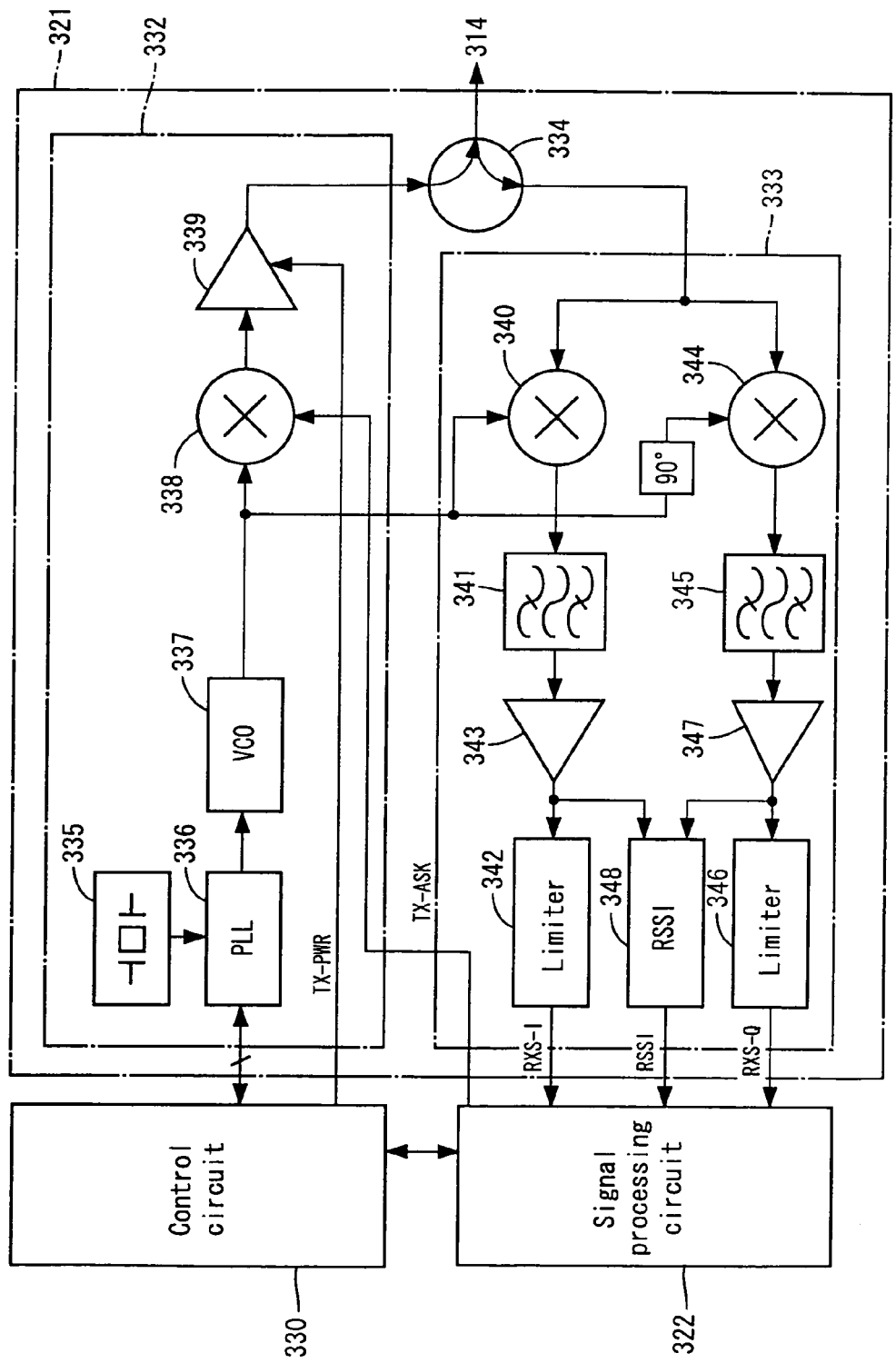
FIG. 27 is a functional block diagram showing a detailed function of a high frequency circuit shown in FIG. 25.

FIG. 27 is a functional block diagram showing a detailed function of the high frequency circuit 321. In FIG. 27, the high frequency circuit 321 is made up of a sending portion 332 that sends a signal to the RFID circuit element To via the antenna 314, a receiving portion 333 that inputs a reflected wave from the RFID circuit element To received by the antenna 314, and a send-receive splitter 334.

The sending portion 332 includes a crystal oscillator 335 that generates a carrier wave to access the RFID tag information of the IC circuit part 451 of the RFID circuit element To (i.e., to read information therefrom or write information thereonto), a PLL (Phase Locked Loop) 336, a VCO (Voltage Controlled Oscillator) 337, a transmission multiplying circuit 338 that modulates the generated carrier wave based on a signal supplied from the signal processing circuit 322 (in this embodiment, a transmission multiplying circuit that performs amplitude modulation based on a "TX_ASK" signal sent from the signal processing circuit 322; note that, for example, an amplification-factor variable amplifier may be used in amplitude modulation), and a transmission amplifier 339 that amplifies a wave modulated by the transmission multiplying circuit 338. Preferably, a frequency in a UHF band is used as the generated carrier wave. The output of the transmission amplifier 339 is transmitted to the antenna 314 through the send-receive splitter 334, and is supplied to the IC circuit part 451 of the RFID circuit element To.

The receiving portion 333 includes a first reception multiplying circuit 340 that multiplies the reflected wave from the RFID circuit element To received by the antenna 314 and the generated carrier wave together, a first band-pass filter 341 used to extract only a signal of a necessary band from the output of the first reception multiplying circuit 340, a first reception amplifier 343 that amplifies the output of the first band-pass filter 341 and supplies the amplified output to a first limiter 342, a second reception multiplying circuit 344 that multiplies the reflected wave from the RFID circuit element To received by the antenna 314 and a carrier wave whose phase has been delayed by 90° after the wave has been generated together, a second band-pass filter 345 used to extract only a signal of a necessary band from the output of the second reception multiplying circuit 344, and a second reception amplifier 347 that inputs and amplifies the output of the second band-pass filter 345 and supplies the amplified output to the second limiter 346. A signal "RXS-I" output from the first limiter 342 and a signal "RXS-Q" output from the second limiter 346 are input into and processed by the signal processing circuit 322.

The output of the first reception amplifier 343 and the output of the second reception amplifier 347 are also input into an RSSI (Received Sign Strength Indicator) circuit 348, and a signal "RSSI" that indicates the strength of these signals is input into the signal processing circuit 322. In the tag-label producing device 302 according to this embodiment, the reflected wave from the RFID circuit element To is demodulated by I-Q orthogonal demodulation in this way.

Figure 28:
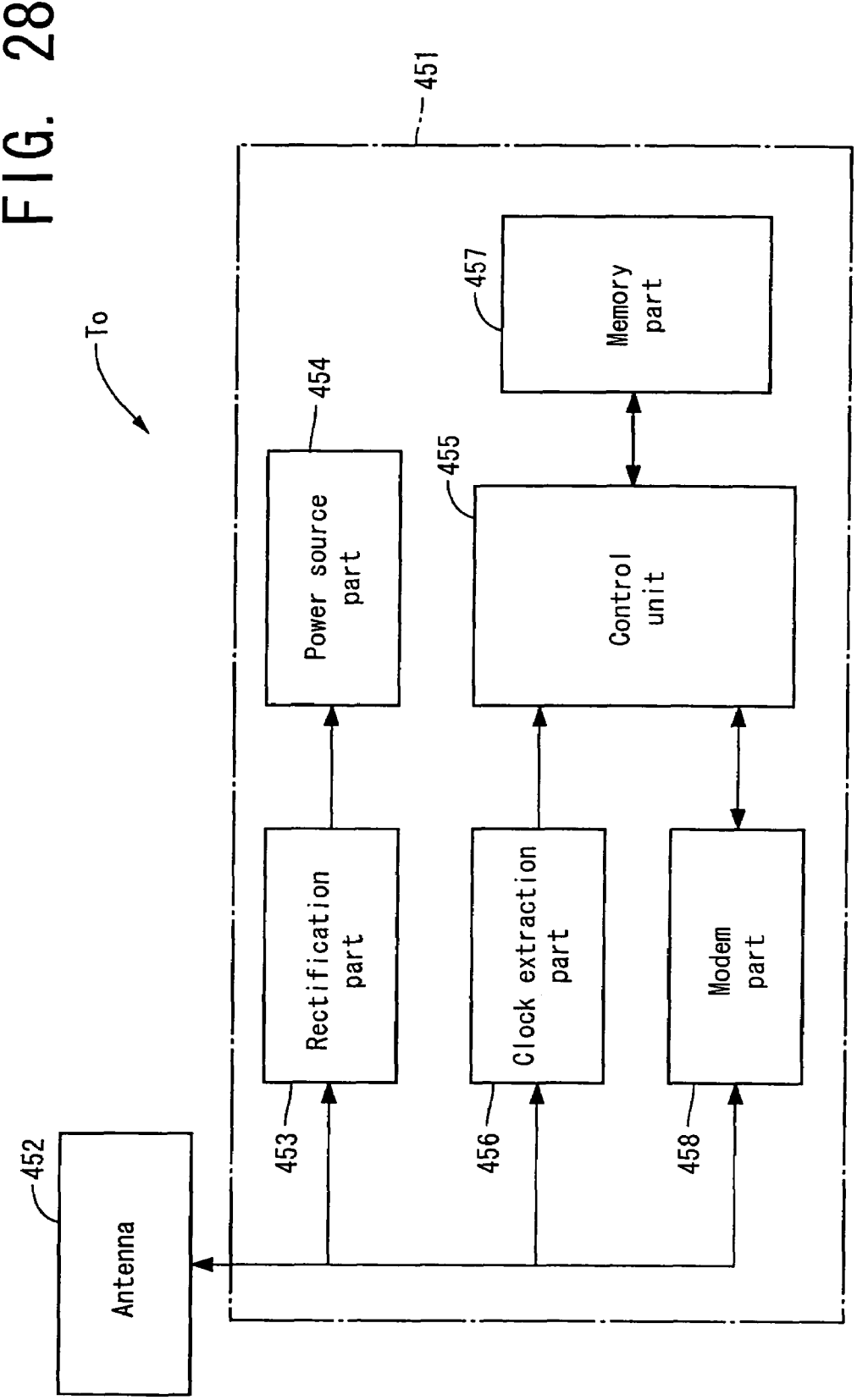
FIG. 28 is a functional block diagram showing a functional structure of a RFID circuit element.

FIG. 28 is a functional block diagram showing a functional structure of the RFID circuit element To provided in the characters-printed tag tape 410.

In FIG. 28, the RFID circuit element To includes the antenna (tag-side antenna) 452, which sends and receives a signal in a non-contact manner using the antenna 314 disposed on the side of the tag-label producing device 302 and a high frequency such as that of the UHF band, and the IC circuit part 451 connected to the antenna 452.

The IC circuit part 451 includes a rectification part 453 that rectifies the carrier wave received by the antenna 452, a power source part 454 used as a power source for driving the IC circuit part 451 by storing the energy of the carrier wave rectified by the rectification part 453, a clock extraction part 456 that extracts a clock signal from the carrier wave received by the antenna 452 and supplies this signal to a control unit 455, a memory part 457 that functions as an information storage means that can store a predetermined information signal, a modem part 458 connected to the antenna 452, and the control unit 455 that controls the operation of the RFID circuit element To through the rectification part 453, the clock extraction part 456, the modem part 458, etc.

The modem part 458 demodulates a wireless communication signal from the antenna 314 of the tag-label producing device 302 received by the antenna 452, and, based on a reply signal from the control unit 455, modulates and reflects the carrier wave received by the antenna 452.

The control unit 455 interprets a reception signal demodulated by the modem part 458, and generates a reply signal based on the information signal stored in the memory part 457, and performs a basic control operation such as a control operation of giving a reply by the modem part 458.

Figure 29:
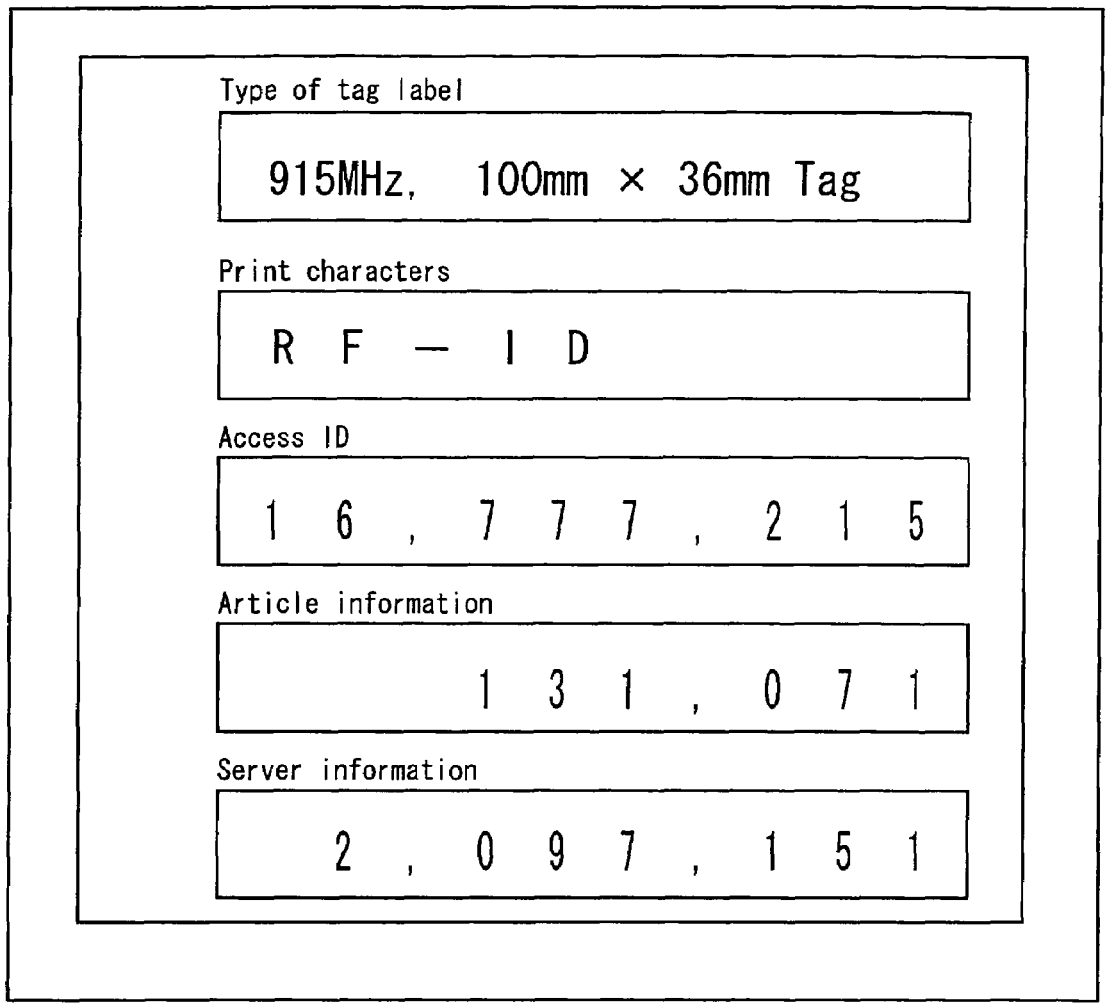
FIG. 29 shows an example of a screen displayed on a terminal or general purpose computer when RFID tag information is accessed.

FIG. 29 shows an example of a screen displayed on the terminal 305 or on the general purpose computer 306 when the tag-label producing device 302 accesses the RFID tag information of the IC circuit part 451 of the RFID circuit element To (i.e., when the device reads information therefrom or writes information thereonto).

In this embodiment, as shown in FIG. 29, the kind of the tag label (access frequency and tape size), print characters R printed in accordance with the RFID circuit element To, an access ID that is an ID peculiar to the RFID circuit element To, an address of article information stored in the information server 307, an address at which corresponding information in the route server 304 is stored, etc., can be displayed on the terminal 305 or on the general purpose computer 306. The tag-label producing device 302 is actuated by the operation of the terminal 305 or the general purpose computer 306, so that the print characters R are printed on the cover film 403, and RFID tag information, such as corresponding article information, is written onto the IC circuit part 451 (or is read from the IC circuit part 451).

The most noticeable feature of this embodiment resides in the fact that, as described above, three adhesive layers are provided to produce a RFID label T by allowing a label having a layered structure to include a RFID circuit element. The details of this will be hereinafter described.

Figure 30A:
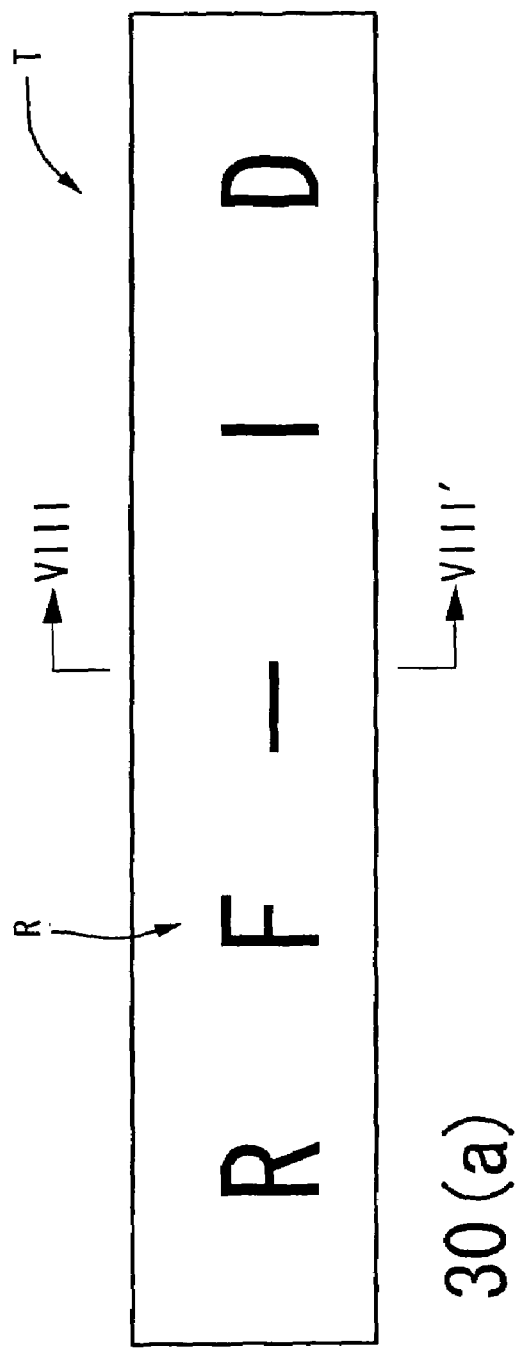
FIGS. 30A and 30B are a top view and a bottom view, respectively, showing an example of an appearance of the RFID label of this embodiment.
Figure 30B:
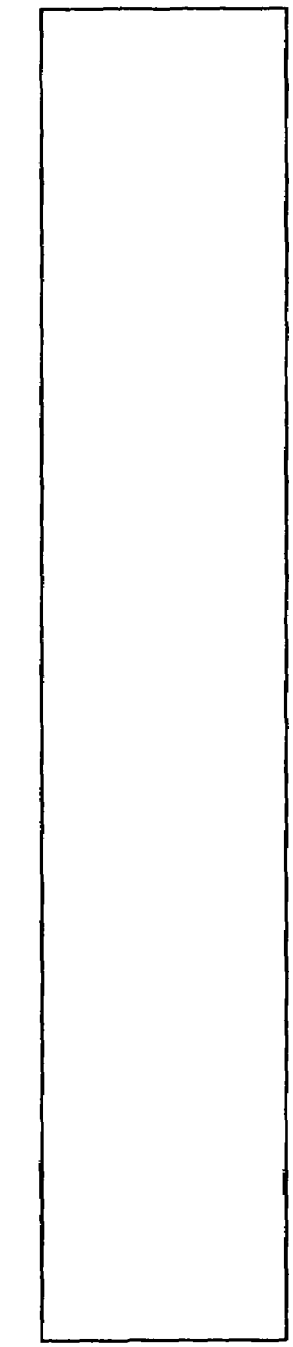
Figure 31:
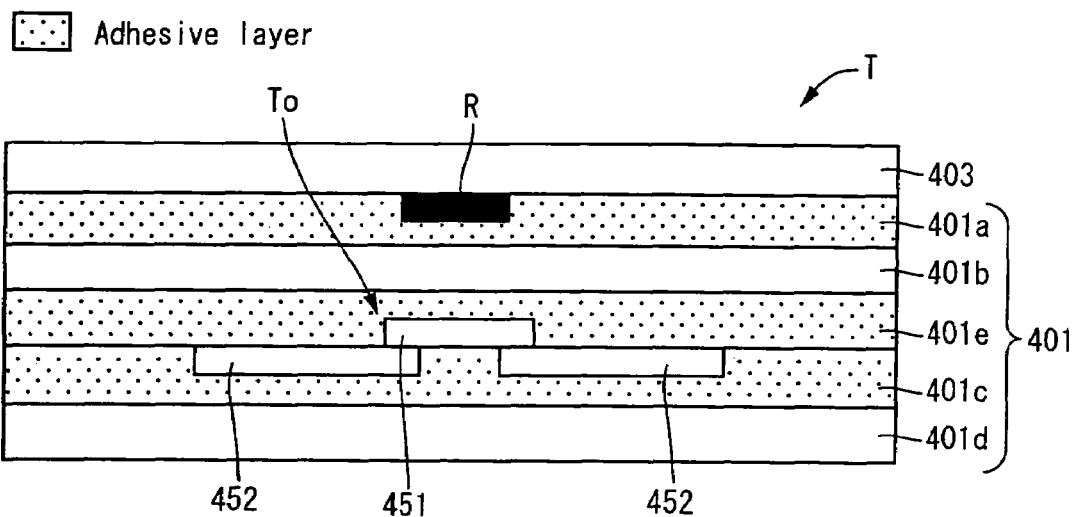
FIG. 31 is a cross-sectional view along line VIII-VIII' of FIG. 30A.

FIG. 30A and FIG. 30B show an example of the external appearance of the RFID label T produced by reading information from the RFID circuit element To (or writing information thereonto) and finishing cutting the tag-label tape 410 on which characters have been printed in the same way as above. FIG. 30A is a top view, and FIG. 30B is a bottom view. FIG. 31 is a cross-sectional view along line VIII-VIII' of FIG. 30A.

In FIG. 30A, FIG. 30B, and FIG. 31, the RFID label T has a six-layer structure formed by adding the cover film 403 to the five-layer structure of FIG. 26. The RFID label T includes, from the side of the cover film 403 (i.e., upper side in FIG. 31) toward the opposite side (i.e., lower side in FIG. 31), the cover film (to-be-printed tape layer) 403, the adhesive layer (gluing adhesive layer) 401a, the base film (tag tape base layer) 401b, the adhesive layer (fixing adhesive layer) 401e, the adhesive layer (affixing adhesive layer) 401c, and the separation sheet (separation material layer) 401d. As described above, the RFID circuit element To including the antenna 452 is enclosed between the adhesive layer 401e and the adhesive layer 401c, and print characters R (in this embodiment, the letters "RF-ID" that indicate the kind of the RFID label T) are printed on the back side of the cover film 403.

In this embodiment thus formed, the tape is drawn out from the cartridge 400 of the tag-label producing device 302 in the form of a tag-label tape 410 on which characters have been printed, and the RFID circuit elements To set and held at a predetermined position (access area) facing the antenna 314 by the conveyance guide 313 are sequentially accessed (i.e., RFID tag information is read from the IC circuit part 451 or is written onto the IC circuit part 451). The tag-label tape 410 is cut for each RFID circuit element To by use of the cutter 315 into RFID labels T. With the adhesive layer 401c exposed by allowing a user to peel the separation sheet 401d off, the thus produced RFID labels T are stuck onto various objects, such as articles of commerce, for practical use.

According to this embodiment, the following effects can be achieved by the thus formed tag tape 401, the first roll 402 having this tag tape 401, and the RFID label T produced by use of the tag tape 401. In detail, in this embodiment, the fixing adhesive layer 401e by which the RFID circuit element To is fixed to the base film 401b is newly provided besides the gluing adhesive layer 401a by which the cover film 403 and the base film 401b are glued together and the affixing adhesive layer 401c with which the separation sheet 401d is covered (in other words, at least three adhesive layers are provided). As a result, the adhesive force of the gluing adhesive layer 401a or that of the affixing adhesive layer 401c is never impaired, and the entire thickness of the gluing adhesive layer 401a or that of the affixing adhesive layer 401c performs a shock absorbing function when a pressing force is applied. Therefore, the RFID circuit element To can be prevented from being damaged. Additionally, since the fixing adhesive layer 401e is disposed closer to the separation sheet 401d (i.e., to the reverse side of the tag label) than the base film 401b, the RFID circuit element To cannot be seen from the side of the label surface by the base film 401b serving as a blindfold, and hence the RFID circuit element To can avoid baring its external appearance.

In particular, in this embodiment, as described above, the gluing adhesive layer 401a, the fixing adhesive layer 401e, and the affixing adhesive layer 401c are properly selected to obtain desired adhesive characteristics. In more detail, for example, the gluing adhesive layer 401a selectively uses a proper adhesive agent having adhesive characteristics suitable for this adhesive layer in consideration of adhesive properties with respect to the cover tape 403 and the base film 401b. The fixing adhesive layer 401e selectively uses a proper adhesive agent having adhesive characteristics suitable for this adhesive layer in consideration of adhesive properties with respect to the base film 401b, the RFID circuit element To, and the affixing adhesive layer 401c. The affixing adhesive layer 401c selectively uses a proper adhesive agent having adhesive characteristics suitable for this adhesive layer in consideration of adhesive properties with respect to the RFID circuit element To, the fixing adhesive layer 401e, and an object (label-stuck body) onto which a label is affixed. (From another point of view, at least two of the gluing adhesive layer 401a, the fixing adhesive layer 401e, and the affixing adhesive layer 401c are formed to differ in adhesive characteristics from each other.) As a result, a proper adhesive agent having adhesive characteristics suitable for each adhesive layer can be individually used, and each tag tape or each label can be improved in quality. Concrete examples of these adhesive characteristics will be hereinafter described.

(A) General-purpose Tape and Label

For example, an adhesive agent is selected so that the gluing adhesive layer 401a, the fixing adhesive layer 401e, and the affixing adhesive layer 401c have substantially the same adhesive force. As a result, (e.g., as a result of allowing these layers to have the same adhesive agent), it becomes possible to realize low-cost, general-purpose tag tapes and labels in which all adhesive layers have substantially the same structure and substantially the same adhesive properties.

(B) Re-separation Tape and Label

For example, an adhesive agent is selected so that the affixing adhesive layer 401c becomes weaker in adhesive force than the other adhesive layers 401a and 401e (alternatively, at least the adhesive layer 401c uses a weak-adhesive-type adhesive agent). As a result, it is possible to produce reusable labels capable of being re-peeled off without being broken after having once been stuck.

(C) Strong Adhesive Tape and Label

For example, an adhesive agent is selected so that the affixing adhesive layer 401c becomes stronger in adhesive force than the other adhesive layers 401*a* and 401*e* (alternatively, at least the adhesive layer 401*c* uses a strong-adhesive-type adhesive agent). As a result, it becomes possible to produce affixing labels that are not easily peeled off after having once been stuck, i.e., affixing labels that have the property of being broken when peeled off.

(D) Security Tape and Label

For example, an adhesive agent is selected so that the gluing adhesive layer 401*a* becomes weaker in cohesive force (which denotes strength obtained after being hardened) than the other adhesive layers 401*c* and 401*e* (alternatively, an adhesive agent is selected so that the fixing adhesive layer 401*e* becomes weaker in cohesive force than the other adhesive layers 401*a* and 401*c*). As a result, when a produced RFID label T receives a force in a direction in which the label is peeled off, the gluing adhesive layer 401*a* weaker in cohesive force (or the fixing adhesive layer 401*e*) spontaneously separates and breaks into pieces, and hence the remaining parts other than this layer, in particular, the RFID circuit element To, can be prevented from being destroyed. Therefore, it becomes possible to realize security tapes and labels capable of keeping internal information stored in the IC circuit part 451 of the RFID circuit element To.

(E) Curved-surface-stuck Tape and Label

For example, an adhesive agent is selected so that the gluing adhesive layer 401*a*, the fixing adhesive layer 401*e*, and the affixing adhesive layer 401*c* have a higher anti-resilience than usual. As a result, the RFID label T can maintain its adhesiveness even when the RFID label T is curved or bent, and hence the RFID label T can be stuck onto a curved surface.

(F) High Heat-resistant Tape and Label

For example, an adhesive agent is selected so that the gluing adhesive layer 401*a* (or all adhesive layers 401*a*, 401*c*, and 401*e* including this) has a higher heat resistance than usual. As a result, it becomes possible to produce high heat-resistant tapes and labels.

(G) High Light-resistant Tape and Label

For example, an adhesive agent is selected so that the gluing adhesive layer 401*a* (or all adhesive layers 401*a*, 401*c*, and 401*e* including this) has a higher light resistance than usual. As a result, it becomes possible to produce high light-resistant tapes and labels.

(H) Flag-like Adhesive Tape and Label

For example, an adhesive agent is selected so that the affixing adhesive layer 401*c* has a higher self-adhesiveness than usual. As a result, the whole or part of the RFID label T can be bent like a flag, so that both ends of the label can be strongly stuck together. Therefore, the label can be affixed like a flag for practical use.

The present invention is not limited to the foregoing embodiment, and can be variously altered or modified within the scope not departing from the gist and the technical concept of the present invention. Various modifications will be hereinafter described.

Figure 32:
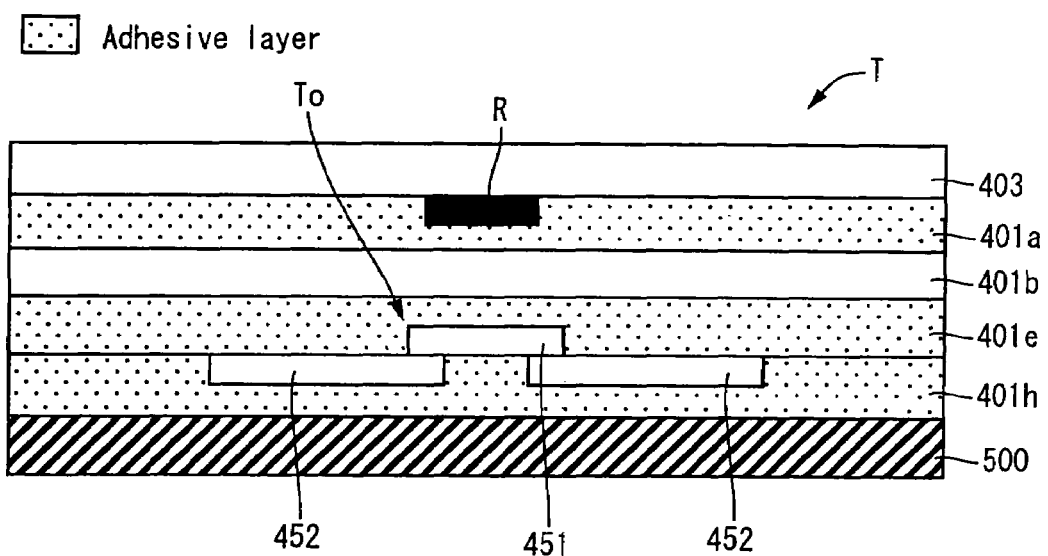
FIG. 32 is a cross-sectional view showing a modification in which the label is fastened to a specified object by a means other than an adhesive.

(1) Case in which the Label is Fastened to an Object by a Means Other than the Affixing Adhesive Agent FIG. 32 is a cross-sectional view showing a modification, corresponding to FIG. 31.

As shown in FIG. 32, in this RFID label T, an attracting magnetic layer 500 is provided instead of the separation sheet 401*d* of FIG. 31, and, instead of the affixing adhesive layer 401*c*, an adhesive layer (attaching adhesive layer) 401*h* used to attach the magnetic layer 500 to the fixing adhesive layer 401*e* is disposed between the magnetic layer 500 and the fixing adhesive layer 401*e*. Accordingly, the produced RFID label T can be fastened to a specified object with the magnetic layer 500 therebetween, and can be removed therefrom.

Without being limited to the magnetic layer 500, a detachable element, such as an adherable-peelable tape, a sucker, or a button, can be provided. The detachable element may be attached to the fixing adhesive layer 401*e* by the attaching adhesive layer 401*h*. The same effect can be obtained in this case.

(2) Case in which an Intermediate Tape Layer is Provided

Figure 33:
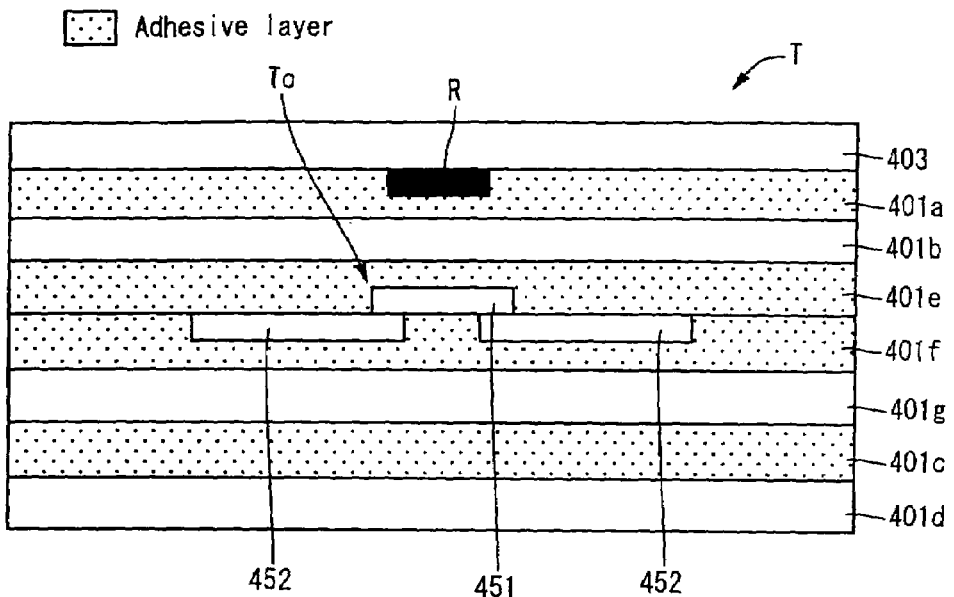
FIG. 33 is a cross-sectional view showing a modification in which an intermediate tape layer is provided.

FIG. 33 is a cross-sectional view showing this modification, corresponding to FIG. 31.

As shown in FIG. 33, in this RFID label T, an intermediate base film (intermediate tag tape base layer) 401*g* is disposed between the base film 401*b* and the separation sheet 401*d* (in more detail, between the fixing adhesive layer 401*e* and the affixing adhesive layer 401*c*). Further, an intermediate adhesive layer (intermediate layer which cosists of an adhesive agent) 401*f* is disposed between the intermediate base film 401*g* and the fixing adhesive layer 401*e*. The intermediate base film 401*g* is made of, for example, the same material as the base film 401*b*. The intermediate adhesive layer 401*f* is stuck onto the fixing adhesive layer 401*e* in such a manner as to contain the RFID circuit element To. The affixing adhesive layer 401*c* is stuck onto the reverse side (lower side in FIG. 33) of the intermediate base film 401*g*.

In the structure shown in FIG. 33, the three-layer structure consisting of the gluing adhesive layer 401*a*, the base film 401*b*, and the fixing adhesive layer 401*e* is an adhesive-film-adhesive structure. Likewise, the three-layer structure consisting of the intermediate adhesive layer 401*f*, the intermediate base film 401*g*, and the affixing adhesive layer 401*c* is an adhesive-film-adhesive structure. Therefore, if the material can be shared therebetween, the same combination can be used, and the layers can be replaced for an arrangement.

According to this modification, the same effect as in the foregoing embodiment can be obtained. In detail, the fixing adhesive layer 401*e* and the intermediate adhesive layer 401*f* are newly provided besides the gluing adhesive layer 401*a* and the affixing adhesive layer 401*c* (in other words, at least four adhesive layers are provided) As a result, the adhesive force of the gluing adhesive layer 401*a* or that of the affixing adhesive layer 401*c* is never impaired, and the entire thickness of the gluing adhesive layer 401*a* or that of the affixing adhesive layer 401*c* performs a shock absorbing function when a pressing force is applied. Therefore, the RFID circuit element To can be prevented from being damaged. Additionally, since the fixing adhesive layer 401*e* is disposed closer to the separation sheet 401*d* (i.e., to the reverse side of the tag label) than the base film 401*b*, the RFID circuit element To cannot be seen from the side of the label surface by the base film 401*b* serving as a blindfold, and hence the RFID circuit element To can avoid baring its external appearance.

As in the foregoing embodiment, in this modification, the gluing adhesive layer 401*a*, the fixing adhesive layer 401*e*, the affixing adhesive layer 401*c*, and the intermediate adhesive layer 401*f* are properly selected to obtain desired adhesive characteristics. In more detail, for example, the gluing adhesive layer 401*a* selectively uses a proper adhesive agent having adhesive characteristics suitable for this adhesive layer in consideration of adhesive properties with respect to the cover tape 403 and the base film 401*b*. The fixing adhesive layer 401*e* selectively uses a proper adhesive agent having adhesive characteristics suitable for this adhesive layer in consideration of adhesive properties with respect to the base film 401b, the RFID circuit element To, and the intermediate adhesive layer 401f. The intermediate adhesive layer 401f selectively uses a proper adhesive agent having adhesive characteristics suitable for this adhesive layer in consideration of adhesive properties with respect to the RFID circuit element To, the fixing adhesive layer 401e, and the intermediate base film 401g. The affixing adhesive layer 401c selectively uses a proper adhesive agent having adhesive characteristics suitable for this adhesive layer in consideration of adhesive properties with respect to the intermediate base film 401g and an object (label-stuck body) onto which a label is affixed. (From another point of view, at least two of the gluing adhesive layer 401a, the fixing adhesive layer 401e, the affixing adhesive layer 401c, and the intermediate adhesive layer 401f are formed to differ in adhesive characteristics from each other.) As a result, a proper adhesive agent having adhesive characteristics suitable for each adhesive layer can be individually used, and each tag tape or each label can be improved in quality. As in the foregoing embodiment, in this case, concrete examples of these adhesive characteristics will be hereinafter described.

(A') General-purpose Tape and Label

For example, an adhesive agent is selected so that the gluing adhesive layer 401a, the fixing adhesive layer 401e, the affixing adhesive layer 401c, and the intermediate adhesive layer 401f have substantially the same adhesive force. As a result, (e.g., as a result of allowing these layers to have the same adhesive agent), it becomes possible to realize low-cost, general-purpose (four-adhesive-layer structure) tag tapes and labels in which all adhesive layers have substantially the same structure and substantially the same adhesive properties.

(B') Re-separation Tape and Label

For example, an adhesive agent is selected so that the affixing adhesive layer 401c becomes weaker in adhesive force than the other adhesive layers 401a, 401e, and 401f (alternatively, at least the adhesive layer 401c uses a weak-adhesive-type adhesive agent). As a result, it is possible to produce reusable labels capable of being re-peeled off without being broken after having once been stuck.

(C') Strong Adhesive Tape and Label

For example, an adhesive agent is selected so that the affixing adhesive layer 401c becomes stronger in adhesive force than the other adhesive layers 401a, 401e, and 401f (alternatively, at least the adhesive layer 401c uses a strong-adhesive-type adhesive agent) As a result, it becomes possible to produce affixing labels that are not easily peeled off after having once been stuck, i.e., affixing labels that have the property of being broken when peeled off.

(D') Security Tape and Label

For example, an adhesive agent is selected so that the gluing adhesive layer 401a becomes weaker in cohesive force (which denotes strength obtained after being hardened) than the other adhesive layers 401c, 401e, and 401f (alternatively, an adhesive agent is selected so that the fixing adhesive layer 401e becomes weaker in cohesive force than the other adhesive layers 401a, 401c, and 401f; or, alternatively, an adhesive agent is selected so that the intermediate adhesive layer 401f becomes weaker in cohesive force than the other adhesive layers 401a, 401c, and 401e). As a result, when a produced RFID label T receives a force in a direction in which the label is peeled off, the gluing adhesive layer 401a weaker in cohesive force (or the fixing adhesive layer 401e, or the intermediate adhesive layer 401f) spontaneously separates and breaks into pieces, and hence the remaining parts other than this layer, in particular, the RFID circuit element To, can be prevented from being destroyed. Therefore, it becomes possible to realize security tapes and labels capable of keeping internal information stored in the IC circuit part 451 of the RFID circuit element To.

(E') Curved-surface-stuck Tape and Label

For example, an adhesive agent is selected so that the gluing adhesive layer 401a, the fixing adhesive layer 401e, the affixing adhesive layer 401c, and the intermediate adhesive layer 401f have a higher anti-resilience than usual. As a result, the RFID label T can maintain its adhesiveness even when the RFID label T is curved or bent, and hence the RFID label T can be stuck onto a curved surface.

(F') High Heat-resistant Tape and Label

For example, an adhesive agent is selected so that the gluing adhesive layer 401a (or all adhesive layers 401a, 401c, 401e, and 401f including this) has a higher heat resistance than usual. As a result, it becomes possible to produce high heat-resistant tapes and labels.

(G') High Light-resistant Tape and Label

For example, an adhesive agent is selected so that the gluing adhesive layer 401a (or all adhesive layers 401a, 401c, 401e, and 401f including this) has a higher light resistance than usual. As a result, it becomes possible to produce high light-resistant tapes and labels.

(H') Flag-like Adhesive Tape and Label

For example, an adhesive agent is selected so that the affixing adhesive layer 401c has a higher self-adhesiveness than usual. As a result, the whole or part of the RFID label T can be bent like a flag, so that both ends of the label can be strongly stuck together. Therefore, the label can be affixed like a flag for practical use.

Figure 34:
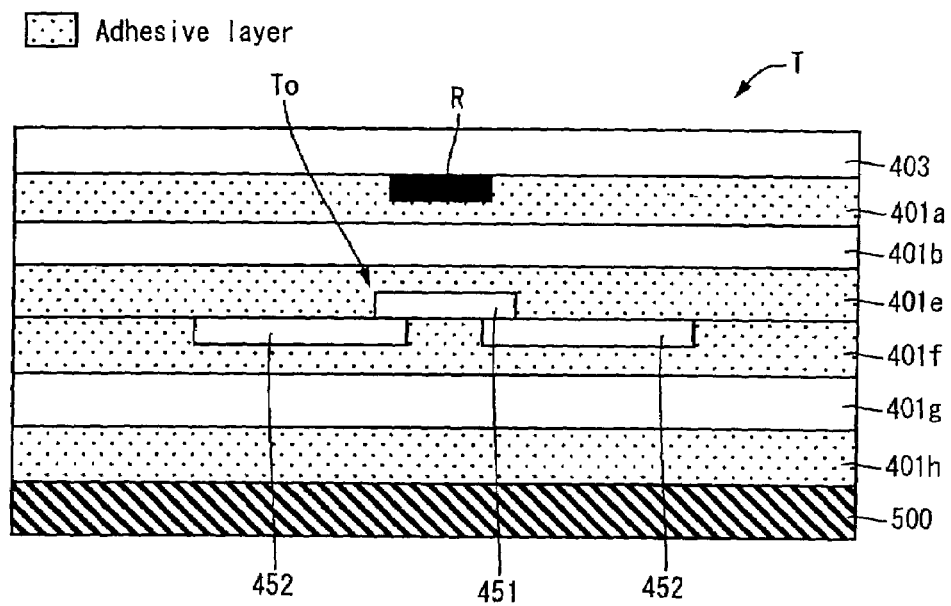
FIG. 34 is a cross-sectional view showing a modification in which an intermediate tape layer is provided and in which the label is fastened to a specified object by a means other than an adhesive.

Further, in the tag tape and the RFID label having a layered structure including the intermediate base film 401g and the intermediate adhesive layer 401f, the label may be fastened to a specified object by a means other than an adhesive agent as described in the above item (1). FIG. 34 is a cross-sectional view showing such a modification, corresponding to FIG. 33.

As shown in FIG. 34, in this RFID label T, an attracting magnetic layer (magnet) 500 is provided instead of the separation sheet 401d of FIG. 33. Further, instead of the affixing adhesive layer 401c, an adhesive layer (an attaching adhesive layer) 401h used to attach the magnetic layer 500 to the intermediate base film, is disposed between the magnetic layer 500 and the intermediate base film 401g. Accordingly, the produced RFID label T can be fastened to a specified object with the magnetic layer 500 therebetween, and can be removed therefrom.

Without being limited to the magnetic layer 500, a detachable element, such as an adherable-peelable tape, a sucker, or a button, can be provided. The detachable element may be attached to the intermediate base film 401g by the attaching adhesive layer 401h. The same effect can be obtained in this case.

Figure 35:
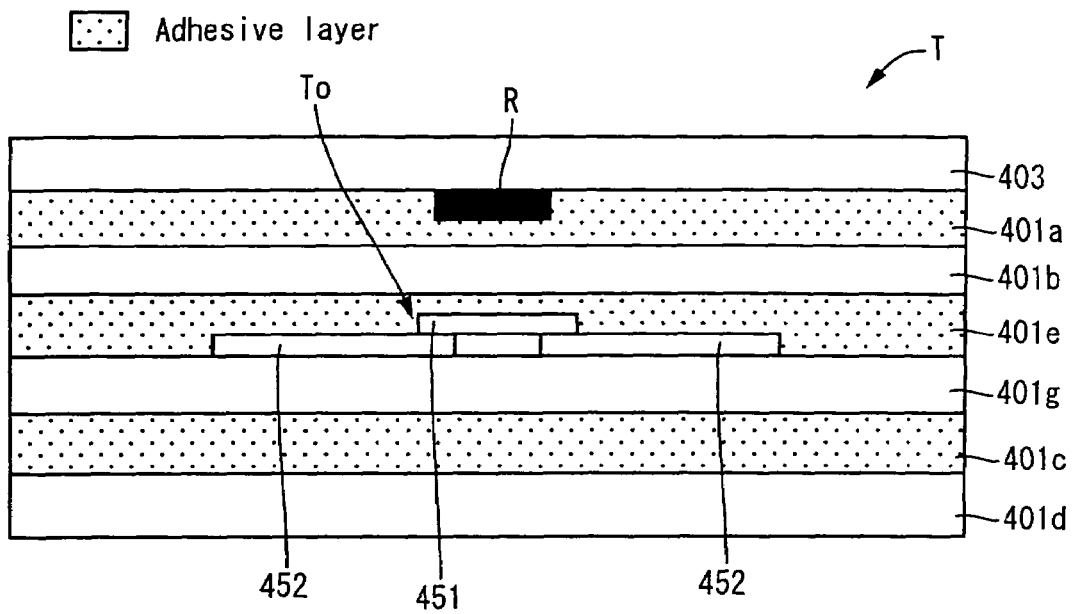
FIG. 35 is a cross-sectional view showing a modification in which only a fixing adhesive layer is used without using an intermediate adhesive layer, and a RFID circuit element is disposed in the fixing adhesive layer.
Figure 36:
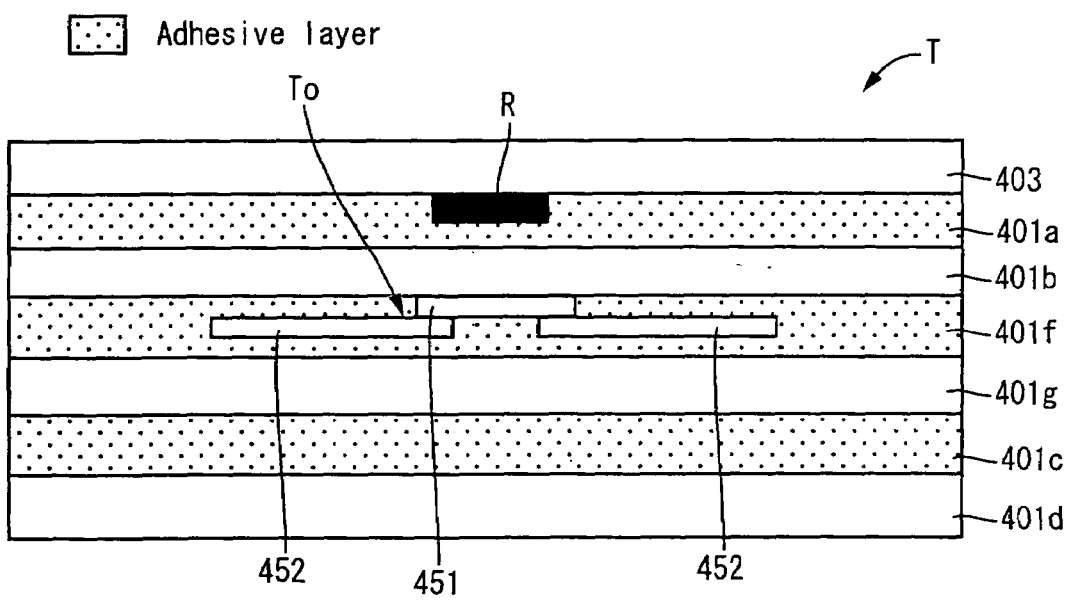
FIG. 36 is a cross-sectional view showing a modification in which only the intermediate adhesive layer is used without using the fixing adhesive layer, and the RFID circuit element is disposed in the intermediate adhesive layer.

In the structure of FIG. 33, the two adhesive layers, i.e., the fixing adhesive layer 401e and the intermediate adhesive layer 401f are provided between the base film 401b and the intermediate base film 401g, and the RFID circuit element To is disposed so as to be sandwiched between these layers. However, the present invention is not limited to this structure. For example, only the fixing adhesive layer 401e may be used by omitting the intermediate adhesive layer 401f from these adhesive layers 401e and 401f as shown in FIG. 35 so that the RFID circuit element To is placed within the adhesive layer 401e. Alternatively, as shown in FIG. 36, only the adhesive layer 401f may be used by omitting the fixing adhesive layer 401e from the adhesive layers 401e and 401f so that the RFID circuit element To is placed within the adhesive layer 401f. Advantageously, in this case, the thickness dimension of the label or that of the tag tape can be reduced in proportion to the removal of one adhesive layer.

Figure 37:
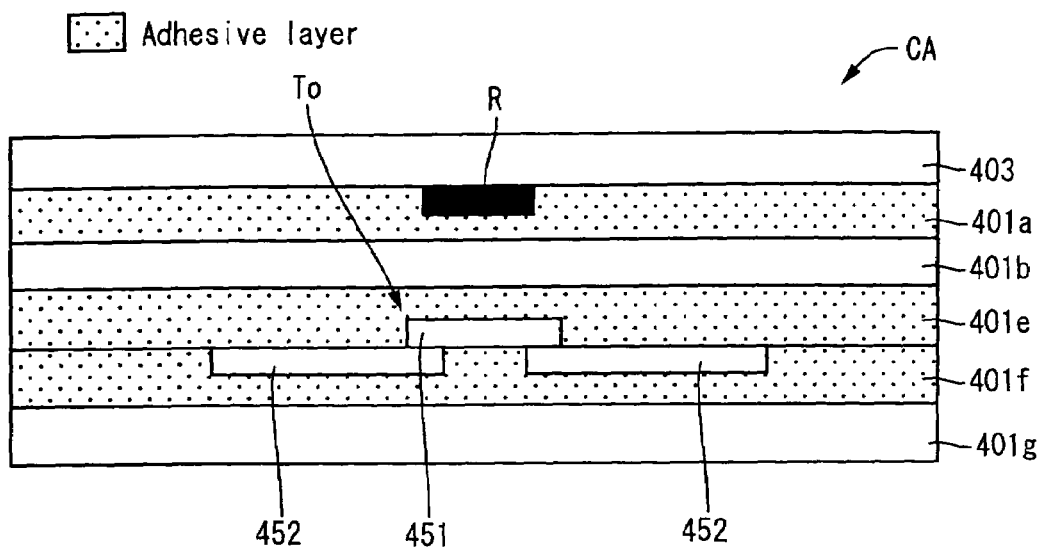
FIG. 37 is a cross-sectional view showing a modification in which the separation sheet of paper and the affixing adhesive layer shown in FIG. 33 are eliminated, and the intermediate base film is disposed as an outermost layer.

Additionally, it is possible to propose another structure (a tag card CA including the RFID circuit element To) shown in FIG. 37 in which the separation sheet 401d and the affixing adhesive layer 401c included in the structure of FIG. 33 are removed (i.e., in which the intermediate base film 401g is used as an outermost layer). In this structure, the number of adhesive layers is three, i.e., the gluing adhesive layer 401a, the fixing adhesive layer 401e, and the intermediate adhesive layer 401f. Also, in this structure, an effect similar to that in the foregoing embodiment or that in the modification can be obtained by providing the three adhesive layers. In detail, the adhesive force of the gluing adhesive layer 401a is never impaired, and the entire thickness of the gluing adhesive layer 401a performs a shock absorbing function when a pressing force is applied during the production process. Therefore, the RFID circuit element To can be prevented from being damaged. Additionally, since the fixing adhesive layer 401e is disposed closer to the intermediate base film 401g (i.e., to the reverse side of the card) than the base film 401b, the RFID circuit element To cannot be seen from the side of the card surface by the base film 401b serving as a blindfold, and hence the RFID circuit element To can avoid baring its external appearance.

(3) Others (a) Coloring by Adhesive Agent

In each structure described above, the gluing adhesive layer 401a may have an adhesive agent colored in desired color. In this case, if the cover film 403, for example, is optically transmissible, the color of the adhesive agent is visually shown as the color of the tag tape and as the color of the label without being changed. Therefore, a tag tape and a label having a more colorful color can be produced by coloring the gluing adhesive layer 401a, and the RFID circuit element To disposed on the reverse side can be reliably blinded from view. The fixing adhesive layer 401e may also be colored.

(b) Thickness of Adhesive Layer

In each structure described above, the minimum value of the thickness of the affixing adhesive layer 401c may be prescribed. Preferably, in this case, the thickness of the affixing adhesive layer 401c is set at $\lambda/50$ or more where x is the wavelength of the communication frequency of the RFID circuit element To. This will be described with reference to FIG. 38.

Figure 38:
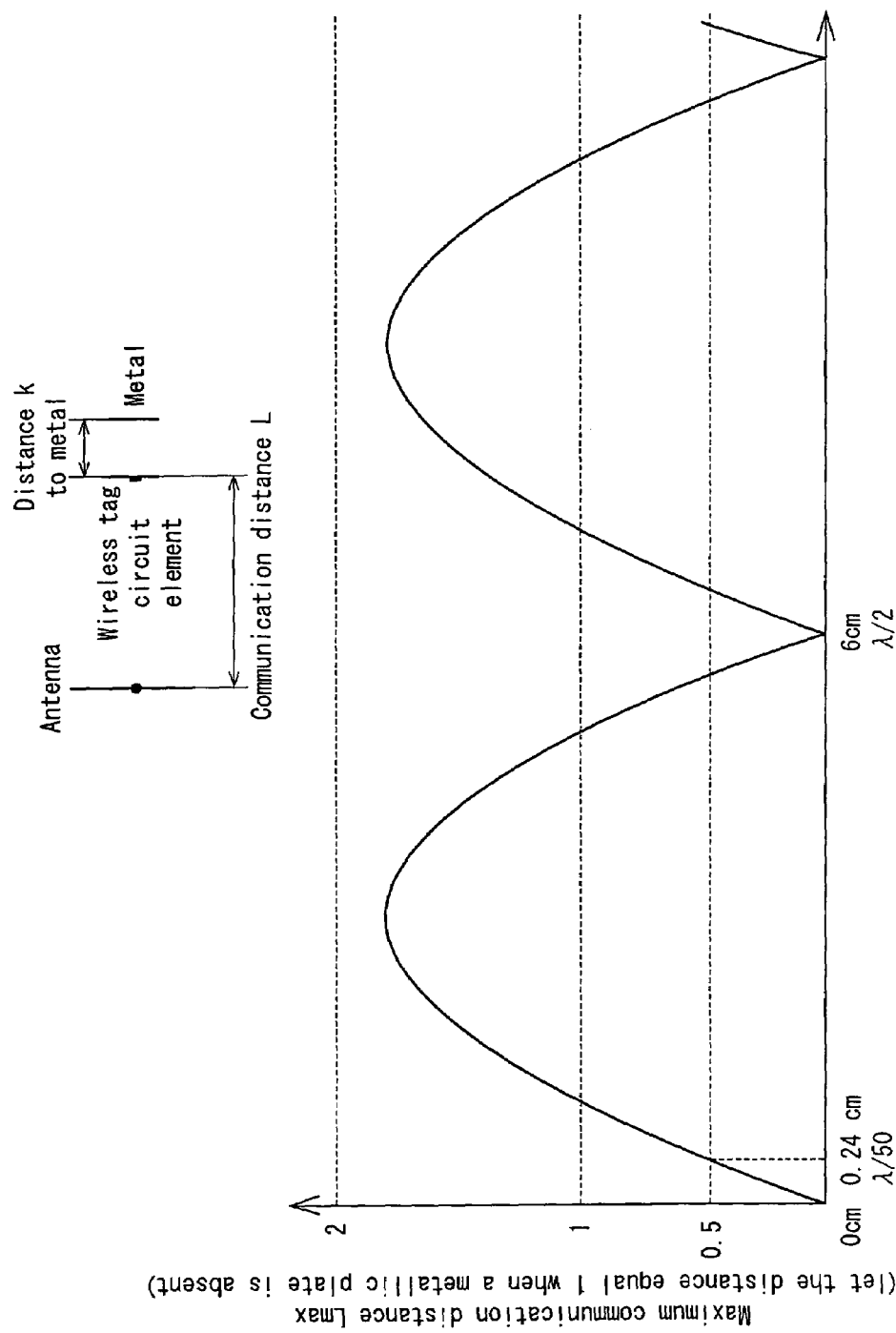
FIG. 38 shows an example of an influence exerted onto a communication state between the RFID circuit element To and the antenna provided on the device side when a metal is placed near the RFID circuit element.

FIG. 38 shows an example of an influence exerted onto a communication state between the RFID circuit element To and the antenna provided on the device side when a metal is placed near the RFID circuit element To. The abscissa axis indicates a distance k between the RFID circuit element and the metal, whereas the ordinate axis indicates the maximum value (maximum communication distance Lmax) of a communication distance L from the antenna. The maximum communication distance Lmax is represented as a relative distance in which 152 cm, which is a communication distance fixed when no metal is present, is assumed as 100%.

As shown in FIG. 38, in this example, the frequency of a communication radio wave is a 2.45 GHz band (wavelength $\lambda=12$ cm). As shown here, the maximum communication distance Lmax parabolically increases and decreases in proportion to an increase in the distance k between the RFID circuit element and the metal from 0 (zero), and reaches the minimum value when $k \cong 6$ cm $(=\lambda/2)$. When the distance k increases from this, the maximum communication distance Lmax parabolically increases again.

As shown in FIG. 38, one characteristic resides in the fact that the maximum communication distance Lmax sharply decreases in proportion to the nearness of the distance k between the RFID circuit element and the metal to 0 (zero). However, it is understood that, if $k \geq 0.24$ cm $(=\lambda/50)$, the maximum communication distance Lmax equal to or greater than at least 50% ($\geq 50\%$) can be secured.

Advantageously, an adverse influence to be exerted on a radio-wave sending and receiving function of the RFID circuit element To can be reduced or prevented by setting the lower limit of the thickness of the affixing adhesive layer 401 in this way (in other words, by relatively thickening the layer) even when the produced RFID label T is affixed to a metallic object. The same layer (tag tape base layer) as the base film 401a may be additionally provided closer to the separation sheet 401d than the affixing adhesive layer 401c so that the distance can be created by the total thickness of the added layer and the adhesive layer 401c.

In the foregoing embodiment, for example, the cartridge 400 is detachably attached to the main body of the tag-label producing device. However, without being limited to this, a non-detachable, so-called installed type or built-in type cartridge may be used, and be provided with, for example, the first roll 402 therein. Also, in this case, the same effect can be obtained.

Additionally, in the foregoing embodiment, the tag-label producing device 302 reads RFID tag information from the IC circuit part 451 of the RFID circuit element To or writes RFID tag information thereonto, and performs printing for identifying the RFID circuit element To by use of the thermal head 310. However, the printing does not necessarily need to be performed. The tag-label producing device 302 may merely read or write RFID tag information.

The present invention can be embodied in variously altered or modified forms in the scope not departing from the gist thereof although the details of such forms are not described here.

What is claimed is:

1. A RFID label comprising:
   a to-be-printed tape layer on which predetermined print characters are printed;
   a tag tape base layer used to dispose a RFID circuit element;
   a gluing adhesive layer used to glue the tag tape base layer onto the to-be-printed tape layer;
   a fixing adhesive layer used to fix the RFID circuit element to the tag tape base layer;
   an affixing adhesive layer provided to affix the RFID circuit element onto a specified object;
   a separation material layer with which the affixing adhesive layer is covered, the separation material layer disposed peelably from the affixing adhesive layer;
   an intermediate tag tape base layer provided between the tag tape base layer and the separation material layer; and
   an intermediate adhesive layer placed between the fixing adhesive layer and the intermediate tag tape base layer.

2. A tag tape comprising:
   a to-be-printed tape layer on which predetermined print characters are printed;
   a tag tape base layer provided to dispose a plurality of RFID circuit elements in a longitudinal direction with predetermined intervals;

a gluing adhesive layer provided to glue the tag tape base layer onto the to-be-printed tape layer;

a fixing adhesive layer provided to fix the RFID circuit element to the tag tape base layer;

an affixing adhesive layer provided to affix the RFID circuit element onto a specified object;

a separation material layer with which the affixing adhesive layer is covered, the separation material layer disposed peelably from the affixing adhesive layer; and an intermediate tag tape base layer provided between the tag tape base layer and the separation material layer; and an intermediate adhesive layer placed between the fixing adhesive layer and the intermediate tag tape base layer.

3. A tag tape roll formed by winding a tag tape around an axis substantially perpendicular to a longitudinal direction of the tape, the tag tape comprising:

a to-be-printed tape layer on which predetermined print characters are printed;

a tag tape base layer provided to dispose a plurality of RFID circuit elements in a longitudinal direction with predetermined intervals;

a gluing adhesive layer provided to glue the tag tape base layer onto the to-be-printed tape layer;

a fixing adhesive layer provided to fix the RFID circuit element to the tag tape base layer;

an affixing adhesive layer provided to affix the RFID circuit element onto a specified object;

a separation material layer with which the affixing adhesive layer is covered, the separation material layer disposed peelably from the affixing adhesive layer;

an intermediate tag tape base layer provided between the tag tape base layer and the separation material layer; and an intermediate adhesive layer placed between the fixing adhesive layer and the intermediate tag tape base layer.

4. The tag tape roll of claim 3, wherein the gluing adhesive layer, the fixing adhesive layer, and the affixing adhesive layer are formed by being properly selected so as to have desired adhesive characteristics.

5. The tag tape roll of claim 4, wherein the affixing adhesive layer is formed to become weaker in adhesive force than the other adhesive layers.

6. The tag tape roll of claim 4, wherein the affixing adhesive layer is formed to become stronger in adhesive force than the other adhesive layers.

7. The tag tape roll of claim 4, wherein the gluing adhesive layer or the fixing adhesive layer is formed to become weaker in cohesive force than the other adhesive layers.

8. The tag tape roll of claim 3, wherein at least two of the gluing adhesive layer, the fixing adhesive layer, and the affixing adhesive layer are formed to differ from each other in adhesive characteristics.

9. The tag tape roll of claim 3, wherein the gluing adhesive layer, the fixing adhesive layer, and the affixing adhesive layer are formed to have substantially the same adhesive force.

10. The tag tape roll of claim 3, wherein the gluing adhesive layer, the fixing adhesive layer, the intermediate adhesive layer, and the affixing adhesive layer are formed by being properly selected so as to have desired adhesive characteristics.

11. The tag tape roll of claim 10, wherein the affixing adhesive layer is formed to become weaker in adhesive force than the other adhesive layers.

12. The tag tape roll of claim 10, wherein the affixing adhesive layer is formed to become stronger in adhesive force than the other adhesive layers.

13. The tag tape roll of claim 10, wherein the gluing adhesive layer or the fixing adhesive layer or the intermediate adhesive layer is formed to become stronger in adhesive force than the other adhesive layers.

14. The tag tape roll of claim 3, wherein at least two of the gluing adhesive layer, the fixing adhesive layer, the intermediate adhesive layer, and the affixing adhesive layer are formed to differ from each other in adhesive characteristics.

15. The tag tape roll of claim 3, wherein the gluing adhesive layer, the fixing adhesive layer, the intermediate adhesive layer, and the affixing adhesive layer are formed to have substantially the same adhesive force.

16. The tag tape roll of claim 3, wherein at least one of the gluing adhesive layer and the fixing adhesive layer is formed by an adhesive agent colored in desired color.

17. The tag tape roll of claim 3, wherein a thickness of the affixing adhesive layer is set at $\lambda/50$ or more where $\lambda$ is a wavelength of a communication frequency of the RFID circuit element.

18. The tag tape roll of claim 3, wherein an attracting magnetic layer is provided instead of the separation material layer, and an attaching adhesive layer to attach the magnetic layer to the fixing adhesive layer is provided instead of the affixing adhesive layer, the attaching adhesive layer being placed between the magnetic layer and the fixing adhesive layer.

19. The tag tape roll claim 3, wherein a detachable element is provided instead of the separation material layer, and an attaching adhesive layer to attach the detachable element to the fixing adhesive layer is provided instead of the affixing adhesive layer, the attaching adhesive layer being placed between the detachable element and the fixing adhesive layer.

20. The tag tape roll of claim 3, wherein the affixing adhesive layer and the separation material layer are omitted, and the intermediate tag tape base layer is placed as an outermost layer.

* * * * *